(12) United States Patent
Keevill et al.

(10) Patent No.: US 6,359,938 B1
(45) Date of Patent: Mar. 19, 2002

(54) SINGLE CHIP VLSI IMPLEMENTATION OF A DIGITAL RECEIVER EMPLOYING ORTHOGONAL FREQUENCY DIVISION MULTIPLEXING

(75) Inventors: Peter A Keevill, Bath; Dawood Alam, Bristol; John M. Nolan; Matthew Collins, both of Bath; Thomas Foxcroft; David H. Davies, both of Bristol; Jonathan Parker, Bath, all of (GB)

(73) Assignee: Discovision Associates, Irvine, CA (US)

( * ) Notice: Subject to any disclaimer, the term of this patent is extended or adjusted under 35 U.S.C. 154(b) by 0 days.

(21) Appl. No.: 08/956,300

(22) Filed: Oct. 22, 1997

Related U.S. Application Data

(63) Continuation-in-part of application No. 08/802,328, filed on Feb. 18, 1997, now Pat. No. 5,953,311.

(30) Foreign Application Priority Data

Oct. 31, 1996 (GB) ................................ 9622728
Sep. 26, 1997 (GB) ................................ 9720550

(51) Int. Cl.[7] .................................................. H03K 9/00
(52) U.S. Cl. ........................ 375/316; 375/332; 370/206
(58) Field of Search ................................ 375/316, 260, 375/259, 340, 329, 331, 332; 370/206, 208, 210, 491, 480, 500, 478, 343, 344; 364/726.01, 726.02, 726.03

(56) References Cited

U.S. PATENT DOCUMENTS

| | | | |
|---|---|---|---|
| 4,300,299 A | 11/1981 | Hirosaki | 370/20 |
| 5,175,617 A | 12/1992 | Wallace et al. | 358/133 |
| 5,283,646 A | 2/1994 | Bruder | 348/415 |

(List continued on next page.)

FOREIGN PATENT DOCUMENTS

| | | | |
|---|---|---|---|
| EP | 0608024 | 7/1994 | H04J/13/00 |
| EP | 0653858 | 5/1995 | H04L/5/06 |
| EP | 0682426 | 11/1995 | H04L/5/06 |
| EP | 0689314 | 12/1995 | H04L/5/06 |
| EP | 0722235 | 7/1996 | H04L/5/06 |
| EP | 0730357 | 9/1996 | H04L/5/06 |
| EP | 0772332 | 5/1997 | H04L/27/26 |
| GB | 2278257 | 11/1994 | H04B/1/12 |
| WO | 9503656 | 2/1995 | H04L/5/06 |
| WO | 9624989 | 8/1996 | H04B/10/207 |

OTHER PUBLICATIONS

Wyatt–Millington, Shephard, and Barton, "A Pipelined Implementation of the Winograd FFT for Satellite On–Board Multi–Carrier Demodulation." Wireless Personal Communications vol. 2 No. 4 pp. 321–334 Jan. 1, 1996.*

"Digital Video Broadcasting (DVB)" European Telecommunication Standard ETS 300 744, Mar. 1997, pp. 1–48.*

(List continued on next page.)

*Primary Examiner*—Chi H. Pham
*Assistant Examiner*—Emmanuel Bayard
(74) *Attorney, Agent, or Firm*—Keiji Masaki; Steve Wong; Richard Stokey

(57) ABSTRACT

The invention provides a single chip implementation of a digital receiver for multicarrier signals that are transmitted by orthogonal frequency division multiplexing. Improved channel estimation and correction circuitry are provided. The receiver has highly accurate sampling rate control and frequency control circuitry. BCH decoding of tps data carriers is achieved with minimal resources with an arrangement that includes a small Galois field multiplier. An improved FFT window synchronization circuit is coupled to the resampling circuit for locating the boundary of the guard interval transmitted with the active frame of the signal. A real-time pipelined FFT processor is operationally associated with the FFT window synchronization circuit and operates with reduced memory requirements.

52 Claims, 48 Drawing Sheets

U.S. PATENT DOCUMENTS

| | | | | |
|---|---|---|---|---|
| 5,579,346 A | | 11/1996 | Kanzaki | 375/344 |
| 5,588,022 A | * | 12/1996 | Dapper et al. | 375/216 |
| 5,646,935 A | * | 7/1997 | Ishkawa et al. | 370/207 |
| 5,657,313 A | * | 8/1997 | Takahashi et al. | 379/491 |
| 5,694,389 A | * | 12/1997 | Seki et al. | 370/208 |
| 5,774,450 A | * | 6/1998 | Harada et al. | 370/206 |
| 5,787,123 A | * | 7/1998 | Okada et al. | 375/324 |
| 5,812,523 A | * | 9/1998 | Isaksson et al. | 370/208 |
| 5,822,323 A | * | 10/1998 | Kaneko et al. | 370/480 |

OTHER PUBLICATIONS

Alard, M., R. Lassalle. "Principles of Modulation and Channel Coding for Digital Broadcasting for Mobile Receivers." EBU Review—Technical No. 224, Aug. 1987, pp 168–190.*

Bidet, E. D. Castelain, C. Joanblanq and P. Senn. "A Fast Single–Chip Implementation of 8192 Complex Point FFT." IEEE Journal of Solid State Circuits, vol. 30, No. 3, Mar. 1995. pp. 300–305.*

Bingham, John A.C. "Multicarrier Modulation for Data Transmission: An Idea Whose Time Has Come." IEEE Communciations Magazine, May 1990. pp 5–14.*

Braun, Stefen. Joachim Speidel. "High Level Modulation Schemes for Digital TV and Multimedia Transmission in CATV–Networks." Telecommunications Institute, Stuttgart University, 1995. pp 751–763.*

Bretl, Wayne. Richard Citta. "Single Carrier VSB Digital Televesion Transmission, Single–Frequency Networks, and Repeater Systems." Zenith Electronics Corp. IEEE Transactions on Consumer Electronics, vol. 42, No. 1, Feb. 1996. pp 1–10.*

Buttar, A. et al. "FFT and OFDM Receiver ICS for DVB–T Decoders." WPM 7.3, IEEE 1997, pp. 102–103.*

Chow, Jacky S. Jerry C. Tu and John M. Cioffi. "A Discrete Multitone Transceiver System for HDSL Applications." IEEE Journal on Selected Areas in Communications, vol. 9, No. 6, Aug. 1991. pp 895–908.*

Cimini, Leonard J. "Analysis and Simulation of a Digital Mobile Channel Using Orthogonal Frequency Division Multiplexing." IEEE Transactions on Communications, vol. Com–33, No. 7, Jul. 1985. pp 665–675.*

Classen, Ferdinand. Heinrich Meyr. "Frequency Synchronization Algorithms for OFDM Systems Suitable for Communication Over Frequency Selective Fading Channels." IEEE Transactions, Mar. 1994, pp 1655–1659.*

Daffara, Flavio and Ottavio Adami. "A New Frequency Detector for Orthogonal Multicarrier Transmission Techniques." IEEE 1995, pp. 804–809.*

De Bot, Paul G.M. Bernard Le Floch, Vittoria Mignone and Hans–Dieter Shutt. "An Overview of the Modulation and Channel Coding Schemes Developed for Digital Terrestrial Television Broadcasting Within the DTTB Project." IEE Convention Publication No. 397, 1994 International Broadcasting Convention Sep. 16–20, 1994. pp 569–576.*

Dosch, Ch. P.A. Ratliff, D. Pommier. "First Public Demonstrations of COFDM/MASCAM. A Milestone for the Future of Radio Broadcasting." EBU Review—Technical No. 232, Dec. 1988. pp 275–283.*

European Telecommunciations Standards Institute "European Telecommunication Standard: Digital Broadcasting Systems for Television, Sound and Data Services; Framing Structure, Channel Coding and Modulation for Digital Television." Valbonne, France, May 1996, pp 1–40.*

Gledhill, J.J. "Systems for Digital Terrestrial Broadcasting." Advanced Products Division, NTL. 1995, pp 1–6.*

Halbert–Lassalle, Roselyn. Bernard Le Floch, Damien Castelain. "Digital Sound Broadcasting to Mobile Receivers." IEEE Transactions on Consumer Electronics, vol. 35. No. 3, Aug. 1989, pp 493–503.*

He, Shouseng and Mats Torkelson. "An Alternative Architecture to Further Reduce the Area of FFT Processor." Dept of Applied Electronics, Lund University, Sweden, pp. 1–10.*

Jeanclaude, I. H. Sari, G. Karam. "An Analysis of Orthogonal Frequency–Division Multiplexing for Mobile Radio Applications." IEEE Transactions 0–7803–1927–3/94. pp 1635–1639.*

Kaiser, Stefen. "On the Performance of Different Detection Techniques for OFDM–CDMA in Fading Channels." IEEE Transactions 0–7803–2509–5/95, May 1995. pp 2059–2063.*

Karam, Georges. Kikmet Sari, Isabelle Jeanclaude. "Transmission Techniques for Digital Terrestrial TV Broadcasting." IEEE Communications Magazine, Feb. 1995. pp 100–108.*

Le Floch, Bernard, Michel Alard, Claude Berrou. "Coded Orthogonal Frequency Division Multiplex." Proceedings of the IEEE, vol. 83, No. 6, Jun. 1995, pp 982–996.*

Le Goff, Stephane. Alain Glavieux and Claude Berrou. "Turbo–Codes and high Spectral Efficiency Modualtion." Telecom Bretagne, France Telecom University, IEEE 0–7802–1825–0/94, 1994. pp 645–649.*

Linnartz, Jean–Paul. "Special Issue on Multi–Carrier Modulation." Wireless Personal Communication, Kluwer, Philips Research, Eindhoven, Jan. 1996. pp 1–6.*

Luise, Marco and Ruggero Reggiannini. "Carrier Frequency Acquisition and Tracking for OFDM Systems." IEEE Transactions on Communications, vol. 44, No. 11, Nov. 1996, pp. 1590–1598.*

Maddocks, M.C.D. "Digital Modulation." BBC Engineering Research Department. The Institution of Electrical Engineers, May 26, 1993. pp 1–13.*

Maddocks, M.C.D. "An Introduction to Digital Modulation and OFDM Techniques." BBC Research Department, Surrey, U.K. pp 1–10.*

Massey, James L. "Optimum Frame Synchronization." IEEE Transactions on Communications, vol. Com–20, No. 2, Apr. 1972. pp 115–119.*

Moose, Paul H. "A Technique for Orthogonal Frequency Division Multiplexing Frequency Offset Correction." IEEE Transactions on Communications, vol. 42, No. 10, Oct. 1994, pp. 2908–2914.*

Mouri, Masutada et al. "Joint Symbol–Timing and Frequency Offset Estimation Scheme for Multi–Carrier Modulation System." The Institute of Electronics, Information and Communication Engineers, Sep. 1995, pp 9–16.*

Muller, A. "OFDM Transmission Over Time–Variant Multipath Channels." Daimler Benz Research Center, ULM Germany. International Broadcasting Convention Sep. 16–20, 1994. IEE Conference Publication No. 397 1994. pp 533–538.*

Muschalik, Claus. "Influence of RF Oscillators on an OFDM Signal." Thomson Multimedia. IEEE Transacions on Consumer Electronics, vol. 41, No. 3, Aug. 1995. pp 592–603.*

Nogami, Hiroshi and Toshio Nagashima. "A Frequency and Timing Period Acquisition Technique for OFDM Systems." IEICE Trans Cummun., vol. E79–B, No. 8 Aug. 1996. pp 1135–1146.*

Oh, Ji Sung. Young Mo Chung and Sang UK Lee "A Carrier Synchronization Technique for OFDM on the Frequency–Selective Fading Environment." Dept of Control and Instrumentation Engineering, Seoul National University, South Korea, 1995 pp. 1574–1578.*

Pollet, Thierry. Mark Van Bladel, and Marc Moeneclaey. "Ber Sensitivity of OFDM Systems to Carrier Frequency Offset and Wiener Phase Noise." IEEE Transactions on Communications OL 43, No. 2/3/4 Feb./Mar./Apr. 1995. pp 191–193.*

Pollet, Thierry and Marc Moeneclaey. "Synchronizability of OFDM Signals." Communication Engineering Lab, University of Ghent. pp 1–5.*

Polley, Michael O. William F. Schreiber, Susie J. Wee. "Comments on 'Transmission Techniques for Digital Terrestrial TV Broadcasting.'" IEEE Communications Magazine, Nov. 1995, pp 22–26.*

Pommier, D. and Yi Wu. "Interleaving or Spectrum–Spreading in Digital Radio Intended for Vehicles." EBU Review—Technical, No. 217, Jun. 1986. pp 128–142.*

Sari, H. G. Karam, and I. Jeanclaude. Sat, Division Telecommunciations. "Frequency–Domain Equalization of Mobile Radio and Terrestrial Broadcast Channels." IEEE Transactions 0–7803–1820–X/94, 1994. pp 1–5.*

Seki, Takashi, "A New Frequency Synchronization Technique for OFDM Demodulators Using Guard Intervals." ITE Technical Report, vol. 19, No. 38, pp 13–18.*

Shelswell, P. "The COFDM Modulation System: The Heart of Digital Audio Broadcasting." Electronics & Communication Engineering Journal, Jun. 1995. pp 127–136.*

Shelswell, Peter. John Zubrzycki and Richard Evans. "Mobile and Portable Reception of Satellite–Delivered DAB." BBC Research and Development Department, 1996. pp 1–8.*

Stott, J.H. "The Effects of Frequency Errors in OFDM." pp 1–13.*

Stuber, Gordon L. and Mark Russell. "Terrestrial Digital Video Broadcasting for Mobile Reception Using OFDM." IEEE Transactions 0–7803–2509–5/95, May 1995, pp 2049–2053.*

Sueur, B. and D. Castelain. "Limits of COFDM Technology for Digital Terrestrial Television Broadcasting: Theoretical Considerations and Practical Measurements." CCETT, 35512 Cession–Sevigne, France, 1996 pp 323–353.*

Van De Beek, Jan–Jap. Ove Edfors, Magnus Sandell, Sarah Kate Wilson, Per Ola Borjesson. "On Channel Estimation in OFDM Systems." IEEE Transactions, 0–7803–2742–x/95, 1995, pp 815–819.*

Warner, William D. and Cyril Leung. "OFDM/FM Frame Synchronization for Mobile Radio Data Communication." IEEE Transactions on Vehicular Technology, vol. 42, No. 3, Aug. 1993, pp. 302–313.*

Wu, Yiyan. William Y. Zou. "Orthogonal Frequency Division Multiplexing: A Multi–Carrier Modulation Scheme." IEEE Transactions on Consumer Electronics, vol. 41, No. 3, Aug. 1995, pp 392–397.*

Yamazaki, Shigeru. "Towards the Implementation of Digital Terrestrial TV Broadcasting." Science & Technology Research Laboratories, NHK, Tokyo, Japan. 1995 pp 290–297.*

Zou, William Y., Yiyan Wu. "COFDM: An Overview." IEEE Transactions on Broadcasting, vol. 41, No. 1, Mar. 1995, pp 1–8.*

* cited by examiner

X IDEAL CONSTELLATION SAMPLES    ⊚ PERTURBED SAMPLES

| FIG.29A | FIG.29B |

SINGLE CHIP VLSI IMPLEMENTATION OF A DIGITAL RECEIVER EMPLOYING ORTHOGONAL FREQUENCY DIVISION MULTIPLEXING

CROSS REFERENCE TO RELATED APPLICATIONS.

This Application is a continuation-in-part of Application Ser. No. 08/802,328, U.S. Pat. No. 5,953,311 filed Feb. 18, 1997.

COMPUTER PROGRAM LISTING APPENDIX

This application was orginally filed with Code Listings 1-35 which are now included in a computer program listing appendix. This appendix includes a total 203 frames of microfiche which are placed on a compact disc.

BACKGROUND OF THE INVENTION

1. Field of the Invention

This invention relates to receivers of electromagnetic signals employing multicarrier modulation. More particularly this invention relates to a digital receiver which is implemented on a single VLSI chip for receiving transmissions employing orthogonal frequency division multiplexing, and which is suitable for the reception of digital video broadcasts.

2. Description of the Related Art

Coded orthogonal frequency division multiplexing ("COFDM") has been proposed for digital audio and digital video broadcasting, both of which require efficient use of limited bandwidth, and a method of transmission which is reliable in the face of several effects. For example the impulse response of a typical channel can be modeled as the sum of a plurality of Dirac pulses having different delays. Each pulse is subject to a multiplication factor, in which the amplitude generally follows a Rayleigh law. Such a pulse train can extend over several microseconds, making unencoded transmission at high bit rates unreliable. In addition to random noise, impulse noise, and fading, other major difficulties in digital terrestrial transmissions at high data rates include multipath propagation, and adjacent channel interference, where the nearby frequencies have highly correlated signal variations. COFDM is particularly suitable for these applications. In practical COFDM arrangements, relatively small amounts of data are modulated onto each of a large number of carriers that are closely spaced in frequency. The duration of a data symbol is increased in the same ratio as the number of carriers or subchannels, so that inter-symbol interference is markedly reduced.

Multiplexing according to COFDM is illustrated in FIGS. 1 and 2, wherein the spectrum of a single COFDM carrier or subchannel is indicated by line 2. A set of carrier frequencies is indicated by the superimposed waveforms in FIG. 2, where orthogonality conditions are satisfied. In general two real-valued functions are orthogonal if $$\int_a^b \psi_p(t)\psi_q^*(t)\,dt = K \quad (1)$$

where K is a constant, and K=0 if p≠q; K≠0 if p=q. Practical encoding and decoding of signals according to COFDM relies heavily on the fast Fourier transform ("FFT"), as can be appreciated from the following equations.

The signal of a carrier c is given by $$s_c(t) = A_c(t) e^{j[\omega_c t + \phi_c(t)]} \quad (2)$$

where $A_c$ is the data at time t, $\omega_c$ is the frequency of the carrier, and $\phi_c$ is the phase. N carriers in the COFDM signal is given by $$s_s(t) = (1/N)\sum_{n=0}^{N} A_n(t) e^{j[\omega_n t + \phi_n(t)]} \quad (3)$$

$$\omega_n = \omega_0 + n\Delta\omega \quad (4)$$

Sampling over one symbol period, then $$\phi_c(t) \Rightarrow \phi_n \quad (5)$$

$$A_c(t) \Rightarrow A_n \quad (6)$$

With a sampling frequency of 1/T, the resulting signal is represented by $$s_s(t) = (1/N)\sum_{n=0}^{N} A_n(t) e^{j[(\omega_n + n\Delta\omega)kT + \phi_n]} \quad (7)$$

Sampling over the period of one data symbol τ=NT, with $\omega_0=0$, $$s_s(kT) = (1/N)\sum_{n=0}^{N-1} A_n e^{j\phi_n} e^{j(n\Delta\omega)kT} \quad (8)$$

which compares with the general form of the inverse discrete Fourier transform:

$$g(kT) = (1/N)\sum_{n=0}^{N-1} G(n/(kT)) e^{j\pi n(k/N)} \quad (9)$$

In the above equations $A_n e^{j\Phi_n}$ is the input signal in the sampled frequency domain, and $S_s(kT)$ is the time domain representation. It is known that increasing the size of the FFT provides longer symbol durations and improves ruggedness of the system as regards echoes which exceed the length of the guard interval. However computational complexity increases according to $N\log_2 N$, and is a practical limitation.

In the presence of intersymbol interference caused by the transmission channel, orthogonality between the signals is not maintained. One approach to this problem has been to deliberately sacrifice some of the emitted energy by preceding each symbol in the time domain by an interval which exceeds the memory of the channel, and any multipath delay. The "guard interval" so chosen is large enough to absorb any intersymbol interference, and is established by preceding each symbol by a replication of a portion of itself. The replication is typically a cyclic extension of the terminal portion of the symbol. Referring to FIG. 3, a data symbol 4 has an active interval 6 which contains all the data transmitted in the symbol. The terminal portion 8 of the active interval 6 is repeated at the beginning of the symbol as the guard interval 10. The COFDM signal is represented by the solid line 12. It is possible to cyclically repeat the initial portion of the active interval 6 at the end of the symbol.

Transmission of COFDM data can be accomplished according to the known general scheme shown in FIG. 4. A serial data stream 14 is converted to a series of 15 parallel streams 16 in a serial-to-parallel converter 18. Each of the parallel streams 16 is grouped into x bits each to form a complex number, where x determines the signal constellation of its associated parallel stream. After outer coding and interleaving in block 20 pilot carriers are inserted via a signal mapper 22 for use in synchronization and channel estimation in the receiver. The pilot carriers are typically of two types. Continual pilot carriers are transmitted in the same location in each symbol, with the same phase and amplitude. In the receiver, these are utilized for phase noise cancellation, automatic frequency control, and time/sampling synchronization. Scattered pilot carriers are distributed throughout the symbol, and their location typically changes from symbol to symbol. They are primarily useful in channel estimation. Next the complex numbers are modulated at baseband by the inverse fast Fourier transform ("IFFT") in block 24. A guard interval is then inserted at block 26. The discrete symbols are then converted to analog, typically low-pass filtered, and then upconverted to radiofrequency in block 28. The signal is then transmitted through a channel 30 and received in a receiver 32. As is well known in the art, the receiver applies an inverse of the transmission process to obtain the transmitted information. In particular an FFT is applied to demodulate the signal.

A modern application of COFDM has been proposed in the European Telecommunications Standard ETS 300 744 (March 1997), which specifies the framing structure, channel coding, and modulation for digital terrestrial television. The specification was designed to accommodate digital terrestrial television within the existing spectrum allocation for analog transmissions, yet provide adequate protection against high levels of co-channel interference and adjacent channel interference. A flexible guard interval is specified, so that the system can support diverse network configurations, while maintaining high spectral efficiency, and sufficient protection against co-channel interference and adjacent channel interference from existing PAL/SECAM services. The noted European Telecommunications Standard defines two modes of operation. A "2K mode", suitable for single transmitter operation and for small single frequency networks with limited transmitter distances. An "8K mode" can be used for either single transmitter operation or for large single frequency networks. Various levels of quadrature amplitude modulation ("QAM") are supported, as are different inner code rates, in order to balance bit rate against ruggedness. The system is intended to accommodate a transport layer according to the Moving Picture Experts Group ("MPEG"), and is directly compatible with MPEG-2 coded TV signals (ISO/IEC 13818).

In the noted European Telecommunications Standard data carriers in a COFDM frame can be either quadrature phase shift keyed ("QPSK"), 16-QAM, 64-QAM, non-uniform 16-QAM, or non-uniform 64-QAM using Gray mapping.

An important problem in the reception of COFDM transmission is difficulty in maintaining synchronization due to phase noise and jitter which arise from upconversion prior to transmission, downconversion in the receiver, and the front end oscillator in the tuner, which is typically a voltage controlled oscillator. Except for provision of pilot carriers to aid in synchronization during demodulation, these issues are not specifically addressed in the noted European Telecommunications Standard, but are left for the implementer to solve.

Basically phase disturbances are of two types. First, noisy components which disturb neighbor carriers in a multicarrier system are called the "foreign noise contribution" ("FNC"). Second, a noisy component which disturbs its own carrier is referred to as the "own noise contribution".

Referring to FIG. 5, the position of ideal constellation samples are indicated by "x" symbols 34. The effect of foreign noise contribution is stochastic, resulting in Gaussian-like noise. Samples perturbed in this manner are indicated on FIG. 5 as circles 36. The effects of the own noise contribution is a common rotation of all constellation points, 30 indicated as a displacement between each "x" symbol 34 and its associated circle 36.

This is referred to as the "common phase error", which notably changes from symbol to symbol, and must therefore be recalculated each symbol period $T_S$. The common phase error may also be interpreted as a mean phase deviation during the symbol period $T_S$.

In order for the receiver 32 to process the data symbols in a practical system, a mathematical operation is performed on the complex signal representing each data symbol. Generally this is an FFT. For valid results to be obtained, a particular form of timing synchronization is required in order to align the FFT interval with the received data symbol.

SUMMARY OF THE INVENTION

It is therefore a primary object of the invention to provide a highly integrated, low cost apparatus for the reception of digital broadcasts, such as terrestrial digital video broadcasts, which is implemented on a single VLSI chip.

It is another object of the invention to provide an improved method and apparatus for synchronizing a received data symbol with an FFT window in signals transmitted according to COFDM.

It is yet another object of the invention to improve the stability of digital multicarrier receivers in respect of channel estimation.

It is still another object of the invention to improve the automatic frequency control circuitry employed in multicarrier digital receivers.

It is a further object of the invention to improve the automatic sampling rate control circuitry employed in multicarrier digital receivers.

The invention provides a digital receiver for multicarrier signals that are transmitted by orthogonal frequency division multiplexing. The multicarrier signal carries a stream of data symbols having an active interval, and a guard interval in which the guard interval is a replication of a portion of the active interval. In the receiver an analog to digital converter is coupled to a front end amplifier. An I/Q demodulator is provided for recovering in phase and quadrature components from data sampled by the analog to digital converter, and an automatic gain control circuit is coupled to the analog to digital converter. In a low pass filter circuit accepting I and Q data from the I/Q demodulator, the I and Q data are decimated and provided to a resampling circuit. An interpolator in the resampling circuit accepts the decimated I and Q data at a first rate and outputs resampled I and Q data at a second rate. An FFT window synchronization circuit is coupled to the resampling circuit for locating a boundary of the guard interval. A real-time pipelined FFT processor is operationally associated with the FFT window synchronization circuit. Each stage of the FFT processor has a complex coefficient multiplier, and an associated memory with a lookup table defined therein for multiplicands being multiplied in the complex coefficient multiplier. Each multiplicand in the lookup table is unique in value. A monitor circuit responsive to the FFT window synchronization circuit detects a predetermined indication that a boundary between an active symbol and a guard interval has been located.

According to an aspect of the invention the FFT window synchronization circuit has a first delay element accepting currently arriving resampled I and Q data, and outputting delayed resampled I and Q data. A subtracter produces a signal representative of the difference between the currently arriving resampled I and Q data and the delayed resampled I and Q data. In a first circuit the subtracter output signal is converted to a signal having a unipolar magnitude, which is preferably the absolute value of the signal provided by the subtracter. A second delay element stores the output signal of the first circuit, and a third delay element receives the delayed output of the second delay element. In a second circuit a statistical relationship is calculated between data stored in the second delay element and data stored in the third delay element. The output of the FFT window synchronization circuit is representative of the statistical relationship. Preferably the statistical relationship is the F ratio. The FFT processor is capable of operation in a 2K mode and in an 8K mode.

The FFT processor has an address generator for the memory of each stage, which accepts a signal representing the order dependency of a currently required multiplicand, and generates an address of the memory wherein the currently required multiplicand is stored. In a further aspect of the invention each multiplicand is stored in the lookup table in order of its respective order dependency for multiplication by the complex coefficient multiplier, so that the order dependencies of the multiplicands define an incrementation sequence. The address generator has an accumulator for storing a previous address that was generated thereby, a circuit for calculating an incrementation value of the currently required multiplicand responsive to the incrementation sequence, and an adder for adding the incrementation value to the previous address.

In another aspect of the invention there are a plurality of incrementation sequences. The multiplicands are stored in row order, wherein in a first row a first incrementation sequence is 0, in a second row a second incrementation sequence is 1, in a third row first and second break points B1, B2 of a third incrementation sequence are respectively determined by the relationships $$B1_{M_N} = 4^N B1_{M_N} - \sum_{n=0}^{N-1} 4^n$$

$$B2_{M_N} = \sum_{n=0}^{N} 4^n$$

and in a fourth row a third break point B3 of a third incrementation sequence is determined by the relationship $$B3_{M_N} = 2 \times 4^N + 2$$

wherein $M_N$ represents the memory of an Nth stage of the FFT processor.

The receiver provides channel estimation and correction circuitry. Pilot location circuitry receives a transformed digital signal representing a frame from the FFT processor, and identifies the position of pilot carriers therein. The pilot carriers are spaced apart in a carrier spectrum of the transformed digital signal at intervals K and have predetermined magnitudes. The pilot location circuitry has a first circuit for computing an order of carriers in the transformed digital signal, positions of said carriers being calculated modulo K. There are K accumulators coupled to the second circuit for accumulating magnitudes of the carriers in the transformed digital signal, the accumulated magnitudes defining a set. A correlation circuit is provided for correlating K sets of accumulated magnitude values with the predetermined magnitudes. In the correlation a first member having a position calculated modulo K in of each of the K sets is uniquely offset from a start position of the frame.

According to another aspect of the invention the pilot location circuitry also has a bit reversal circuit for reversing the bit order of the transformed digital signal.

According to yet another aspect of the invention amplitudes are used to represent the magnitudes of the carriers. Preferably the magnitudes of the carriers and the predetermined magnitudes are absolute values.

In a further aspect of the invention the correlation circuitry also has a peak tracking circuit for determining the spacing between a first peak and a second peak of the K sets of accumulated magnitudes, wherein the first peak is the maximum magnitude, and the second peak is the second highest magnitude.

The channel estimation and correction circuitry also has an interpolating filter for estimating the channel response between the pilot carriers, and a multiplication circuit for multiplying data carriers output by the FFT processor with a correction coefficient produced by the interpolating filter.

The channel estimation and correction circuitry also has a phase extraction circuit accepting a data stream of phase-uncorrected I and Q data from the FFT processor, and producing a signal representative of the phase angle of the uncorrected data. The phase extraction circuit includes an accumulator for the phase angles of succeeding phase-uncorrected I and Q data.

According to an aspect of the invention the channel estimation and correction circuitry includes an automatic frequency control circuit coupled to the phase extraction circuit, in which a memory stores the accumulated common phase error of a first symbol carried in the phase-uncorrected I and Q data. An accumulator is coupled to the memory and accumulates differences between the common phase error of a plurality of pilot carriers in a second symbol and the common phase error of corresponding pilot carriers in the first symbol. The output of the accumulator is filtered, and coupled to the I/Q demodulator.

According to another aspect of the invention the coupled output of the accumulator of the automatic frequency control circuit is enabled in the I/Q demodulator only during reception of a guard interval therein.

According to yet another aspect of the invention the channel estimation and correction circuitry also has an automatic sampling rate control circuit coupled to the phase extraction circuit, in which a memory stores the individual accumulated phase errors of pilot carriers in a first symbol carried in the phase-uncorrected I and Q data. An accumulator is coupled to the memory and accumulates differences between the phase errors of individual pilot carriers in a second symbol and phase errors of corresponding pilot carriers in the first symbol to define a plurality of accumulated intersymbol carrier phase error differentials. A phase slope is defined by a difference between a first accumulated intersymbol carrier phase differential and a second accumulated intersymbol carrier phase differential. The output of the accumulator is filtered and coupled to the I/Q demodulator.

According to one aspect of the invention the sampling rate control circuit stores a plurality of accumulated intersymbol carrier phase error differentials and computes a line of best fit therebetween.

According to another aspect of the invention the coupled output signal of the accumulator of the automatic sampling rate control circuit is enabled in the resampling circuit only during reception of a guard interval therein.

According to an aspect of the invention a common memory for storing output of the phase extraction circuit is coupled to the automatic frequency control circuit and to the automatic sampling rate control circuit.

According to another aspect of the invention the phase extraction circuit also has a pipelined circuit for iteratively computing the arctangent of an angle of rotation according to the series $$\tan^{-1}(x) = x - \frac{x^3}{3} + \frac{x^5}{5} - \frac{x^7}{7} + \frac{x^9}{9} - \ldots, |x| < 1$$

wherein x is a ratio of the phase-uncorrected I and Q data.

The pipelined circuit includes a constant coefficient multiplier, and a multiplexer for selecting one of a plurality of constant coefficients of the series. An output of the multiplexer is connected to an input of the constant coefficient multiplier.

According to still another aspect of the invention the pipelined circuit has a multiplier, a first memory for storing the quantity $x^2$, wherein the first memory is coupled to a first input of the multiplier, and has a second memory for holding an output of the multiplier. A feedback connection is provided between the second memory and a second input of the multiplier. The pipelined circuit also has a third memory for storing the value of the series. Under direction of a control circuit coupled to the third memory, the pipeline circuit computes N terms of the series, and also computes N+1 terms of the series. An averaging circuit is also coupled to the third memory and computes the average of N terms and N+1 terms of the series.

Data transmitted in a pilot carrier of the multicarrier signal is BCH encoded according to a code generator polynomial h(x). A demodulator operative on the BCH encoded data is provided, which includes an iterative pipelined BCH decoding circuit. The BCH decoding circuit is circuit coupled to the demodulator. It forms a Galois Field of the polynomial, and calculates a plurality of syndromes therewith. The BCH decoding circuit includes a plurality of storage registers, each storing a respective one of the syndromes, and a plurality of feedback shift registers, each accepting data from a respective one of the storage registers. The BCH decoding circuit has a plurality of Galois field multipliers. Each of the multipliers is connected in a feedback loop across a respective one of the feedback shift registers and multiplies the output of its associated feedback shift register by an alpha value of the Galois Field. An output Galois field multiplier multiplies the outputs of two of the feedback shift registers.

A logical network forms an error detection circuit connected to the feedback shift registers and to the output Galois field multiplier. The output of the error detection circuit indicates an error in a current bit of data, and a feedback line is enabled by the error detection logic and connected to the storage registers. Using the feedback line, the data output by the feedback shift registers are written back into the storage registers for use in a second iteration.

According to an aspect of the invention the output Galois field multiplier has a first register initially storing a first multiplicand A, a constant coefficient multiplier connected to the first register for multiplication by a value a. An output of the constant coefficient multiplier is connected to the first register to define a first feedback loop, whereby in a kth cycle of clocked operation the first register contains a Galois field product $A\alpha^k$. A second register is provided for storing a second multiplicand B. An AND gate is connected to the second register and to the output of the constant coefficient multiplier. An adder has a first input connected to an output of the AND gate. An accumulator is connected to a second input of the adder, and the Galois field product AB is output by the adder.

The invention provides a method for the estimation of a frequency response of a channel. It is performed by receiving from a channel an analog multicarrier signal that has a plurality of data carriers and scattered pilot carriers. The scattered pilot carriers are spaced apart at an interval N and are transmitted at a power that differs from the transmitted power of the data carriers. The analog multicarrier signal is converted to a digital representation thereof. A Fourier transform is performed on the digital representation of the multicarrier signal to generate a transformed digital signal. The bit order of the transformed digital signal is reversed to generate a bit-order reversed signal. Magnitudes of the carriers in the bit-order reversed signal are cyclically accumulated in N accumulators, amd the accumulated magnitudes are correlated with the power of the scattered pilot carriers. Responsive to the correlation, a synchronizing signal is generated that identifies a carrier position of the multicarrier signal, preferably an active carrier.

According to another aspect of the invention the step of accumulating magnitudes is performed by adding absolute values of a real component of the bit-order reversed signal to respective absolute values of imaginary components thereof to generate sums, and respectively storing the sums in the N accumulators.

According to yet another aspect of the invention the step of correlating the accumulated magnitudes also is performed by identifying a first accumulator having the highest of the N values stored therein, which represents a first carrier position, and by identifying a second accumulator which has the second highest of the N values stored therein, which represents a second carrier position. The interval between the first carrier position and the second carrier position is then determined.

To validate the consistency of the carrier position identification, the position of a carrier of a first symbol in the bit-order reversed signal is compared with a position of a corresponding carrier of a second symbol therein.

Preferably interpolation is performed between pilot carriers to determine correction factors for respective intermediate data carriers disposed therebetween, and respectively adjusting magnitudes of the intermediate data carriers according to the correction factors.

According to an aspect of the invention a mean phase difference is determined between corresponding pilot carriers of successive symbols of the transformed digital signal. A first control signal representing the mean phase difference, is provided to control the frequency of reception of the multicarrier signal. The first control signal is enabled only during reception of a guard interval.

Preferably a line of best fit is determined for the intersymbol phase differences of multiple carriers to define a phase slope.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

Alignment of The FFT Window

Figure 1:
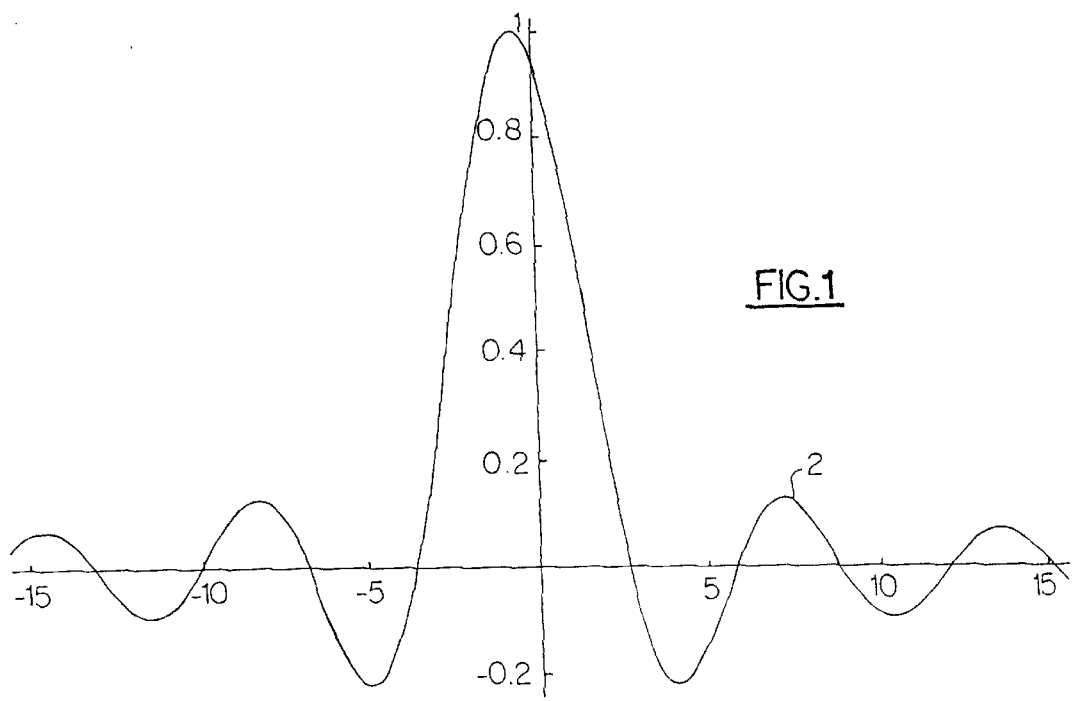
FIG. 1 illustrates the spectrum of a COFDM subchannel.
Figure 2:
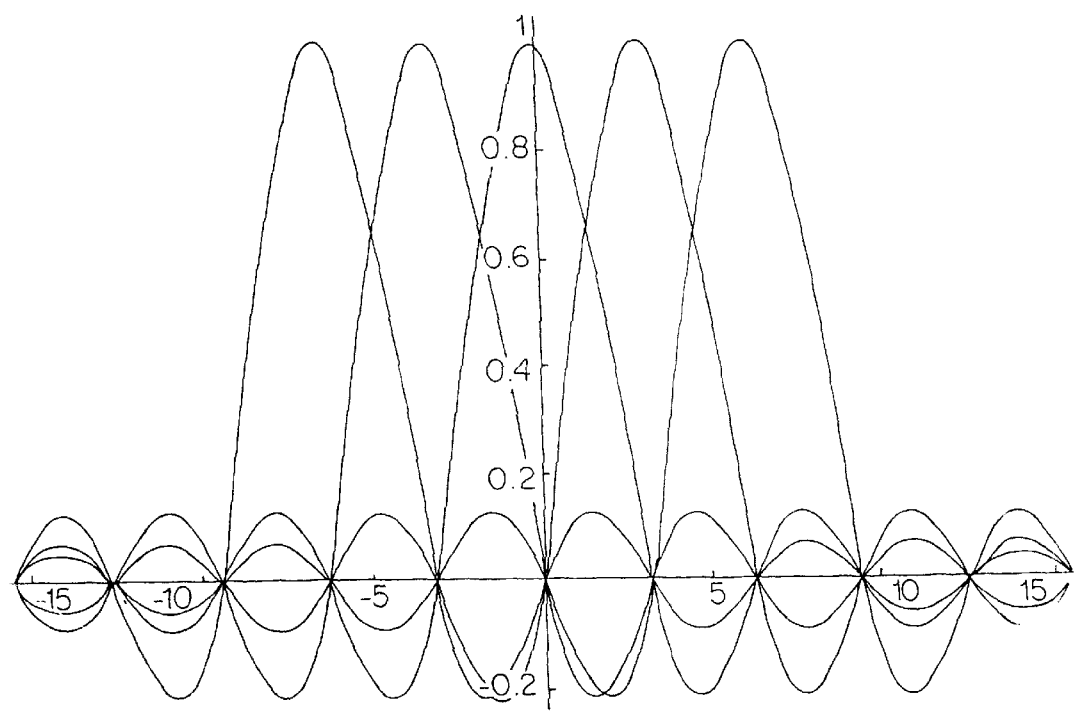
FIG. 2 shows a frequency spectrum for multiple carriers in a COFDM signal.
Figure 3:
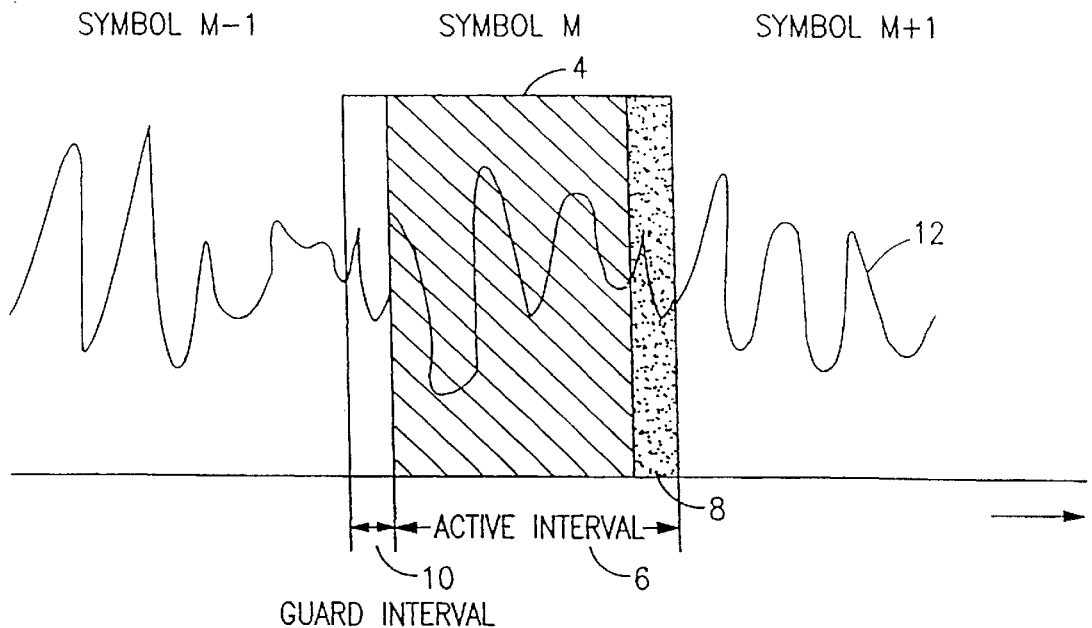
FIG. 3 is a diagram of a signal according to COFDM and shows a data symbol format.
Figure 5:
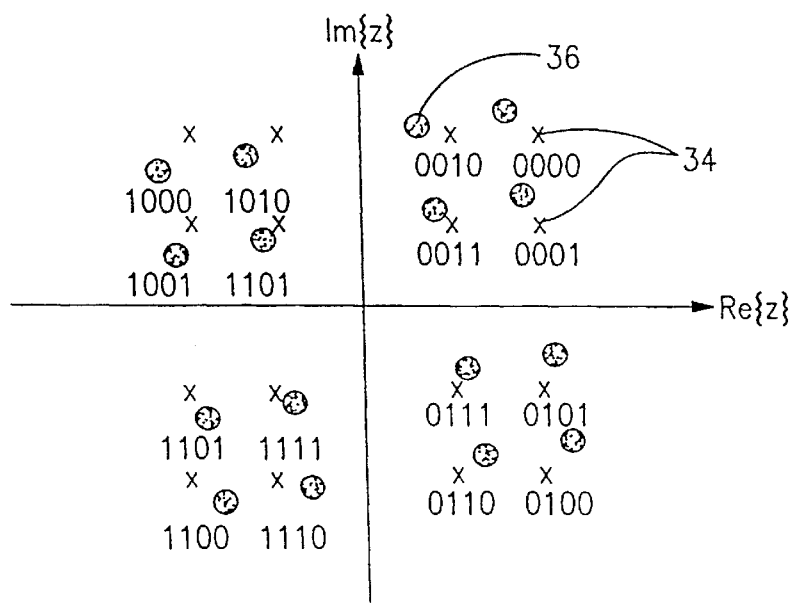
FIG. 5 illustrates certain perturbations in a COFDM signal constellation.
Figure 4:
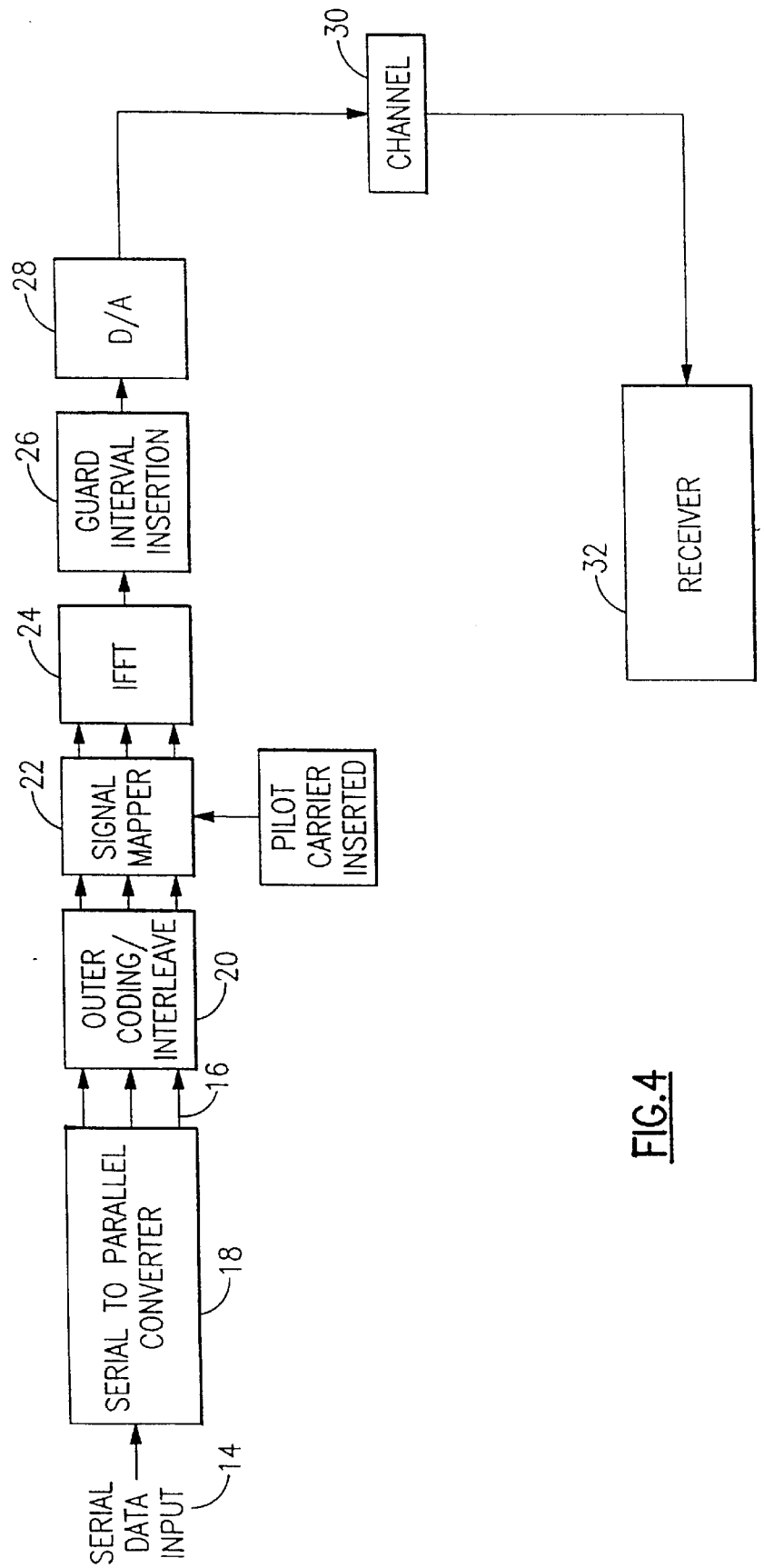
FIG. 4 is a block diagram illustrating an FFT based COFDM system.

Referring again to FIGS. 3 and 4, according to the invention a statistical method is applied to COFDM signals to find the end of the guard interval 10. This method is explained with reference to the above noted European Telecommunications Standard, but is applicable to many forms of frequency division multiplexing having prefixed or postfixed guard intervals. It allows the receiver 32 to find the end of the guard interval given only the received sampled complex signal (solid line 12) and the size of the active interval 6. The method relies on the fact that the guard interval 10 is a copy of the last part of the data symbol 4. In the receiver 32, due to echoes and noise from the channel and errors in the local oscillator, the guard interval 10 and the last part of the data symbol 4 will differ. If the errors introduced are random then a statistical method can be applied. According to the invention, the received complex signal is sampled at a rate which is nearly identical to that used in the transmitter. A difference signal is found for a pair of received samples which are separated by a period of time which is as close as possible to the active interval 6. This period should be equal to the size of the fast fourier transform ("FFT") being applied (i.e. 2048 or 8192 samples). Let $$S_i = |s_i| - |s_{i-\text{ffsize}}| \tag{14}$$

where $S_i$ is the difference signal; $s_i$ and $s_{i-\text{ffsize}}$ are the current and previous complex input samples of which the modulus is taken. That is, the subscript "i" indexes a linear time sequence of input values. Assuming that the input signal is random, then $S_i$ is also random. Within the guard interval $s_i$ and $s_{i-\text{ffsize}}$ will be similar, although not identical, due to the effects of the channel. $S_i$ will be therefore a random signal with a small dispersion. As used herein the term "dispersion" means generally the spread of values, and is not restricted to a particular mathematical definition. In general the active part of one symbol is not related to the active part of the next symbol. Outside of the guard interval $S_i$ will be random with a much larger dispersion. In order to find the end of the guard interval, the dispersion of the difference signal $S_i$ is monitored to look for a significant increase which will occur at the boundary of the guard interval 10 and the active interval 6. The inventors have also observed that a large decrease in dispersion is seen at the start of the guard interval 10.

According to a preferred embodiment of the invention samples of the input signal are stored over an interval which includes at least one symbol period $T_S$. The dispersion of the difference signal $S_i$ is calculated over a block of samples. The block is moved back in time over a number of samples, n, and the dispersion is recalculated. These two blocks are referred to herein as "comparison blocks". The ratio of a current dispersion in a first comparison block to the dispersion in a previous comparison block is found. Then, the F ratio significance test is used to find significant differences in the dispersions of the two comparison blocks. The F ratio is defined as $$F = \frac{\text{VAR}(i)}{\text{VAR}(i-n)} \tag{15}$$

where n is a positive integer, i indexes the input samples, and VAR(i) is the variance of a block of values of length N samples. Variance can be defined as $$\text{VAR}(i) = \frac{1}{N} \sum_{j=0}^{N} (S_{i-j})^2 - \left(\frac{1}{N} \sum_{j=0}^{N} S_{i-j}\right)^2 \tag{16}$$

While the F ratio significance test is used in the preferred embodiment, other functions of the two dispersion values which give a signal relating to the change in dispersion could be used. There are many such functions. An advantage of the F ratio is that for a random input signal it has a known probability distribution, allowing convenient statistical analysis for purposes of performance analysis and system design. Also the F ratio intrinsically normalizes the signal, making the result independent of the signal level.

Figure 6:
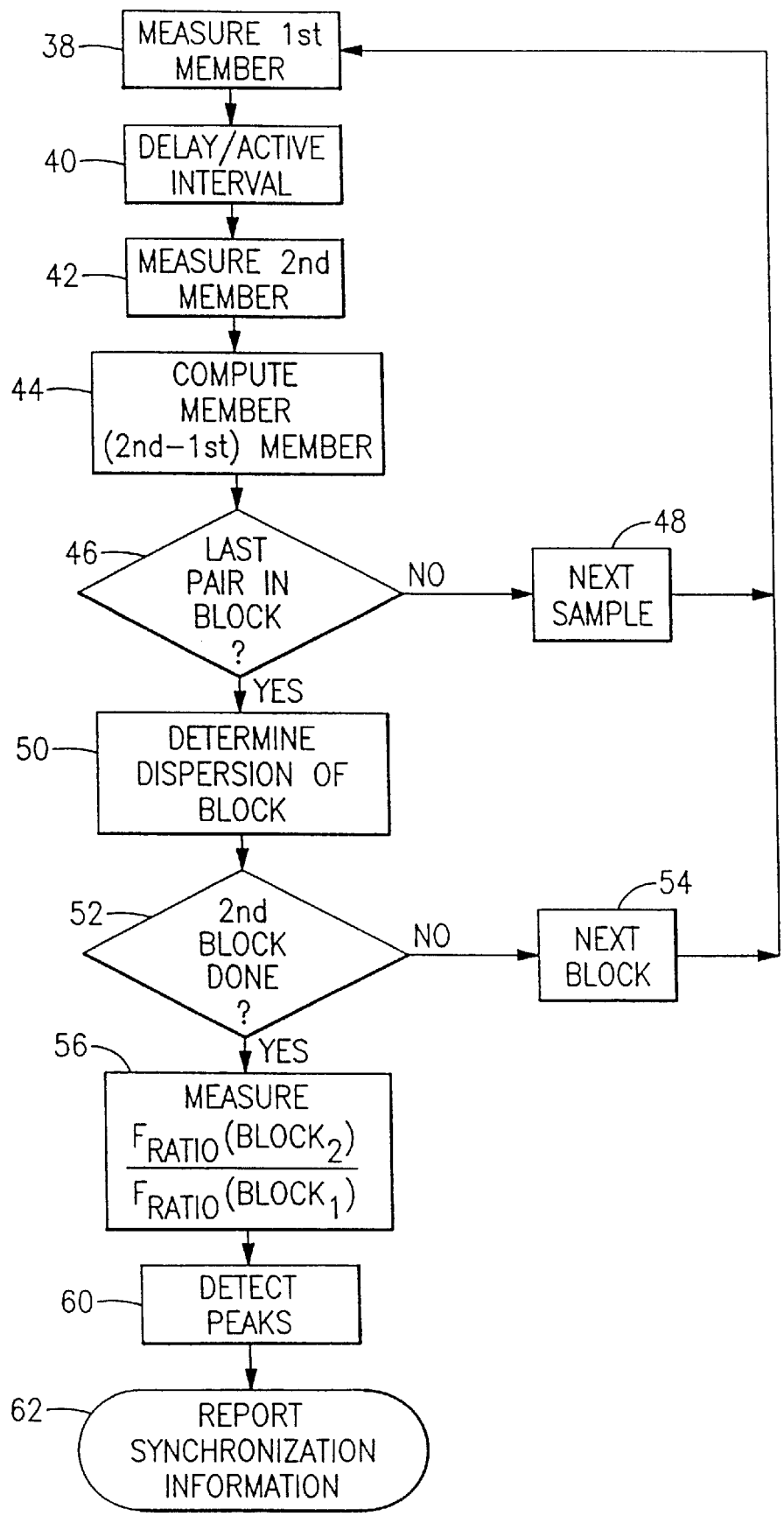
FIG. 6 is a flow diagram of a method of timing synchronization according to a preferred embodiment of the invention.

The method is disclosed with reference to FIG. 6, in which a first member of a sample pair in a current evaluation block is measured at step 38. A delay of one active interval 6 (FIG. 3) is experienced in step 40. This may be accomplished with a digital delay such as a FIFO, or equivalently by buffering samples for an active interval in a memory and accessing appropriate cells of the memory. A second member of the sample pair is measured in step 42, and the difference between the first and second member is determined and stored in step 44. The end of the current block is tested at decision step 46. The size of the evaluation block should not exceed the length of a guard interval, and may be considerably smaller. In the event the end of the current block has not yet been reached, another sample is acquired at step 48, and control returns to step 38.

If the end of the current block has been reached, the dispersion of the current block is measured in step 50, and is treated as one of two comparison blocks of data. A test is made at decision step 52 to determine if a group of two comparison blocks have been evaluated. If this test is negative, then another block of data is acquired in step 54, after which control returns to step 38. The other block of data need not be contiguous with the block just completed.

In the event the test at decision step 52 is positive, the F ratio is computed for the group of two comparison blocks at step 56. The results obtained in step 56 are submitted to peak detection in step 60. Peak detection optionally includes statistical tests of significance, as is explained hereinbelow.

If peaks are detected, then the boundary of a guard interval is established in step 62 for purposes of synchronization of the FFT window which is necessary for further signal reconstruction. If peaks are not detected, the above process is repeated with a block of samples taken from another portion of the data stream.

EXAMPLE 1

Figure 7:
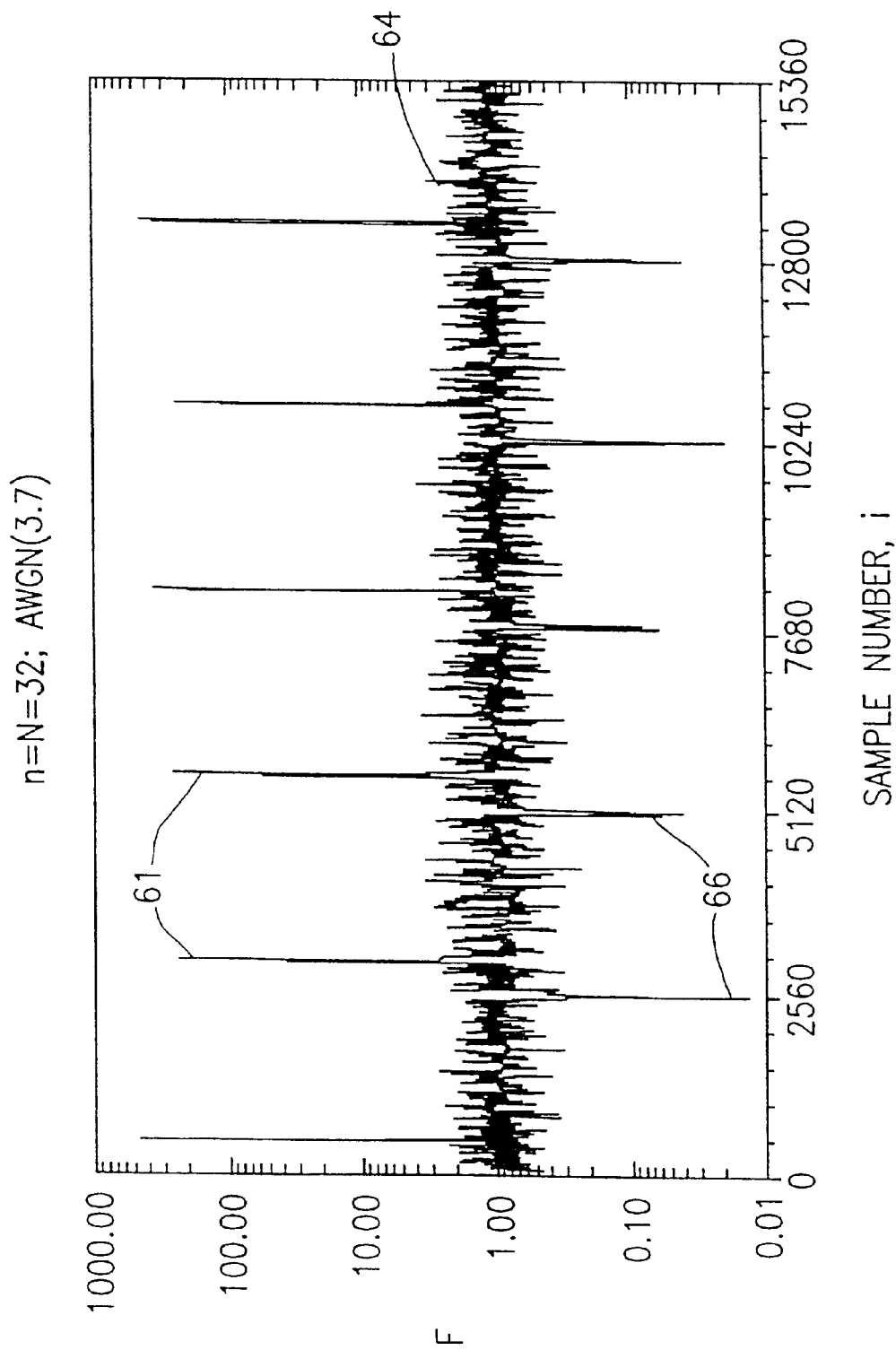
FIG. 7 is a plot of an F ratio test performed on several data symbols for coarse timing synchronization.

Referring now to FIG. 7 a complex signal was generated according to the above noted European Telecommunications standard using a random number generator, and transmitted across a Ricean channel model together with added white Gaussian noise (SNR=3.7). Data symbols were then analyzed according to the above described method. The results 6 data symbols are shown in FIG. 7, wherein the F ratio is plotted for convenience of presentation on a logarithmic axis as line 64, because the spikes 66, 68, at the beginning and end of the guard intervals respectively, are very large.

Figure 8:
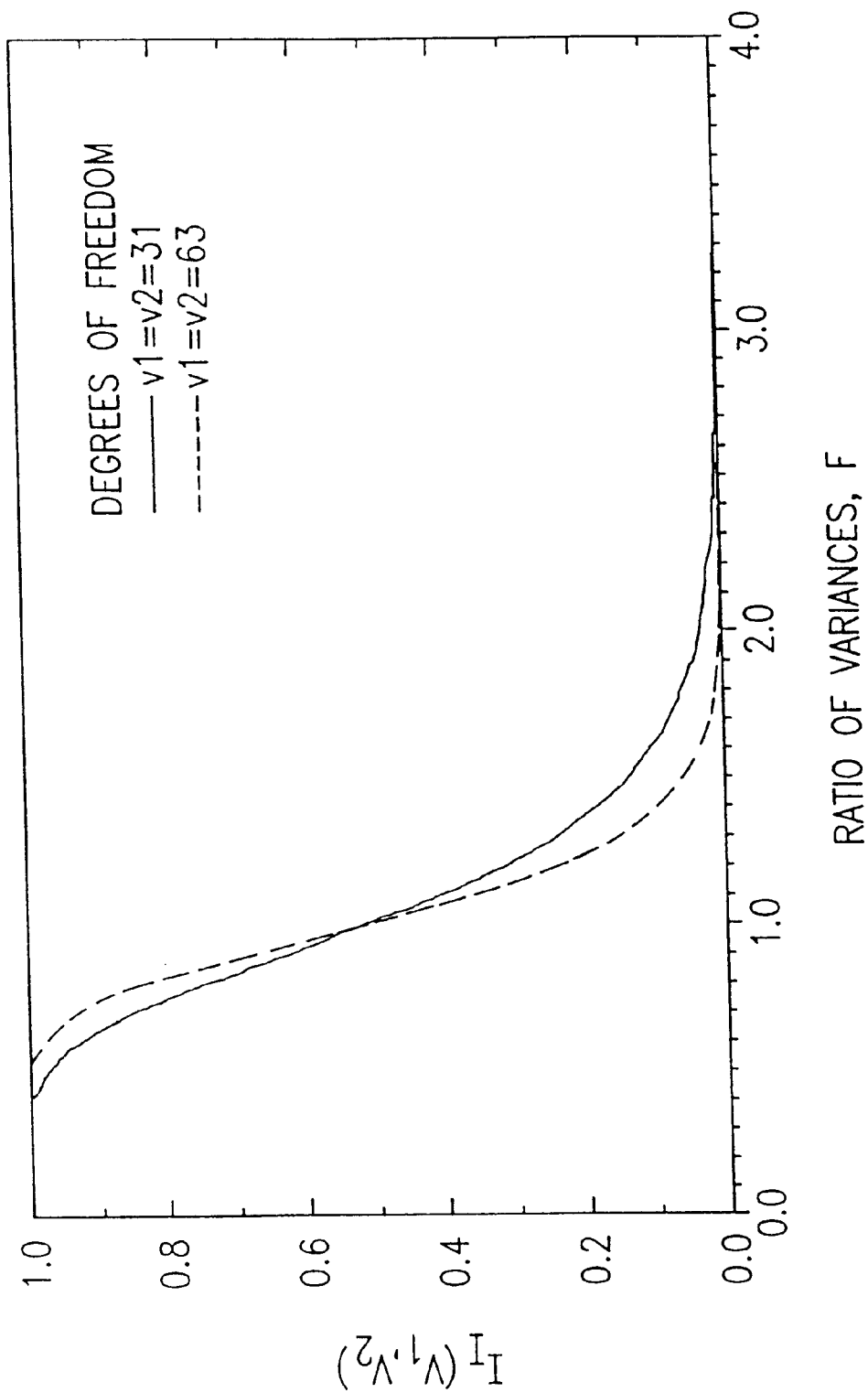
FIG. 8 is a plot of an incomplete beta function for different degrees of freedom.

Although it is quite evident from FIG. 7 that the ends of the guard intervals are easy to find using any of several well known peak detectors, it is possible to apply a statistical test to more accurately answer the question: do the two blocks of samples have the same dispersion? This is the null hypothesis, $H_0$, i.e. the dispersion is the same and the observed spike in F is due to random fluctuations only. If $H_0$ has very low probability it can be rejected, which would correspond to detection of the start or end of the guard interval. From the way the COFDM symbol is constructed $H_0$ is expected to be true for comparison blocks lying entirely within the guard interval or within the active interval, but false when the comparison blocks straddle a boundary at the start or end of the guard interval. If comparison blocks of random samples are drawn from the same population then the probability of F is given by $$Q(F|v_1, v_2) = I_x\left(\frac{v_1}{2}, \frac{v_2}{2}\right) \quad (17)$$

where I( ) is the incomplete Beta function, $$x = \frac{v_2}{v_2 + v_1 F} \quad (18)$$

and $v_1$ and $v_2$ are the number of degrees of freedom with which the first and second dispersions are estimated. In this example v1=v2=(N−1) if n>=N. The shape of the function is shown in FIG. 8. From a statistical point of view n should be sufficiently large so that the two blocks do not overlap, i.e. n>=N. If the blocks do overlap, then the calculation of the second dispersion will use samples used for the calculation of the first dispersion. This effectively reduces the number of degrees of freedom and hence the significance of the result. It has been determined that setting n=N works well.

Figure 9:
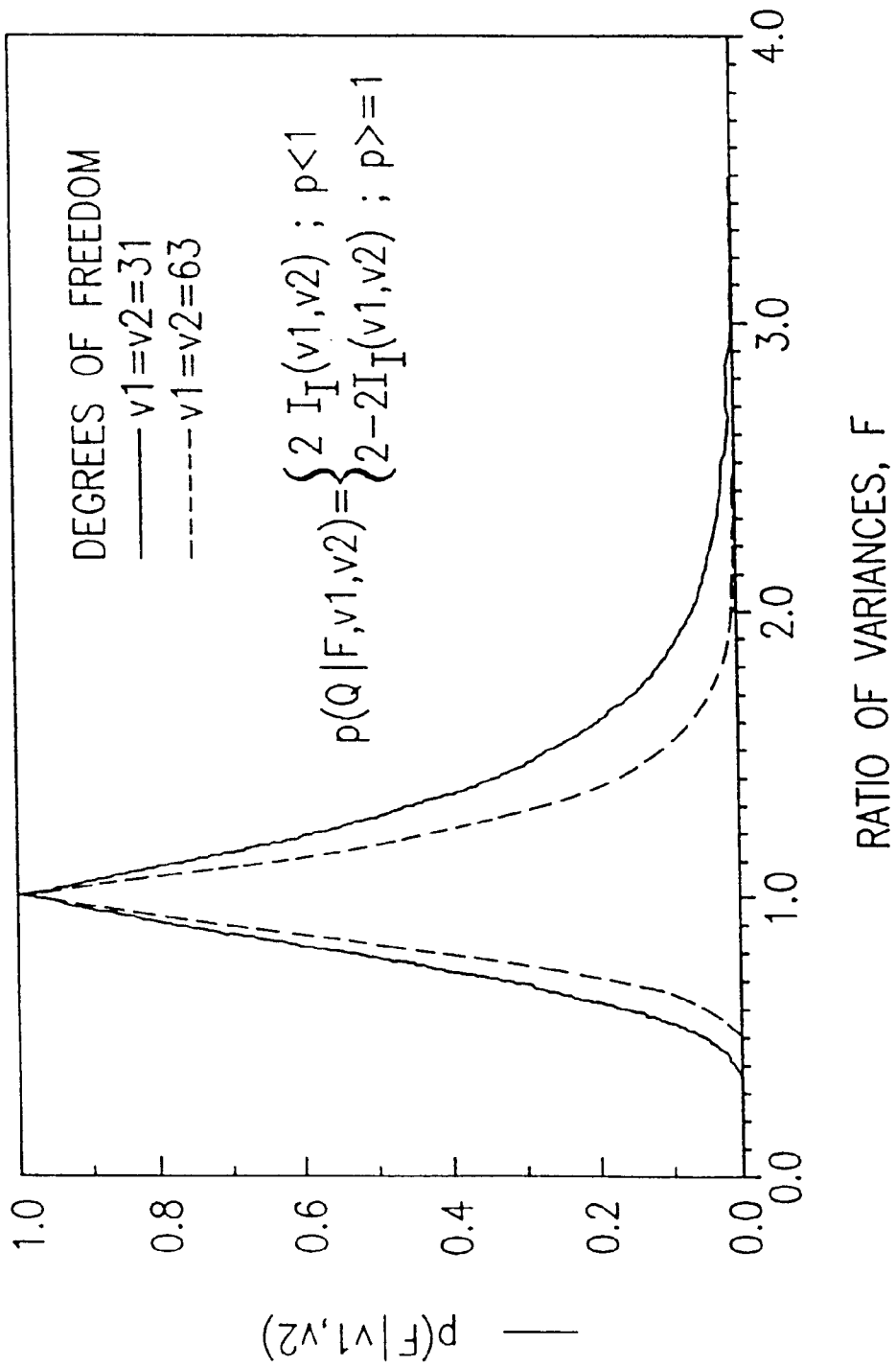
FIG. 9 is a plot helpful in understanding a test of statistical significance according to the invention.

The function Q( ) in equation (13) actually gives the one-tailed probability. $H_0$ could be rejected if F is either very large or very small, and so the two-tailed test is required. Actually the two tails are identical, so for a two-tailed test the probability is double that given in equation (13). However, this results in values of probability greater than one for F<1. The probability, p, is therefore calculated as follows:

$$p = 2I_x\left(\frac{v_1}{2}, \frac{v_2}{2}\right) \quad (19)$$

and then, if (p>1), p=2−p. This probability reflects the viability of $H_0$. Thus if p is small, $H_0$ can be rejected and it can be stated, with a specified degree of certainty, that the comparison blocks come from sample populations with different dispersion. The noted European Telecommunications Standard specification states that the block size, N, should be 32 for a correlation algorithm. N={32,64} have been successfully tried. The probability functions obtained are shown in FIG. 9 using these values for N. In the preferred embodiment p<=0.05 has been set for the rejection of $H_0$.

A precise implementation would be to calculate F, then x, then the incomplete Beta function, then p and then apply the threshold test. This algorithm would be very difficult to realize in hardware since the Beta function is very complicated. In the preferred embodiment it is much simpler, and gives the same results, to set the acceptance threshold and N parameter, and thus define an upper and lower limit for F. It is then only necessary to calculate F and compare it with the limits. In order to simply find the end of the guard interval it may be safely assumed that F>1. Only the upper limit on F is needed. To calculate the limits on F accurately, a suitable root-finding method, such as Newton-Raphson may be utilized. Typical values are given in Table 1.

TABLE 1

| p threshold | v1 = v2 = 31 | | v1 = v2 = 63 | |
| --- | --- | --- | --- | --- |
|  | F_lower | F_upper | F_lower | F_upper |
| 0.2 | 0.627419 | 1.593832 | 0.722591 | 1.383909 |
| 0.1 | 0.548808 | 1.822132 | 0.658620 | 1.518326 |
| 0.05 | 0.488143 | 2.048582 | 0.607525 | 1.646022 |
| 0.01 | 0.386894 | 2.584689 | 0.518205 | 1.929738 |
| 0.005 | 0.354055 | 2.824422 | 0.487936 | 2.049448 |
| 0.001 | 0.293234 | 3.410251 | 0.429794 | 2.326695 |
| $10^{-4}$ |  | 4.337235 |  |  |
| $10^{-5}$ |  | 5.393528 |  |  |
| $10^{-6}$ |  | 6.065896 |  |  |
| $10^{-7}$ |  | 8.002969 |  |  |
| $10^{-8}$ |  | 9.616664 |  |  |

This method has been successfully tested using the specified channel model with additive white Gaussian noise (SNR=3.7).

The formula for dispersion given in Equation (12) would require a multiplier for implementation in silicon. The calculation of F is a division in which the (N−1) normalisation constants cancel out as long as the two blocks have the same size. Accurate multiplication and division can be expensive in silicon. In the preferred embodiment simplifications have been implemented which give less accurate, but still viable, values for F. $S_i$ can be assumed to have zero mean so it is not necessary to calculate the mean from the block of samples. This also increases the number of degrees of freedom from (N−1) to N. Instead of calculating variance using the standard sum of squares formula, the dispersion can be estimated by the mean absolute deviation. The formula for VAR(i) becomes $$VAR(i) = \frac{1}{N}\left(\sum_{j=0}^{N-1} |S_{i-j}|\right)^2 \quad (20)$$

The (1/N) factor divides out in the calculation of F if the two blocks have the same size. But there still remains the division of the two dispersions and the squaring required. These can be tackled using logarithms to the base 2. Substituting from Equation (16) into Equation (11) gives $$F = \left(\frac{\sum_{j=0}^{N-1} |S_{i-j}|}{\sum_{j=0}^{N-1} |S_{i-n-j}|}\right)^2 = \left(\frac{S_a}{S_b}\right)^2 \quad (21)$$

Taking logs to the base 2 gives $$\log F = 2(\log s_a - \log s_b) = y \quad (22)$$

It is then only necessary to calculate y and compare it with the logarithm to the base 2 of the F upper limit. The comparison can be made by subtracting the log of the limit from $2(\log 2 s_a - \log 2 s_b)$ and comparing with zero. The factor of 2 can be absorbed into the limit.

Calculation of the logs to base two is relatively straightforward in hardware if the numbers are stored as fixed point fractions. The fractions can be split into an exponent and a fractional mantissa: $x = A2^B$. Taking log base 2 gives $\log x = \log A + B$. Since A is fractional it is practical to find its logarithm using a lookup table. The exponent B can be found from the position of the MSB (since $s_a$ and $s_b$ will both be positive numbers).

The calculation can thus be reduced to require only addition and subtraction arithmetic operations. The limit should also be recalculated using v1=v2=N if using this method. In practice, the significance level may be set empirically for a particular application, preferably p=0.05.

It will be appreciated by those skilled in the art that various measures of dispersion may be utilized without departing from the spirit of the invention, for example the standard deviation, skew, various moments, histograms, and other calculations known in the art.

In a first alternate embodiment of the invention, the above described method is employed using either the real or the imaginary parts of the signal instead of the modulus. This embodiment achieves economy in hardware.

In a second alternate embodiment of the invention, the n parameter of equation (11) has been optimized. At the end of the guard interval, the two blocks straddle more of the transition to the active interval, giving a well-defined increase in the dispersion. Using any value n>2 has the drawback that several successive points will give significant increases as the later block travels up to the boundary. This small problem is easily overcome by introducing a dead period after detection of the boundary. That is, once a spike has been detected a set of samples equal to the size of the FFT window is accepted before further attempts are made to locate another spike. The dead period has the added benefit of not introducing false spikes. When using larger values of n the spikes 66, 68 (FIG. 7) increase, whilst the $H_0$ noisy F signal remain much the same.

EXAMPLE 2

The maximum F-spike height as a function of n has been measured systematically together with the background variation in F. The results are shown in Table 2.

TABLE 2

| (1) n | (2) <F> | (3) $F_{s.d.}$ | (4) $F_{max}$ | (5) (4)/(3) |
|---|---|---|---|---|
| 3 | 1.0009 | 0.07 | 7.5 | 107 |
| 5 | 1.0012 | 0.10 | 10.7 | 107 |
| 10 | 1.0011 | 0.14 | 12.9 | 92 |
| 15 | 1.0014 | 0.17 | 16.7 | 98 |
| 20 | 1.0014 | 0.19 | 19.3 | 102 |
| 30 | 1.0012 | 0.23 | 20.9 | 91 |
| 40 | 0.9975 | 0.24 | 22.0 | 92 |
| 50 | 0.9926 | 0.25 | 20.4 | 81.6 |

Table 2 was developed using the first 5 frames of the signal analyzed in FIG. 7. The statistics in columns (2) and (3) of Table 2 were made by excluding any points where F>=3.0 to exclude spikes from the calculations. The spikes would otherwise affect the values of mean and standard deviation even though they are from a different statistical population.

The results indicate that the background variation in F, $F_{s.d.}$, was affected by n, increasing asymptotically to a value of approximately 0.28. It is likely that this is the effect of overlapping blocks. For example, for N=64 and n<64, the blocks over which the dispersions are calculated will contain some of the same values and therefore be correlated. To test this theory Fs.d. was evaluated for n>N, and the results are shown in Table 3.

TABLE 3

| n | $F_{s.d.}$ |
|---|---|
| 60 | 0.258 |
| 70 | 0.266 |
| 80 | 0.270 |
| 90 | 0.278 |
| 100 | 0.285 |
| 128 | 0.297 |
| 256 | 0.366 |

The dependence becomes linear at n>=N/2. If F is calculated every n samples, rather than every sample, then this dependence may be reduced. However, this creates a risk for small guard intervals of not having the first block wholly within the guard interval and the second wholly within the active interval.

Figure 10:
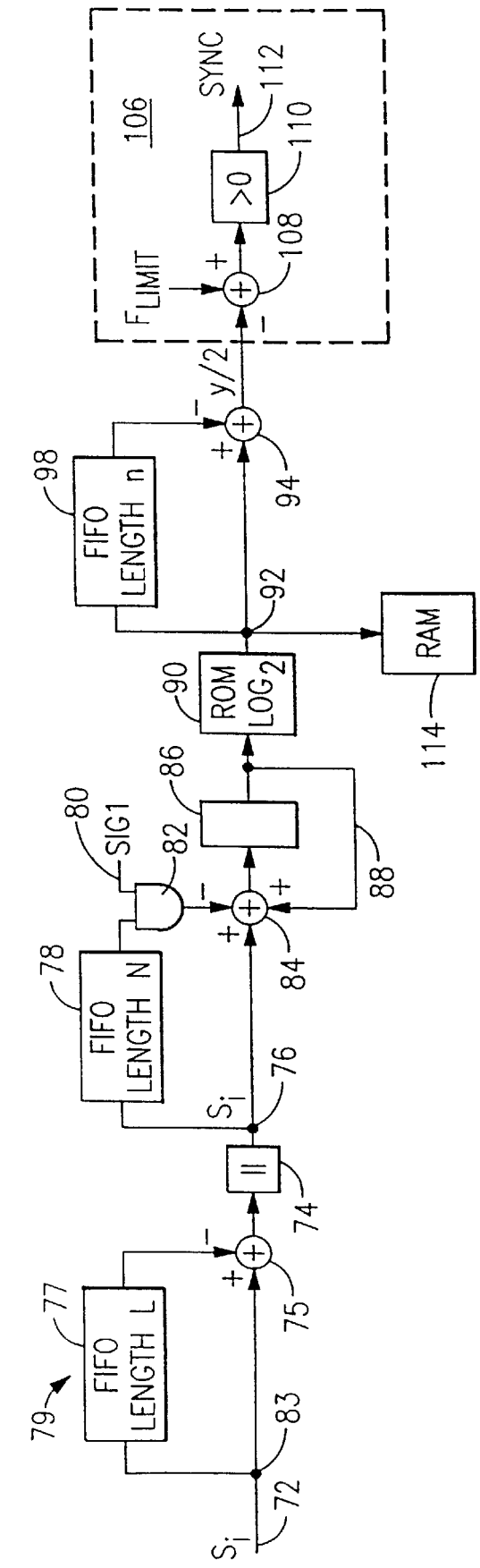
FIG. 10 is an electrical schematic of a synchronization circuit according to an alternate embodiment of the invention.

A third alternate embodiment of the invention is disclosed with reference to FIG. 10, which schematically illustrates a timing synchronization circuit 70. The circuit accepts a complex input signal 72, and includes a circuit module 74 which develops the modulus of its input, which is taken from node 83. The circuit module 74 insures that the value being subsequently processed is an unsigned number. The input to the circuit module 74 is a difference signal which is developed by a subtracter 75 which takes as inputs the input signal 72 and a delayed version of the input signal 72 which has been processed through a delay circuit 79, preferably realized as a FIFO 77 of length L, where L is the size of the FFT window. As explained above, it is also possible to operate this circuit where the input signal 72 is real, imaginary, or complex, or even the modulus of a complex number. In the case where the input signal 72 is real, or imaginary, the circuit module 74 can be modified, and can be any known circuit that removes the sign of the output of the subtracter 75, or equivalently sets the sign so that the outputs accumulate monotonically; i.e. the circuit has a unipolar output. The output of the circuit module 74 is ultimately clocked into a digital delay, which is preferably implemented as a FIFO 78. When the FIFO 78 is full, a signal SIG1 80 is asserted, and the output of the FIFO 78 becomes available, as indicated by the AND gate 82. An adder/subtracter circuit 84 is also connected to the node 76, and its output is stored in a register 86. A delayed version of the output of the adder/subtracter circuit 84 is taken from the register 86 and fed back as a second input to the adder/subtracter circuit 84 on line 88. In the event the signal SIG1 80 has been asserted, a version of the output of the circuit module 74, delayed by a first predetermined interval N, where N is the number of samples in the comparison blocks, is subtracted from the signal on node 76.

The signal on line 88 is an index into a lookup table, preferably implemented as a read-only-memory ("ROM"), and shown as ROM 90. The address of the ROM 90 contains the logarithm to the base 2 of the magnitude of the signal on line 88, which then appears at node 92. The node 92 is connected to a subtracter 94, and to a delay circuit, shown as FIFO 98, which is used to develop the denominator of the middle term of equation (17).

The subtracter 94 produces a signal which is compared against the $\log_2$ of a predetermined threshold value $F_{LIMIT}$ in a comparison circuit 106, shown for simplicity as an adder 108 connected to a comparator 110. The output signal SYNC 112 is asserted when the boundary of a guard interval has been located.

Although not implemented in the presently preferred embodiment, It is also possible to configure the size of the FIFO 77 dynamically, so that the size of the interval being evaluated can be adjusted according to operating conditions. This may conveniently be done by storing the values on the node 92 in a RAM 114 for computation of their dispersion.

Figure 11:
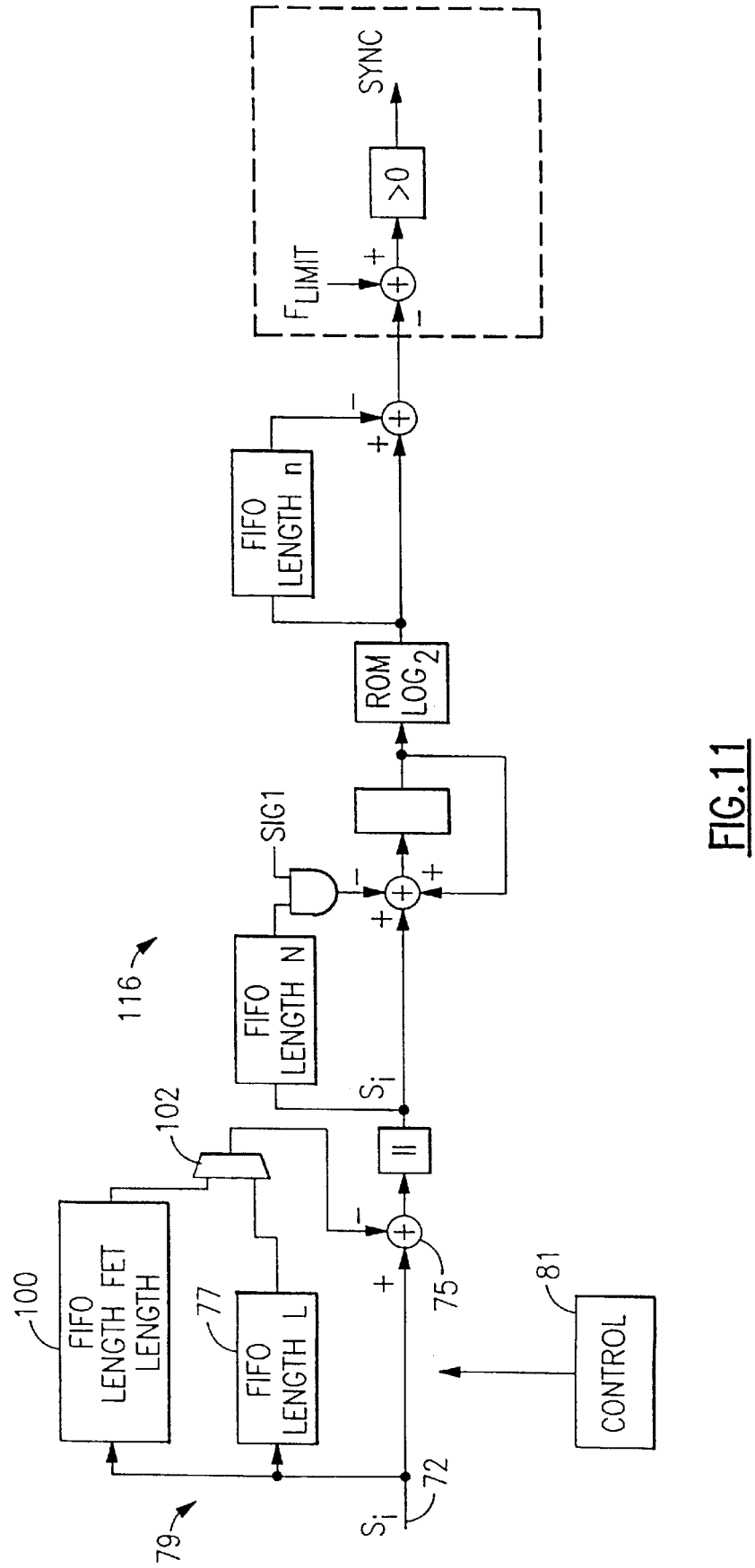
FIG. 11 is an electrical schematic of a synchronization circuit according to another alternate embodiment of the invention.

In a fourth alternate embodiment of the invention, explained with reference to FIG. 11, components similar to those of the embodiment shown in FIG. 10 have the same reference numerals. A timing synchronization circuit 116 is similar to the timing synchronization circuit 70, except now the delay circuit 79 is realized as the FIFO 77, and another FIFO 100, one of which is selected by a multiplexer 102. Both of the FIFOs 77, 100 provide the same delay; however the capacities of the two are different. The FIFO 100 provides for storage of samples taken in an interval equal to the size of the FFT window, and is normally selected in a first mode of operation, for example during channel acquisition, when it is necessary to evaluate an entire symbol in order to locate a boundary of a guard interval. In the noted European Telecommunications standard, up to 8K of data storage is required, with commensurate resource requirements. During subsequent operation, the approximate location of the guard interval boundaries will be known from the history of the previous symbols. In a second mode of operation, It is therefore only necessary to evaluate a much smaller interval in order to verify the exact location of the guard interval boundary. The number of samples used in the computation of the dispersion can be kept to a small number, preferably 32 or 64, and the much smaller FIFO 77 accordingly selected to hold the computed values. The resources saved thereby can be utilized for other functions in the demodulator, and memory utilized by the larger FIFO 100 may also be reallocated for other purposes.

A control block 81 optionally advances the evaluation interval relative to symbol boundaries in the data stream in successive symbols, and can also be used to delay for the dead period. Eventually the moving evaluation interval straddles the boundary of the current symbol's guard interval, and synchronization is then determined. The size of the evaluation interval is chosen to minimize the use of memory, yet to be large enough to achieve statistical significance in the evaluation interval. The size of the evaluation interval, and the FIFO 77 may be statically or dynamically configured.

Single Chip Implementation of a COFDM Demodulator Overview

Figure 12:
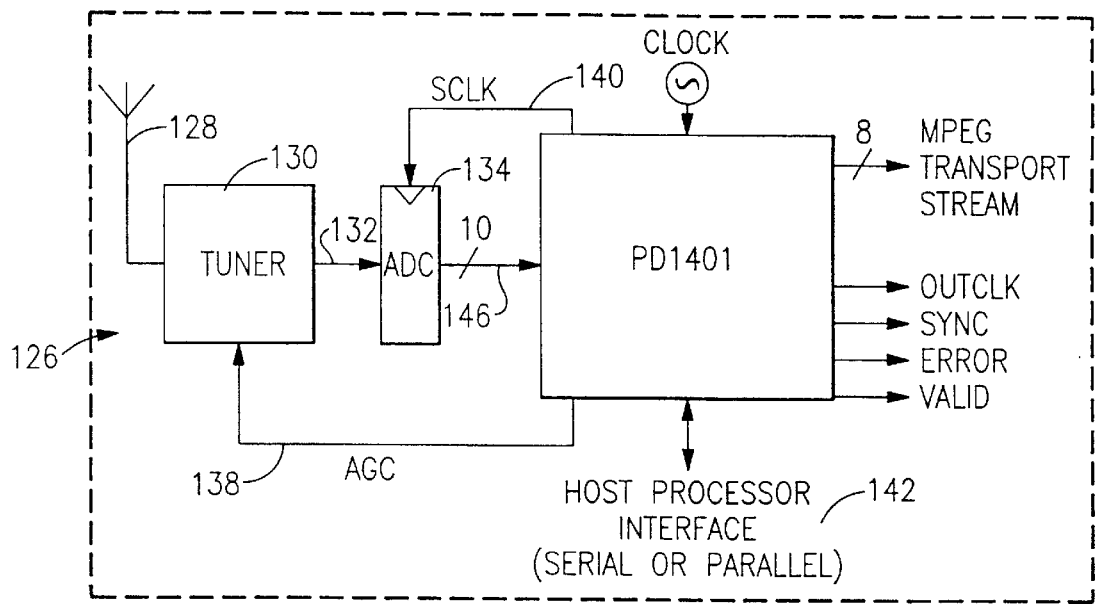
FIG. 12 is a block diagram of a single-chip embodiment of a digital receiver in accordance with the invention.

Referring initially to FIG. 12, there is shown a high level block diagram of a multicarrier digital receiver 126 in accordance with the invention. The embodiment described hereinbelow conforms to the ETS 300 744 telecommunications standard (2K mode), but can be adapted by those skilled in the art to operate with other standards without departing from the spirit of the invention. A radio frequency signal is received from a channel such as an antenna 128, into a tuner 130, which is conventional, and preferably has first and second intermediate frequency amplifiers. The output of the second intermediate frequency amplifier (not shown), is conducted on line 132 to an analog to digital converter 134. The digitized output of the analog to digital converter 134 is provided to block 136 in which I/Q demodulation, FFT, channel estimation and correction, inner and outer deinterleaving, and forward error correction are conducted. Carrier and timing recovery are performed in block 136 entirely in the digital domain, and the only feedback to the tuner 130 is the automatic gain control ("AGC") signal which is provided on line 138. A steady 20 MHz clock on line 140 is provided for use as a sampling clock for the external analog to digital converter 134. A host microprocessor interface 142 can be either parallel or serial. The system has been arranged to operate with a minimum of host processor support. In particular channel acquisition can be achieved without any host processor intervention.

Figure 14:
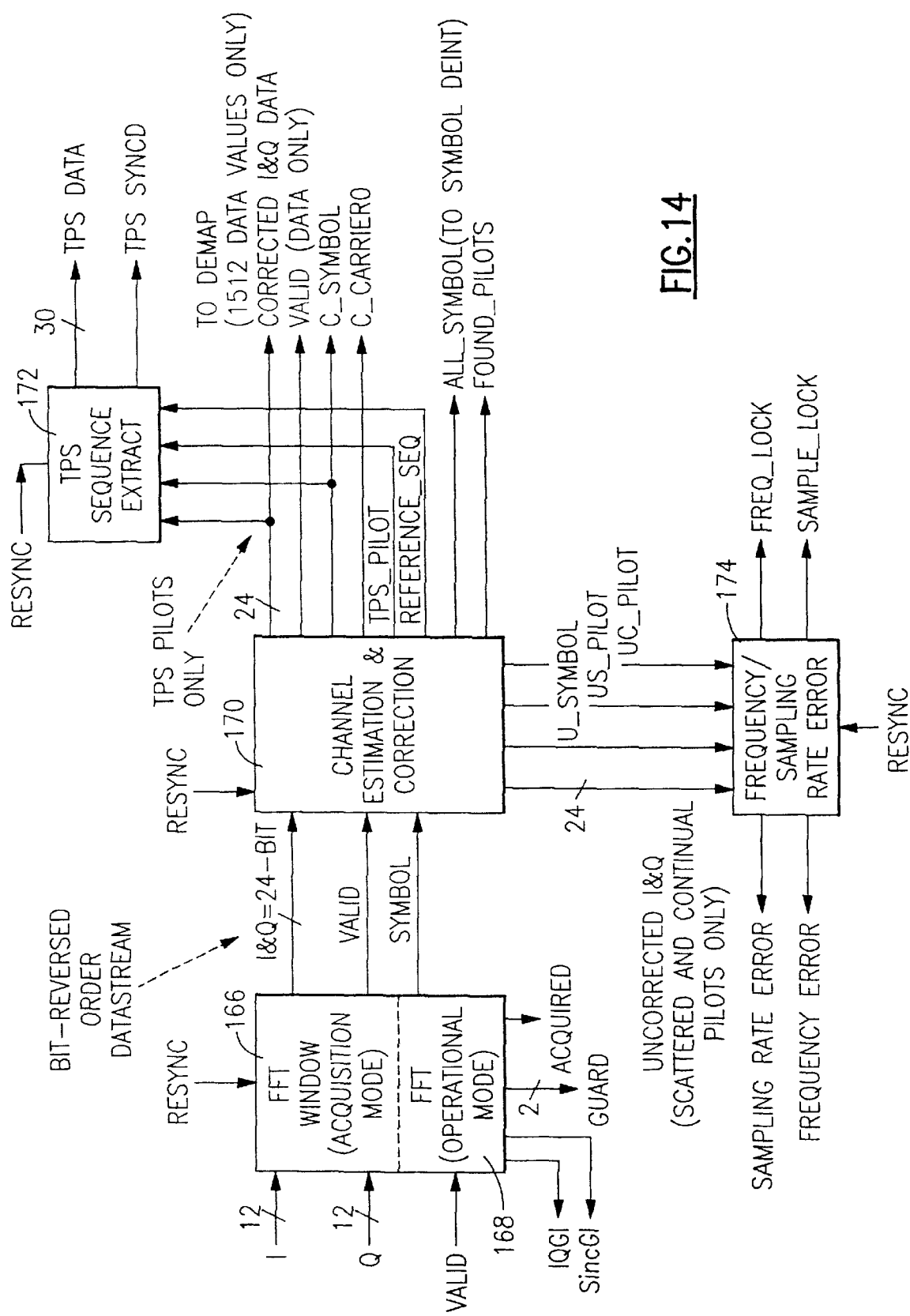
FIG. 14 is a block diagram illustrating the FFT circuitry, channel estimation and correction circuitry of the digital receiver shown in FIG. 12.
Figure 15:
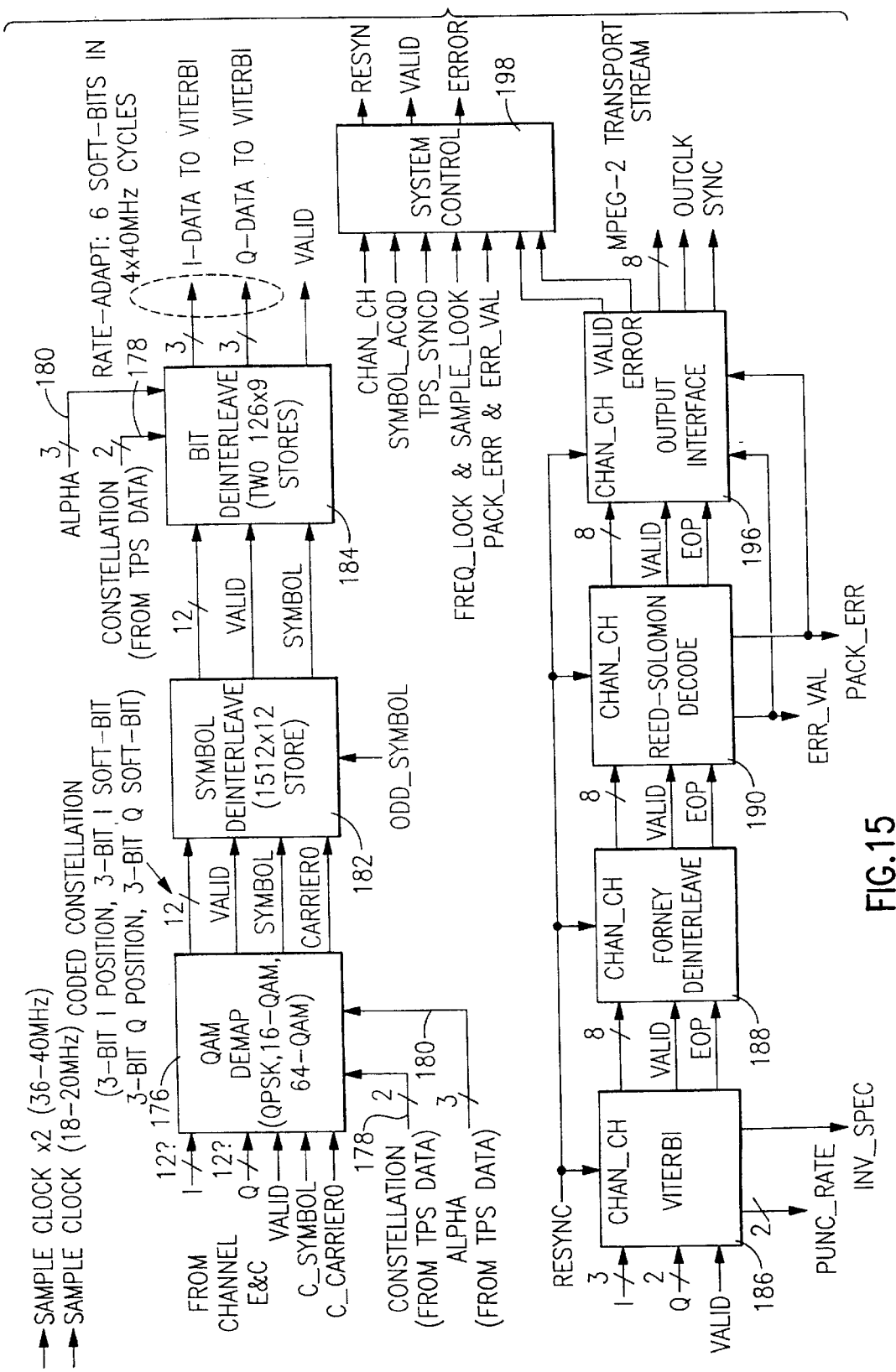
FIG. 15 is a block diagram illustrating another portion of the digital receiver shown in FIG. 12.

The functions performed within the block 136 are grouped for convenience of presentation into a front end (FIG. 13), FFT and channel correction group (FIG. 14), and a back end (FIG. 15).

Figure 13:
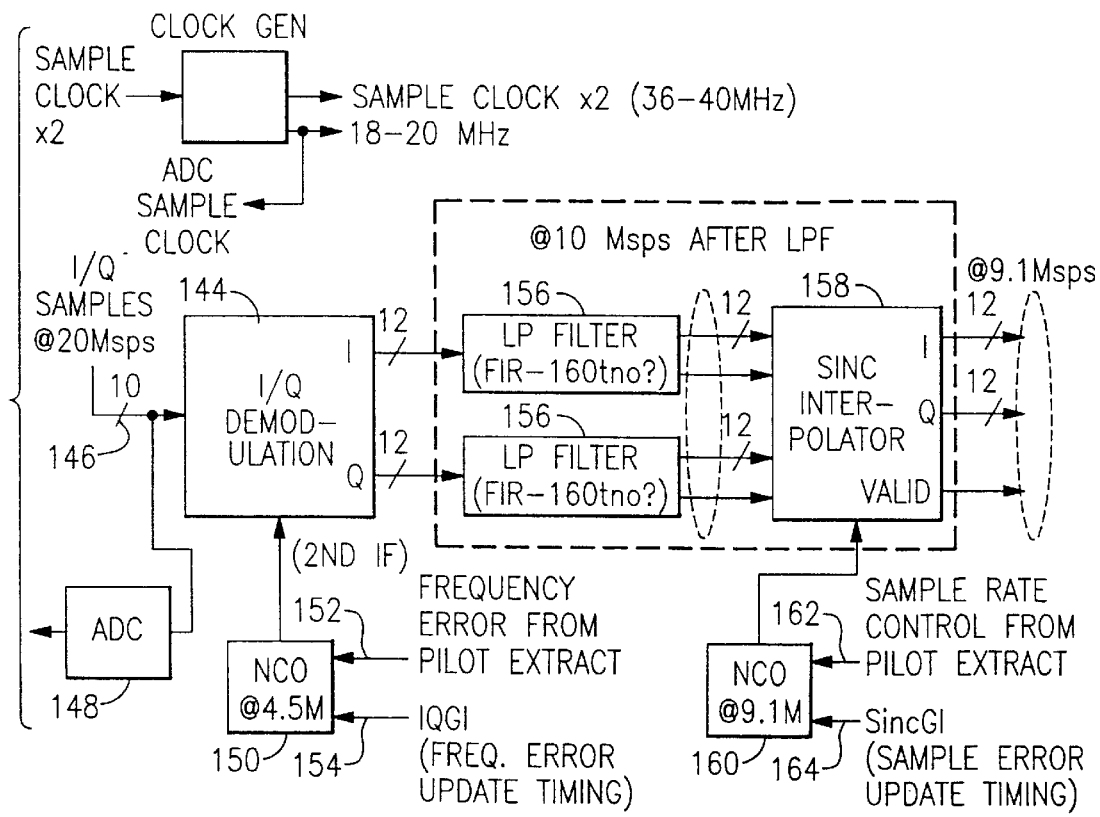
FIG. 13 is a block diagram illustrating the front end of the digital receiver shown in FIG. 12 in further detail.

As shown in FIG. 13, I/Q samples at are received by an IQ demodulator 144 from the analog to digital converter 134 (FIG. 12) on a bus 146 at a rate of 20 megasamples per second. An AGC circuit 148 also takes its input from the bus 146. A frequency rate control loop is implemented using a numerically controlled oscillator 150, which receives frequency error signals on line 152, and frequency error update information on line 154. Frequency and sampling rate control are achieved in the frequency domain, based on the pilot carrier information. The frequency error signals, which are derived from the pilot carriers, and the frequency error update information will both be disclosed in further detail shortly. The I and Q data output from the IQ demodulator 144 are both passed through identical low pass filters 156, decimated to 10 megasamples per second, and provided to a sinc interpolator 158. Sample rate control is achieved using a numerically controlled oscillator 160 which receives sample rate control information derived from the pilot signals on line 162, and receives sample error update timing information on line 164.

As shown in FIG. 14, acquisition and control of the FFT window are performed in block 166, which receives signals from the sinc interpolator 158 (FIG. 13). The FFT computations are performed in FFT calculation circuitry 168. Channel estimation and correction are performed in channel estimation and correction block 170, and involves localization of the pilot carriers, as will be described below in greater detail. The tps information obtained during pilot localization is processed in tps sequence extract block 172. Uncorrected pilot carriers are provided by the circuitry of channel estimation and correction block 170 to correction circuitry 174, which develops sampling rate error and frequency error signals that are fed back to the numerically controlled oscillators 150, 160 (FIG. 13).

Referring to FIG. 15, corrected I and Q data output from channel estimation and correction block 170 are provided to demapping circuitry 176. The current constellation and hierarchical constellation parameters, derived from the tps data, are also input on lines 178, 180. The resulting symbols are deinterleaved in symbol deinterleaver 182, utilizing a 1512×13 memory store. One bit of each cell in the memory store is used to flag carriers having insufficient signal strength for reliable channel correction. Bit deinterleaver 184 then provides deinterleaved I and Q data to a Viterbi Decoder 186, which discards the flagged carriers, so that unreliable carriers do not influence trace back metrics. A Forney deinterleaver 188 accepts the output of the Viterbi Decoder 186 and is coupled to a Reed-Solomon decoder 190. The forward error correction provided by the Viterbi and Reed-Solomon decoders is relied upon to recover lost data in the case of flagged carriers.

Figure 16:
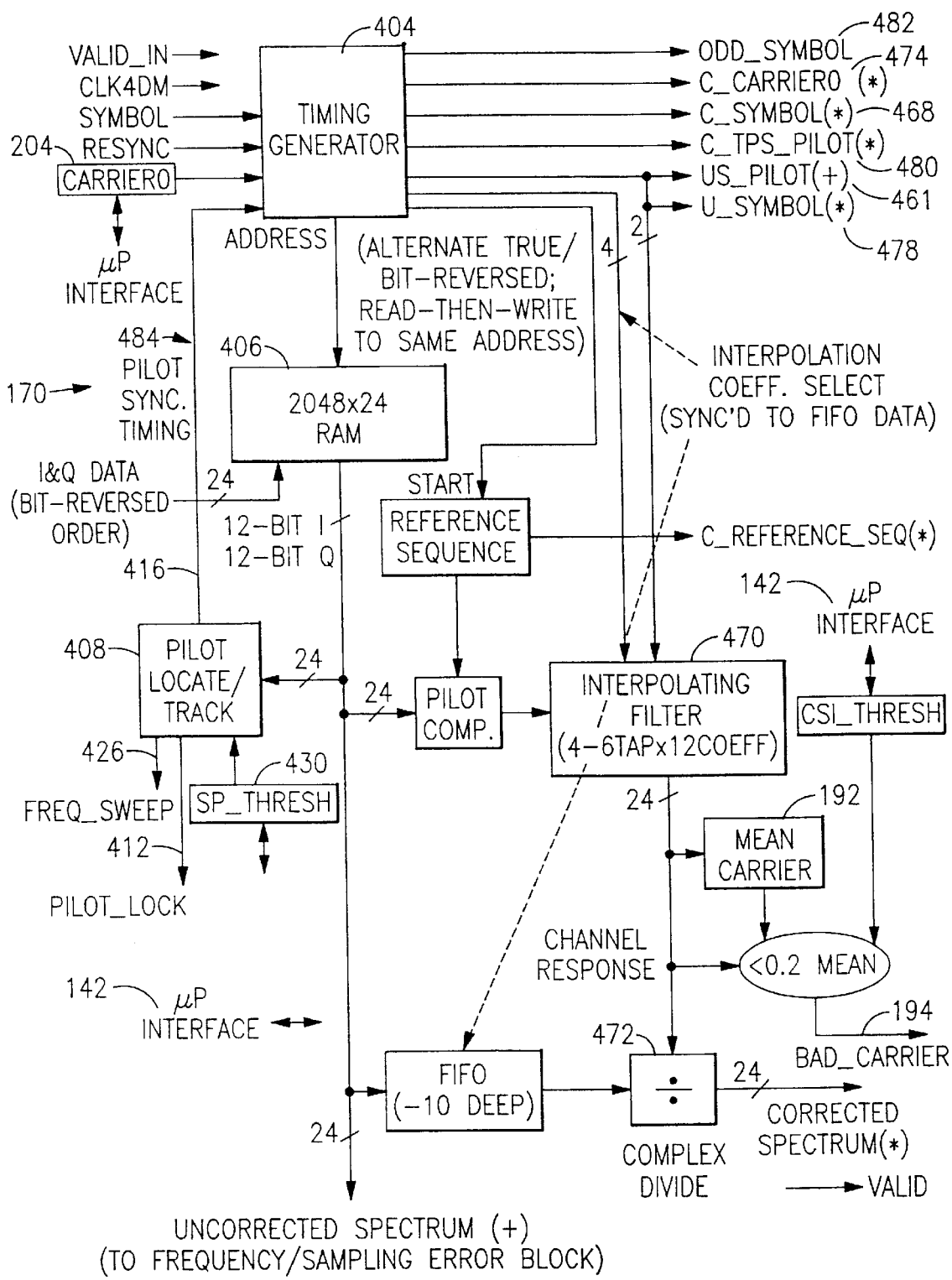
FIG. 16 is a more detailed block diagram of the channel estimation and correction circuitry shown in FIG. 14.

Referring to FIG. 16, in the presently preferred embodiment a mean value is calculated in block 192 for uncorrected carriers with reference to the previous symbol. Data carriers whose interpolated channel response falls below some fraction, preferably 0.2, of this mean will be marked with a bad_carrier flag 194. The bad_carrier flag 194 is carried through the demapping circuitry 176, symbol deinterleaver 182, and bit deinterleaver 184, to the Viterbi Decoder 186 where it is used to discard data relating to the unreliable carriers. The parameters used to set the bad_carrier flag 194 can be varied by the microprocessor interface 142.

An output interface 196 produces an output which can be an MPEG-2 transport stream. The symbol deinterleaver 182, and the bit deinterleaver 184 are conventional. The Viterbi decoder 186, Forney deinterleaver 188, Reed-Solomon decoder 190, and the output interface 196 are conventional. They can be the components disclosed in copending Application Ser. No. 638,273, entitled "An Error Detection and Correction System for a Stream of Encoded Data", filed Apr. 26, 1996, Application Ser. No. 480,976, entitled "Signal Processing System", filed Jun. 7, 1995, and Application Ser. No. 481,107, entitled "Signal Processing Apparatus and Method", filed Jun. 7, 1995, all of which are commonly assigned herewith, and are incorporated herein by reference. The operation of the multicarrier digital receiver 126 (FIG. 12) is controlled by a system controller 198.

Optionally the hierarchical constellation parameters can be programmed to speed up channel acquisition, rather than derived from the tps data.

The input and output signals and the register map of the multicarrier digital receiver 126 are described in tables 4, and 5 respectively.

Automatic Gain Control

Figure 17:
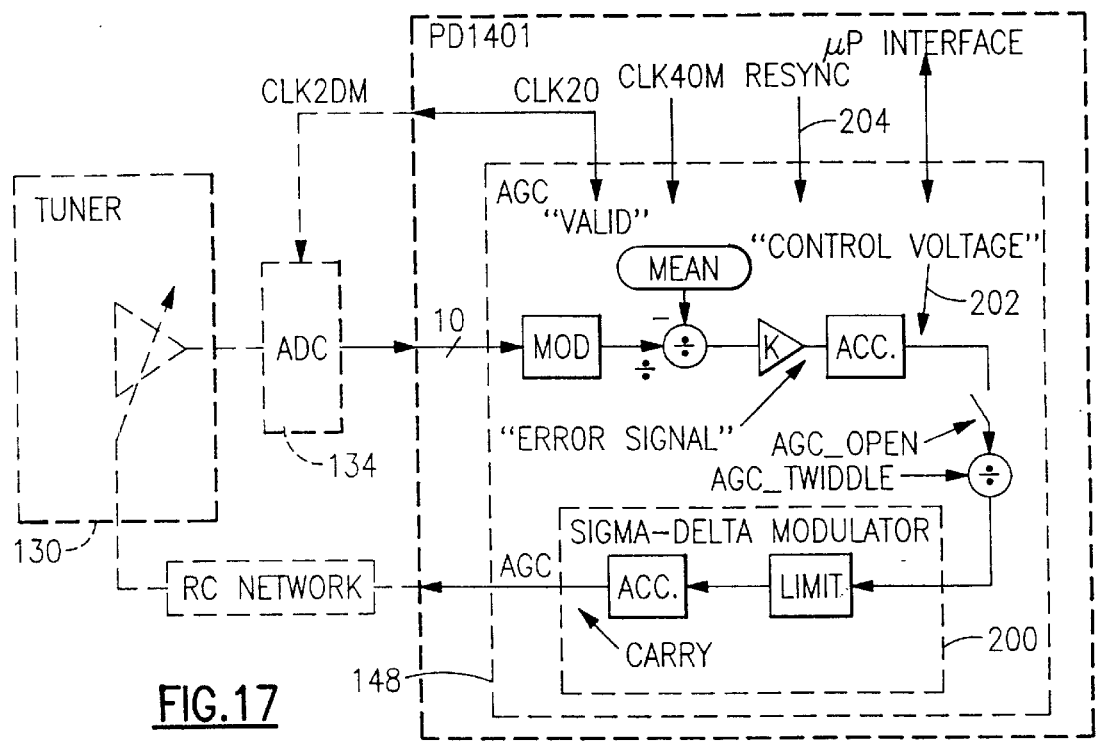
FIG. 17 is a schematic of the automatic gain control circuitry of the digital receiver shown in FIG. 12.

The purpose of the AGC circuit 148 (FIG. 13)is to generate a control signal to vary the gain of the COFDM input signal to the device before it is analog-to-digital-converted. As shown in greater detail in FIG. 17, a Sigma-Delta modulator 200 is used to provide a signal which can be used as a gain control to a tuner, once it has been low-pass filtered by an external R-C network.

The magnitude of the control voltage signal 202 is given by:

$$\text{control\_voltage} = \text{control\_voltage} - \text{error} \quad (23)$$

where $$\text{error} = K(|\text{data}| - \text{mean}) \quad (24)$$

where K is a constant (normally K<<1) which determines the gain in the AGC control loop. The mean value can be determined from the statistics of Gaussian noise, which is a close approximation to the properties of the COFDM input signal, where the input data is scaled to +/−1. The control voltage signal 202 is set back to its initial value when the signal resync 204 is set low, indicating a channel change or some other event requiring resynchronization.

The input and output signals and the registers for the microprocessor interface 142 of the AGC circuit 148 are described in tables 6, 7, and 8 respectively.

IQ Demodulator

Figure 18:
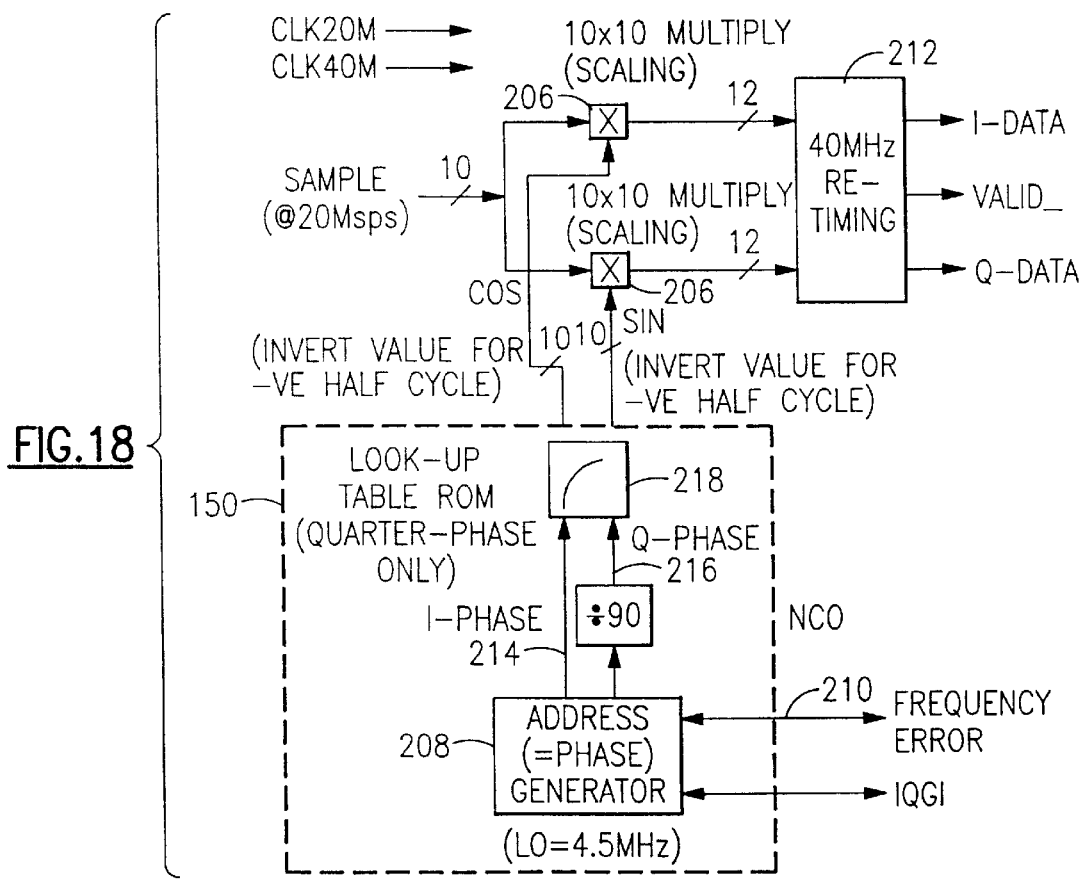
FIG. 18 is a schematic of the I/Q demodulator of the digital receiver shown in FIG. 12.

The function of the IQ demodulator 144 (FIG. 13) is to recover in-phase and quadrature components of the received sampled data. It is shown in further detail in FIG. 18.

The numerically controlled oscillator 150 generates in-phase and quadrature sinusoids at a rate of (32/7) MHz, which are multiplied with data samples in multipliers 206. The address generator208 advances the phase linearly. The frequency error input 210 increments or decrements the phase advance value. The samples are multiplied with the sinusoids in the multipliers 206using 10 bit×10 bit multiply operations. In one embodiment the IQ demodulator 144 is operated at 20 MHZ and then retimed to 40 MHz in retiming block 212. In a preferred embodiment the IQ demodulator 144 is operated at 40 MHz, in which case the retiming block 212 is omitted.

Sinusoids are generated by the address generator 208 on lines 214, 216. The phase value is employed as an address into a lookup table ROM 218. Only quarter cycles are stored in the lookup table ROM 218 to save area. Full cycles can be generated from the stored quarter cycles by manipulating the data from the ROM 218 and inverting the data in the case of negative cycles. Two values are read from the lookup table ROM 218 for every input sample—a cosine and a sine, which differ in phase by 90 degrees.

The input and output signals of the IQ demodulator 144 are described in tables 9 and 10 respectively.

Low Pass Filter

Figure 19:
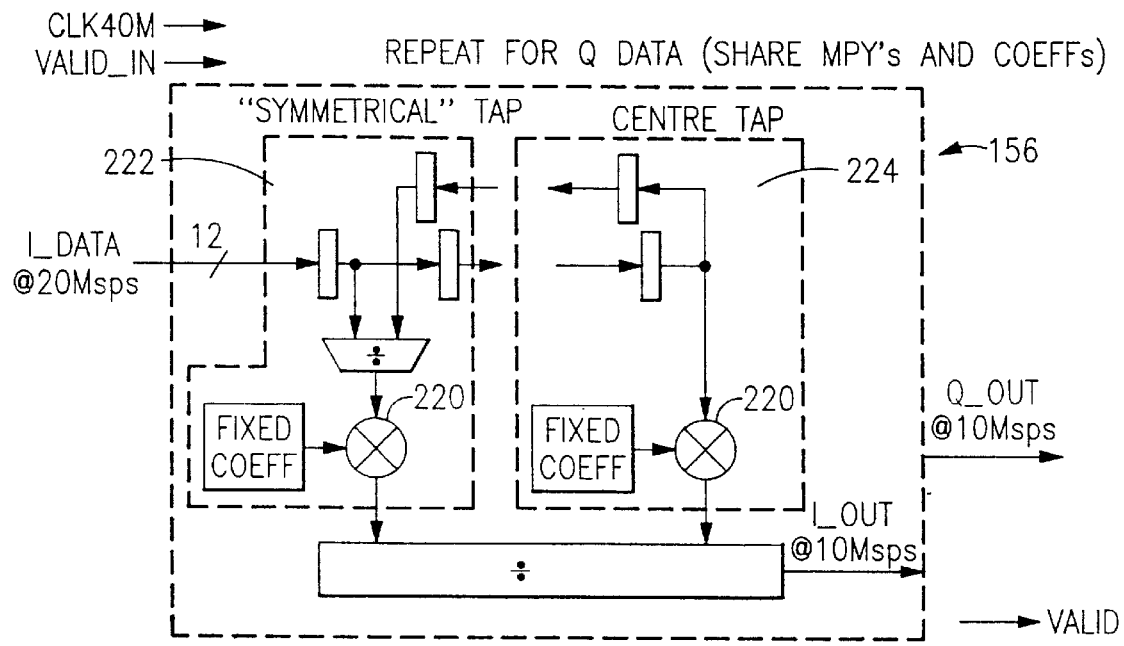
FIG. 19 illustrates in greater detail a low pass filter shown in FIG. 13.
Figure 20:
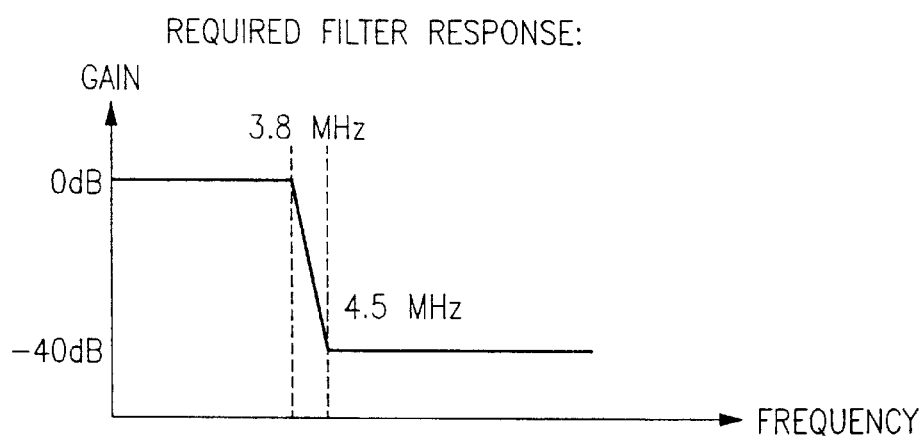
FIG. 20 shows the response of the low pass filter shown in FIG. 19.

The purpose of the low pass filters 156 (FIG. 13) is to remove aliased frequencies after IQ demodulation—frequencies above the 32/7 MHz second IF are suppressed by 40 dB. I and Q data are filtered separately. The output data is decimated to 10 megasamples per second ("Msps") because the filter removes any frequencies above ¼ of the original 20 Msps sampling rate. The filter is constructed with approximately 60 taps which are symmetrical about the center, allowing the filter structure to be optimized to reduce the number of multipliers 220. FIG. 19 is a block diagram of one of the low pass filters 156, the other being identical. FIG. 19 shows a representative symmetrical tap 222, and a center tap 224. The required filter response of the low pass filters 156 is shown in FIG. 20.

The input and output signals of the low pass filters 156 are described in tables 11 and 12 respectively.

Resampling

Referring to FIG. 13, the purpose of resampling is to reduce the 10 Msps data stream output from the low pass filters 156 down to a rate of (64/7) Msps, which is the nominal sample rate of the terrestrial digital video broadcasting ("DVB-T") modulator at the transmitter.

Figure 21:
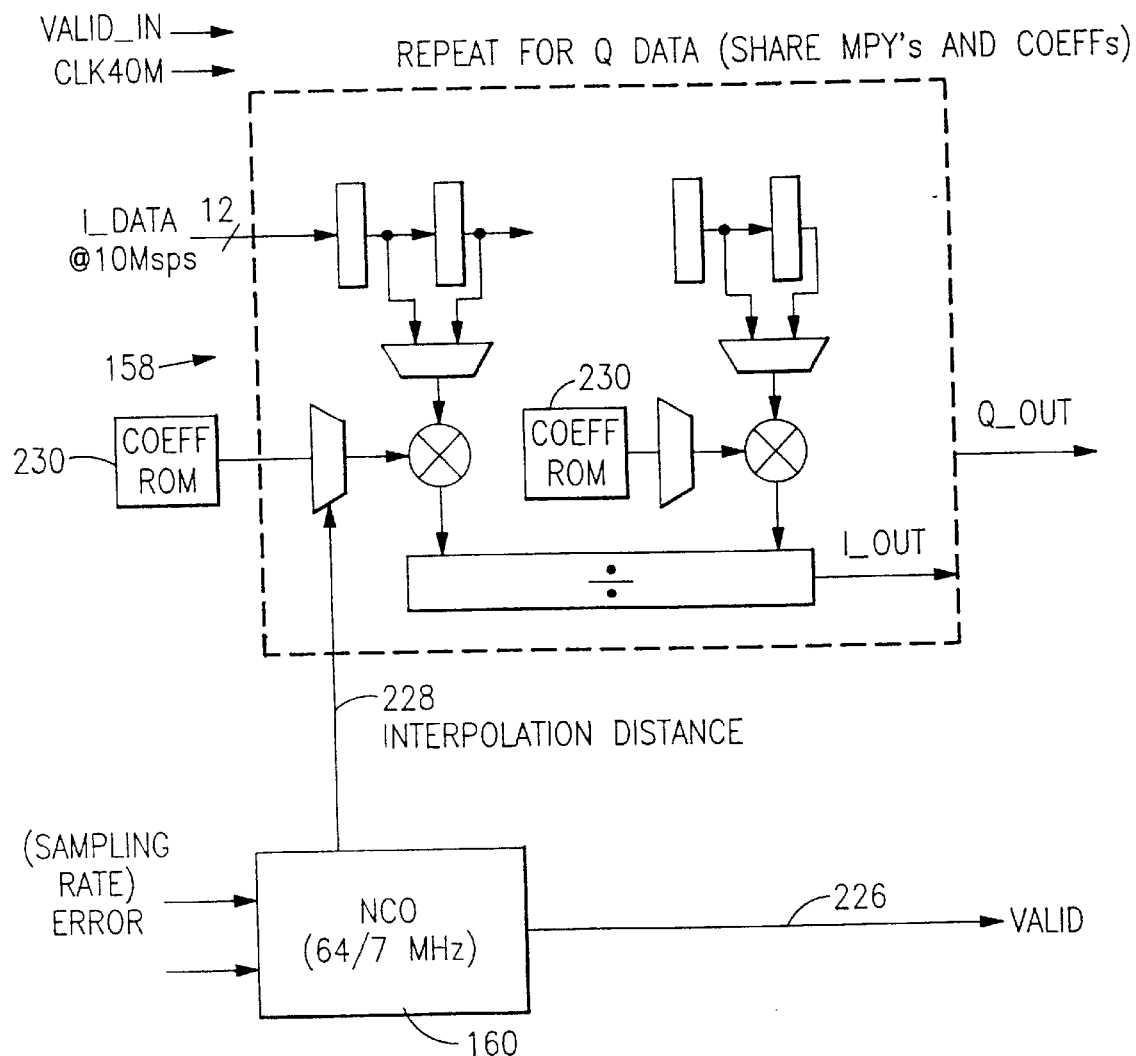
FIG. 21 shows the resampling circuitry of the digital receiver shown in FIG. 12.

Resampling is accomplished in the sinc interpolator 158, and the numerically controlled oscillator 160. The latter generates a nominal 6417 MHZ signal. The resampling circuitry is shown in further detail in FIG. 21. The numerically controlled oscillator 160 generates a valid pulse on line 226 and a signal 228 representing the interpolation distance for each 40 MHz clock cycle in which a 6417 MHz sample should be produced. The interpolation distance is used to select the appropriate set of interpolating filter coefficients which are stored in coefficient ROMs 230. It should be noted that only the sinc interpolator for I data is illustrated in FIG. 21. The structures for Q data are identical.

Figure 22:
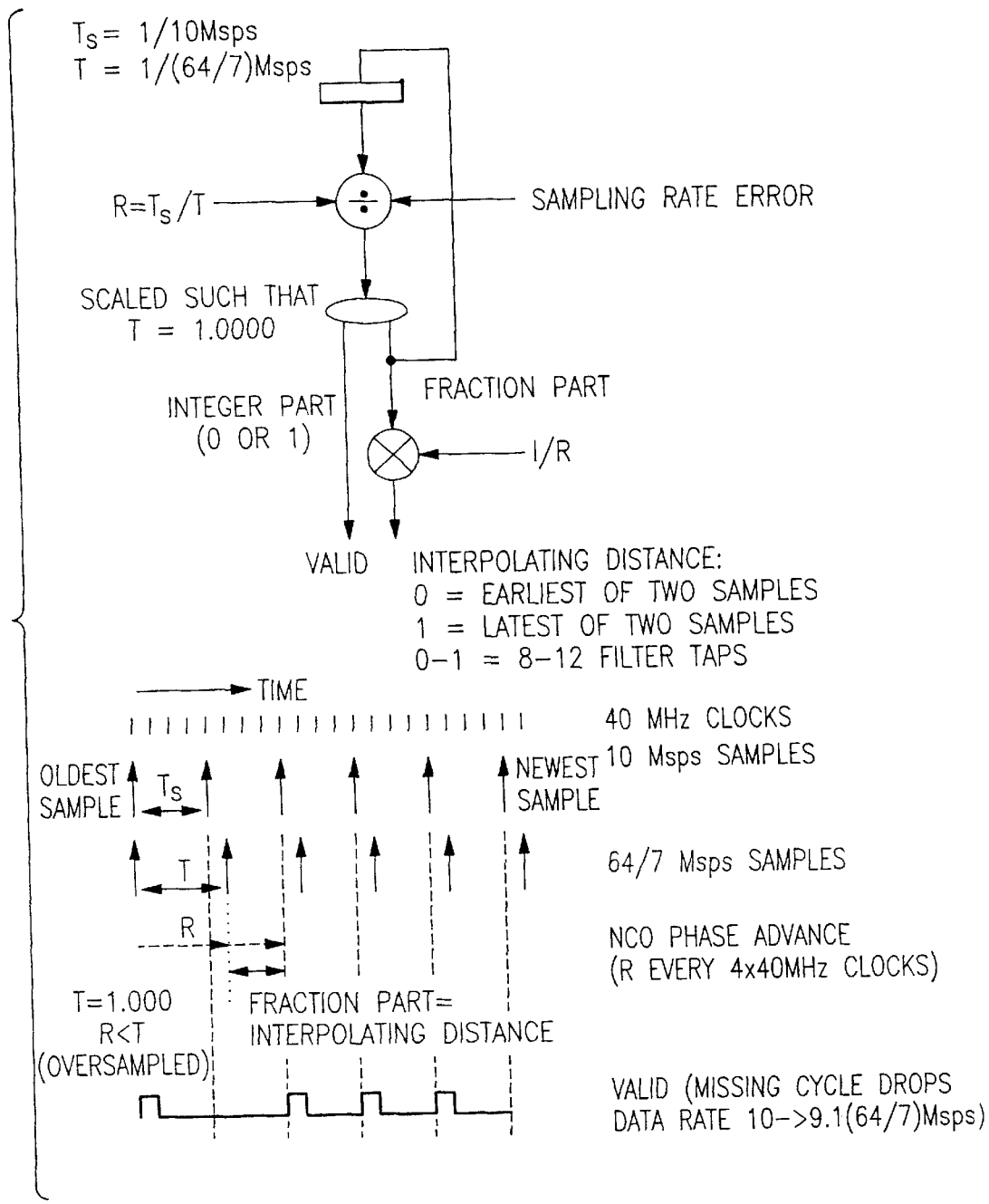
FIG. 22 illustrates a portion of an interpolator in the resampling circuitry of FIG. 21.

FIG. 22 illustrates the generation of the interpolation distance and the valid pulse. Nominally $T_S = \frac{1}{10}$ Msps, and T=1/(64/7) Msps. The sinc interpolation circuit disclosed in our noted Application Ser. No. 08/638,273 is suitable, with appropriate adjustment of the operating frequencies.

The input and output signals of the sinc interpolator 158 and the numerically controlled oscillator 160 are described in tables 13 and 14 respectively.

FFT Window

As has been explained in detail above, the function of the FFT Window function is to locate the "active interval" of the COFDM symbol, as distinct from the "guard interval". This function is referred to herein for convenience as "FFT Window". In this embodiment the active interval contains the time domain representation of the 2048 carriers which will be recovered by the FFT itself.

The FFT window operates in two modes; Acquisition and Tracking. In Acquisition mode the entire incoming sample stream is searched for the guard interval/active interval boundary. This is indicated when the F-ratio reaches a peak, as discussed above. Once this boundary has been located, window timing is triggered and the incoming sample stream is searched again for the next guard interval/active interval boundary. When this has been located the length of the guard interval is known and the expected position of the next guard/active boundary can be predicted. The FFT window function then switches to tracking mode.

This embodiment is similar to the fourth alternate embodiment discussed above in respect of the tracking mode. In tracking mode only a small section of the incoming sample stream around the point where the guard/active boundary is expected to be is searched. The position of the active interval drifts slightly in response to IF frequency and sampling rate offsets in the front-end before the FFT is calculated. This drift is tracked and FFT window timing corrected, the corrections being inserted only during the guard interval.

Figure 23:
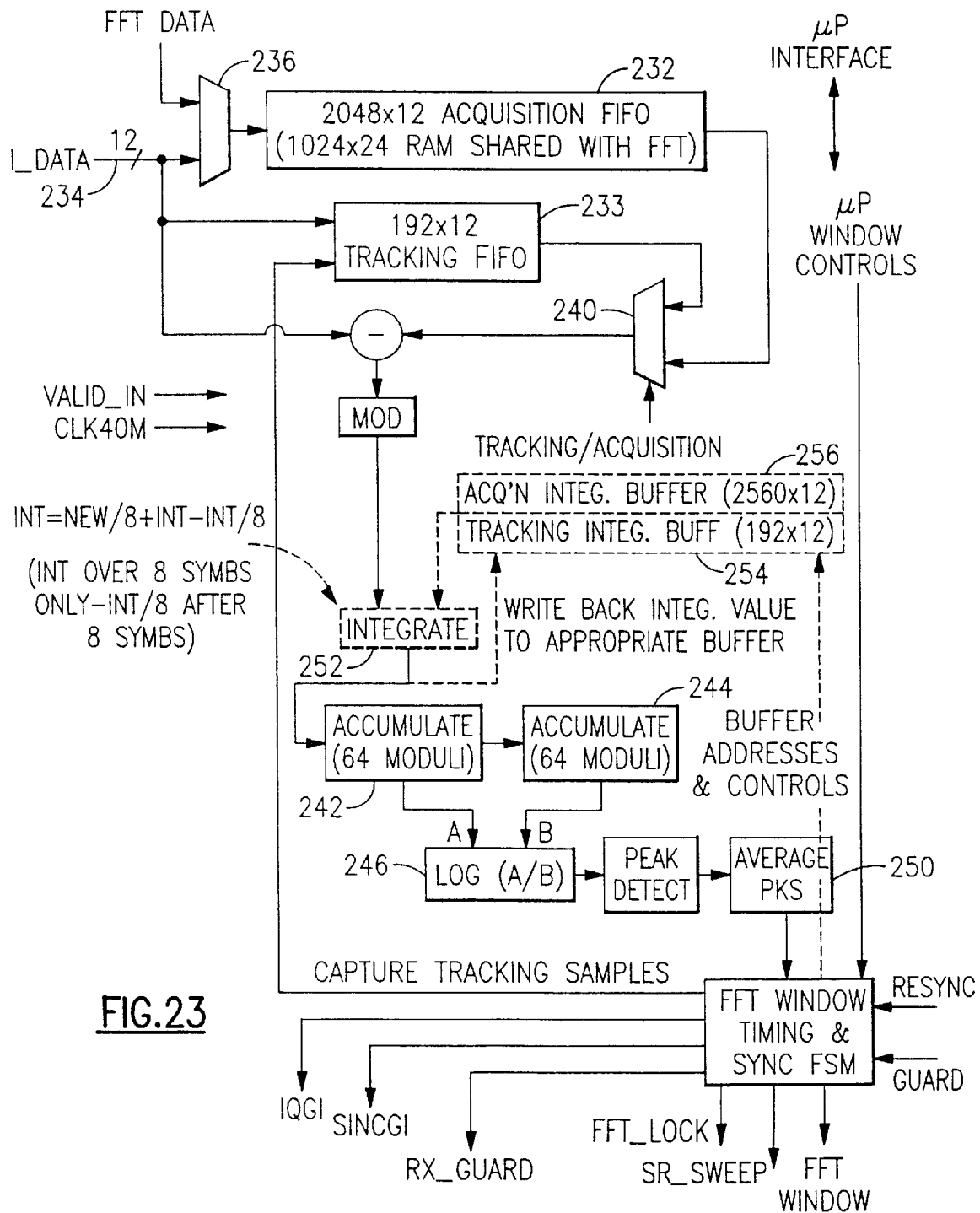
FIG. 23 is a more detailed block diagram of the FFT window circuitry shown in FIG. 14.

It will be appreciated by those skilled in the art that in a practical single chip implementation as is disclosed herein, memory is an expensive resource in terms of chip area, and therefore must be minimized. Referring to FIG. 23, during Acquisition mode the FFT calculation process is not active so hardware can be shared between the FFT Window and the FFT calculation, most notably a 1024×22 RAM 232 used as a FIFO by the FFT Window, and selected for receipt of FFT data on line 234 by a multiplexer 236. Once in Tracking mode the FFT calculation process is active so that other control loops to recover sampling rate and frequency which depend on FFT data (e.g. pilots in the COFDM symbol) can initialize. Therefore tracking mode requires a dedicated tracking FIFO 238, which is selected by a multiplexer 240.

The input and output signals, and signals relating to the microprocessor interface 142 of the FFT Window circuitry shown in FIG. 23 are described in tables 15, 16, and 17 respectively.

In one embodiment a threshold level, set from statistical considerations, is applied to the F-ratio signal (see FIG. 7) to detect the negative and positive spikes which occur at the start and end of the guard interval respectively. The distance between the spikes is used to estimate the guard interval size. Repeated detection of the positive spikes is used to confirm correct synchronization. However with this method under noisy conditions the F-ratio signal becomes noisy and the spikes are not always reliably detectable.

In another embodiment peak detection is used to find the spikes in the F-ratios. It has been found that a fixed threshold is reliable only at or exceeding about a carrier-to-noise ("C/N") ratio of 12 dB. Peak detection is generally more sensitive and more specific, with generally reliable operation generally at 6–7 dB. The maxima should occur at the end of the guard interval. The difference in time between the two maxima is checked against the possible guard interval sizes. With an allowance for noise, the difference in time indicates the most likely guard interval size and the maxima themselves provide a good indication of the start of the active part of the symbol.

Preferably this process is iterated for several symbols to confirm detection, and is expected to improve performance when the C/N ratio is low.

The data stream is passed to accumulators 242, 244, each holding 64 moduli. Conversion to logarithms and subtraction of the logarithms is performed in block 246. The peaks are detected in peak detector block 248. Averaging of the symbol peaks is performed in block 250.

In noisy conditions, the maxima may be due to noise giving possibly inaccurate indications of the guard interval length and the start of the active symbol. The general strategy to cope with this is to perform a limited number of retries.

Currently, calculation of the F-ratio is done "on the fly" i.e. only once at each point. The variance estimates are calculated from 64 values only. Under noisy conditions, the variance estimates become very noisy and the spikes can become obscured. In an optional variation this problem is solved by obtaining more values for the variance estimate, by storing the variance estimate during acquisition for each of the possible $T+G_{max}$ points in the storage block 256. The variance estimates themselves may be formed by accumulating variances for each point, and then filtering in time over a number of symbols. A moving average filter or an infinite impulse response "IIR") filter is suitable. A moving run of symbols, preferably between 16 and 32, are integrated in block 252, which increases the reliability of peak detection under noisy conditions. The storage block 256 holding the integrated F-ratio values is searched to find the maximum value. This is of length $T+G_{max}$, where $G_{max}$ is the maximum guard interval size, T/4. Preferably the memory for storage block 256 is dynamically allocated, depending on whether acquisition mode or tracking mode is operative. Any unused memory is released to other processes. Similarly in tracking mode the integrated data stream is stored in tracking integration buffer 254.

This method has been tested with up to 4 symbols, without an IIR filter, and it has been found that the spikes can be recovered. However this approach does require increased memory.

FFT Processor

The discrete Fourier transform ("DFT") has the well known formula $$x(k) = \frac{1}{L}\sum_{n=0}^{L-1} x(n)W^{nk} \quad k = 0, 1, \ldots, N-1 \qquad (25)$$

where N=the number of points in the DFT;
x(k)=the kth output in the frequency domain;
x(n)=the nth input in the time domain and $$W_L^{nk} = e^{-j(2\pi nk/L)} \qquad (26)$$

W is also known as a "twiddle factor".

For N>1000 the DFT imposes a heavy computational burden and becomes impractical. Instead the continuous Fourier transform is used, given by $$x(t) = \int_{t=-\infty}^{t=+\infty} x(t)e^{-j\omega t}\,dt \qquad (27)$$

Figure 24:
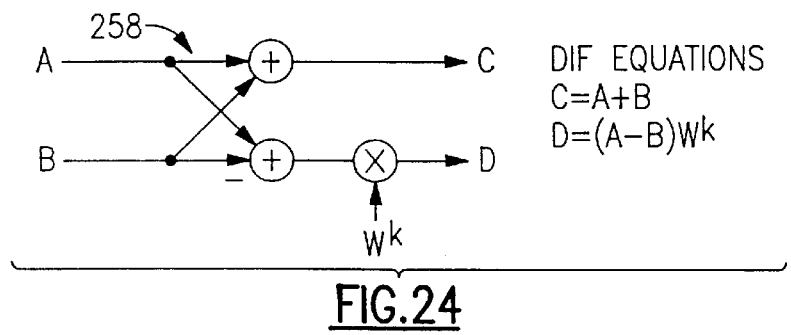
FIG. 24 is a schematic of a butterfly unit in the FFT calculation circuitry shown in FIG. 14.

The continuous Fourier transform, when computed according to the well known FFT algorithm, breaks the original N-point sequence into two shorter sequences. In the present invention the FFT is implemented using the basic butterfly unit 258 as shown in FIG. 24. The outputs C and D represent equations of the form C=A+B, and D=(A−B)$W_k$. The butterfly unit 258 exploits the fact that the powers of W are really just complex additions or subtractions.

A real-time FFT processor, realized as the FFT calculation circuitry 168 (FIG. 14) is a key component in the implementation of the multicarrier digital receiver 126 (FIG. 12). Known 8K pipeline FFT chips have been implemented with 1.5M transistors, requiring an area of 100 mm$^2$ in 0.5 $\mu$ technology, based on the architecture of Bi and Jones. Even using a memory implementation with 3-transistor digital delay line techniques, over 1 M transistors are needed. This has been further reduced with alternative architecture to 0.6

M, as reported in the document A New Approach to Pipeline FFT Processor Shousheng He and Mats Torkelson, Teracom Svensk RundRadio. DTTV-SA 180, TM 1547. This document proposes a hardware-oriented radix-$2^2$ algorithm, having radix-4 multiplicative complexity. However the requirements of the FFT computation in the present invention require the implementation of a radix $2^2$+2 FFT processor.

Figure 25:
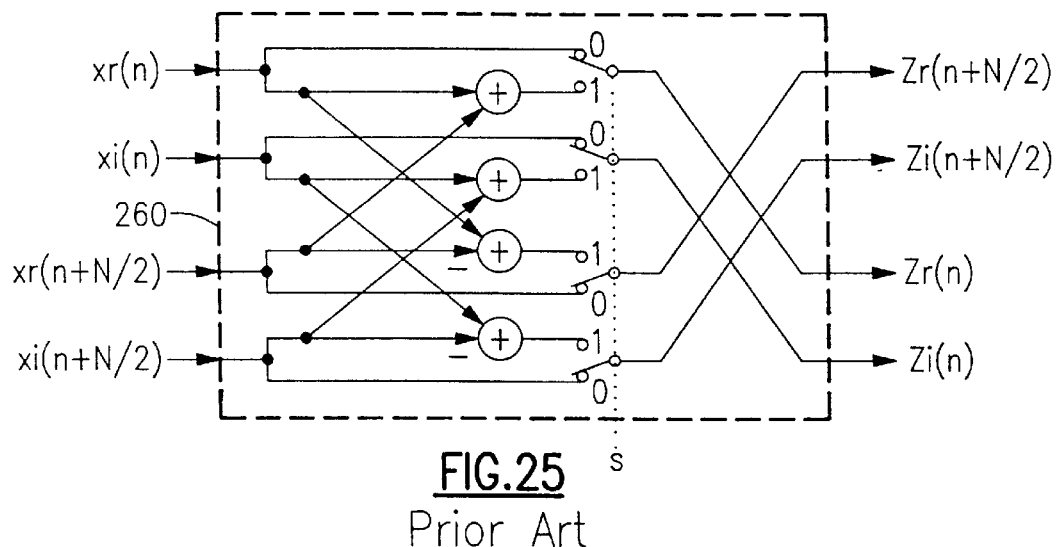
FIGS. 25 and 26 are schematics of butterfly units in accordance with the prior art.
Figure 26:
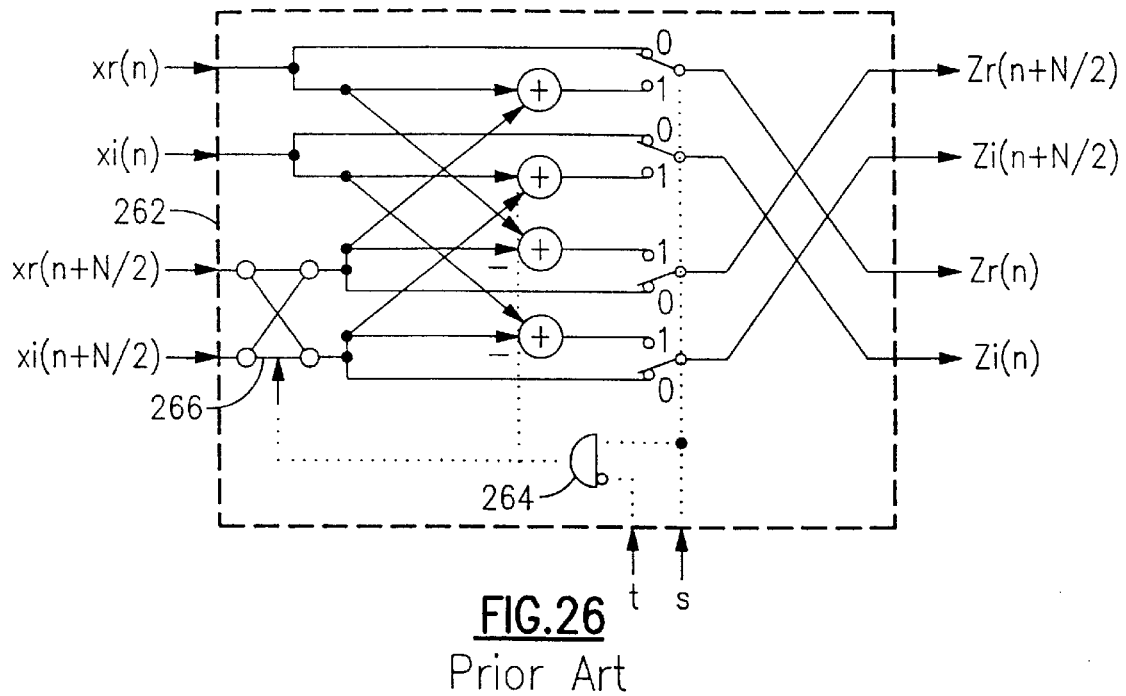

Referring to FIG. 25 and FIG. 26 the butterfly structures BF2I 260 and BF2II 262, known from the noted Torkelson publication, are shown. The butterfly structure BF2II 262 differs from the butterfly structure BF2I 260 in that it has logic 264 and has a crossover 266 for crossing the real and imaginary inputs to facilitate multiplication by –j.

Figure 27A:
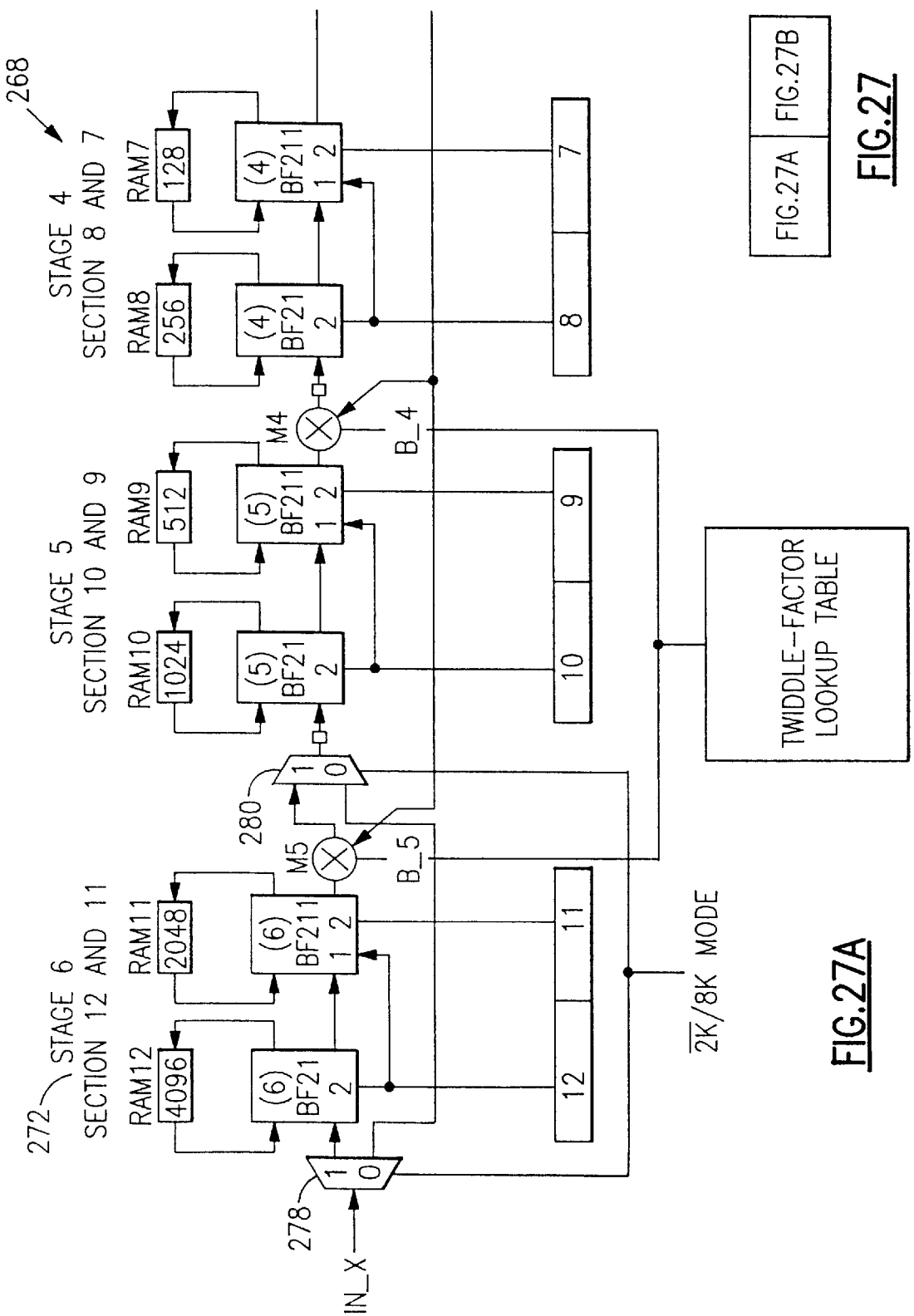
FIGS. 27A–B is a schematic of a radix $2^2+2$ FFT processor in accordance with the invention.
Figure 27B:
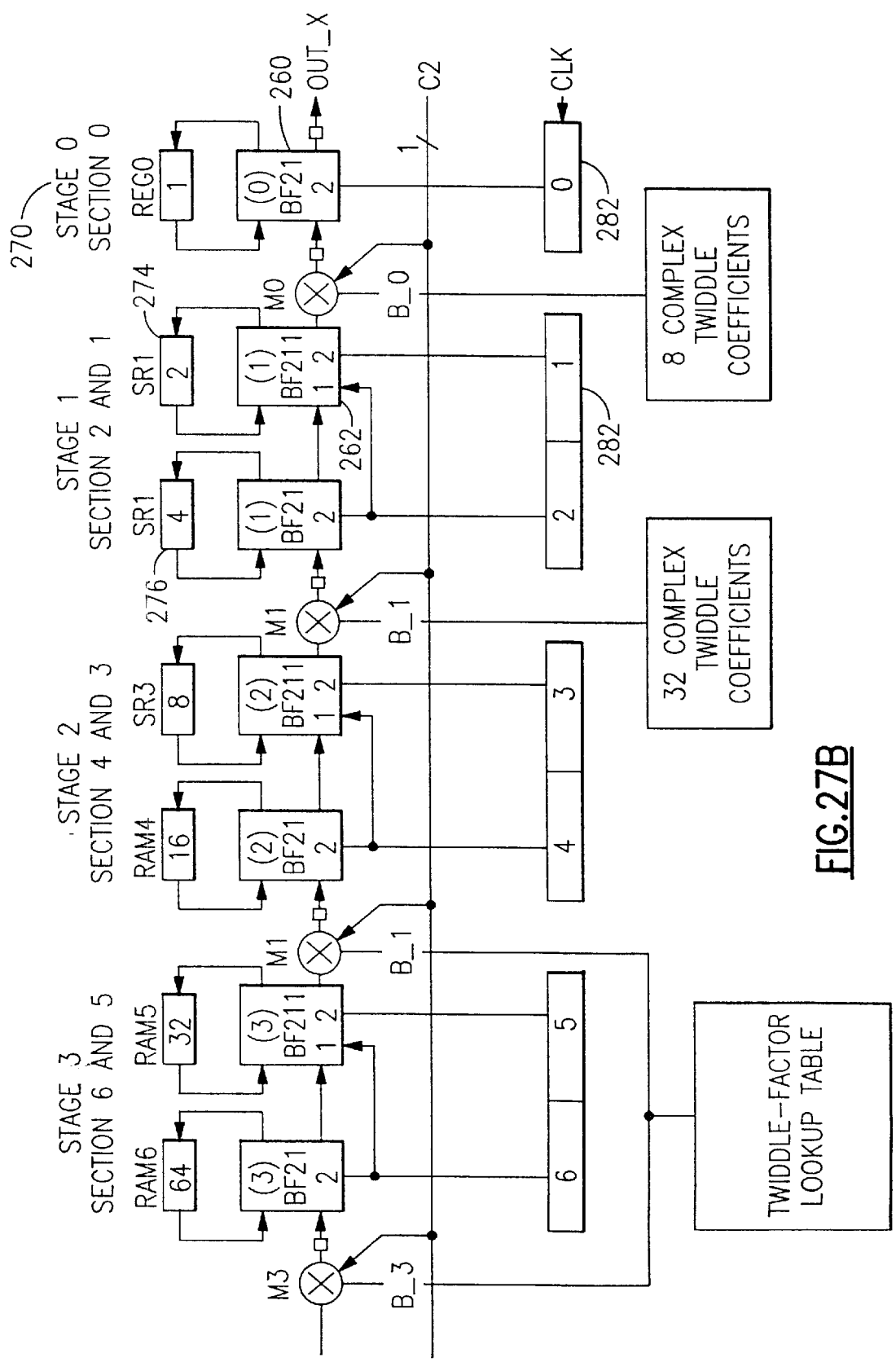

FIG. 27 illustrates the retimed architecture of a radix $2^2$+2 FFT processor 268 in accordance with the invention, which is fully pipelined, and comprises a plurality of stages, stage-0 270 through stage-6 272. Except for stage-0 270, the stages each comprise one butterfly structure BF2I 260 and one butterfly structure BF2II 262, and storage RAMS 274, 276 associated therewith. stage-0 270 only has a single butterfly structure BF2I 260. This architecture performs a straight-forward 32-point FFT. stage-6 272 has control logic associated therewith, including demultiplexer 278 and multiplexer 280, allowing stage-6 272 to be bypassed, thus providing a 2K implementation of the FFT. Counters 282 configure the butterfly structures BF2I 260 and BF2II 262 to select one of the two possible diagonal computations, during which data is being simultaneously written to and read from the storage RAMS 274, 276.

Figure 28A:
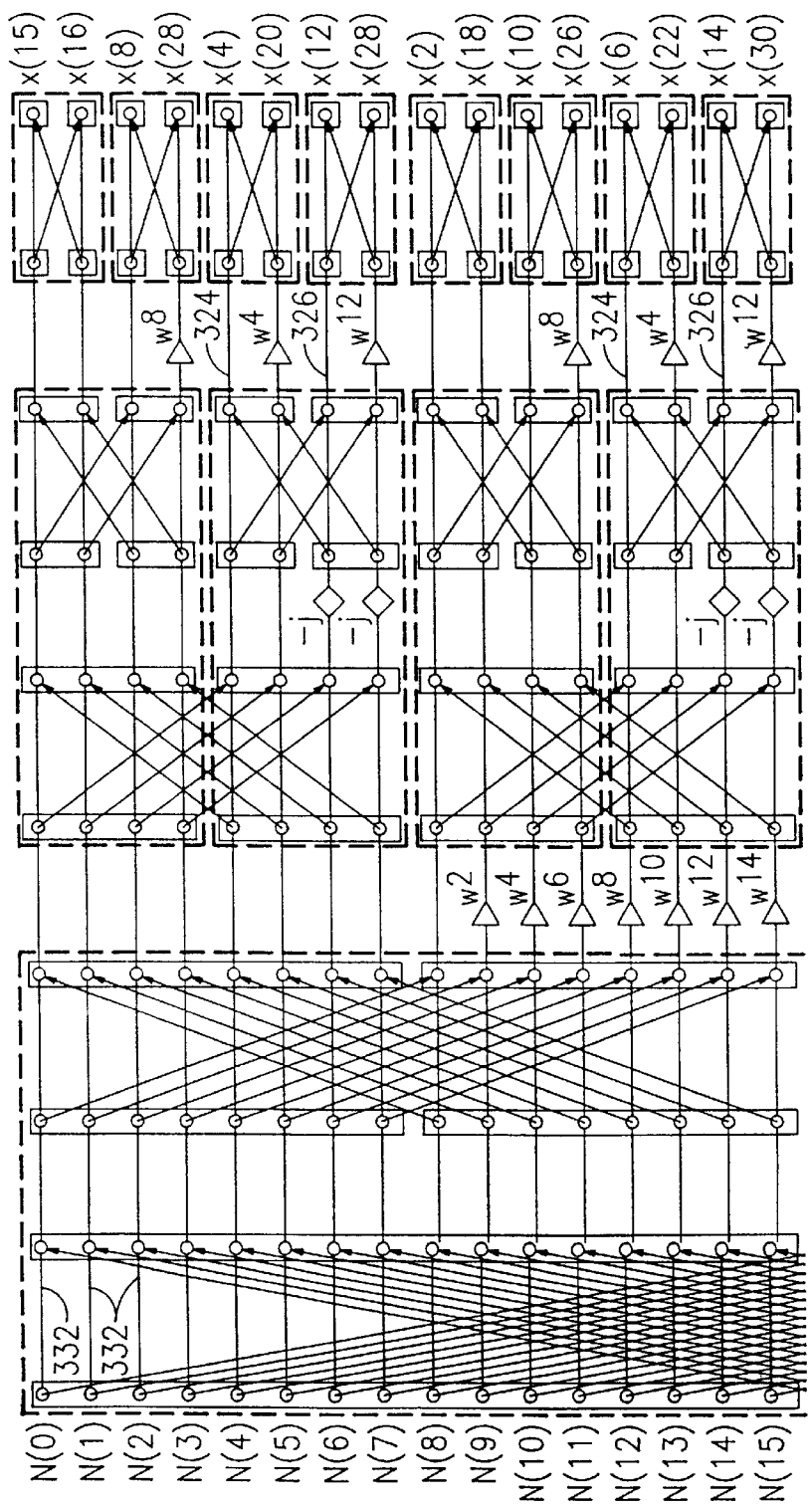
FIGS. 28 A–B is 32 point flow graph of the FFT processor shown in FIG. 27.
Figure 28B:
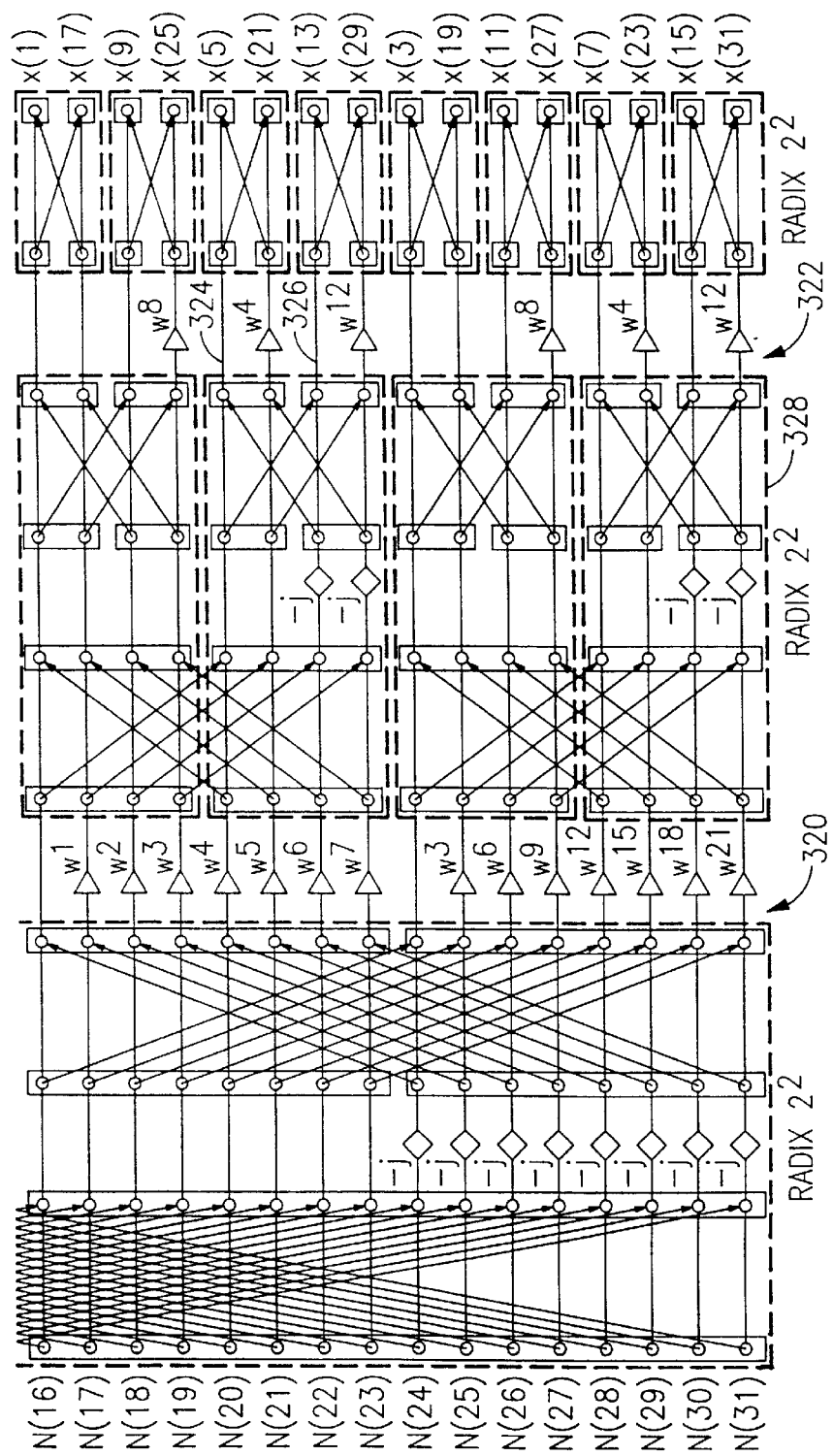

FIG. 28 illustrates a 32 point flow graph of the FFT processor 268 using radix $2^2$+2 pipeline architecture. Computations are performed using eight 4-point FFTs and four 8-point FFTs. These are decomposed in turn into two 4-point FFTs and four 2-point FFTs.

Figures 29, 29A:
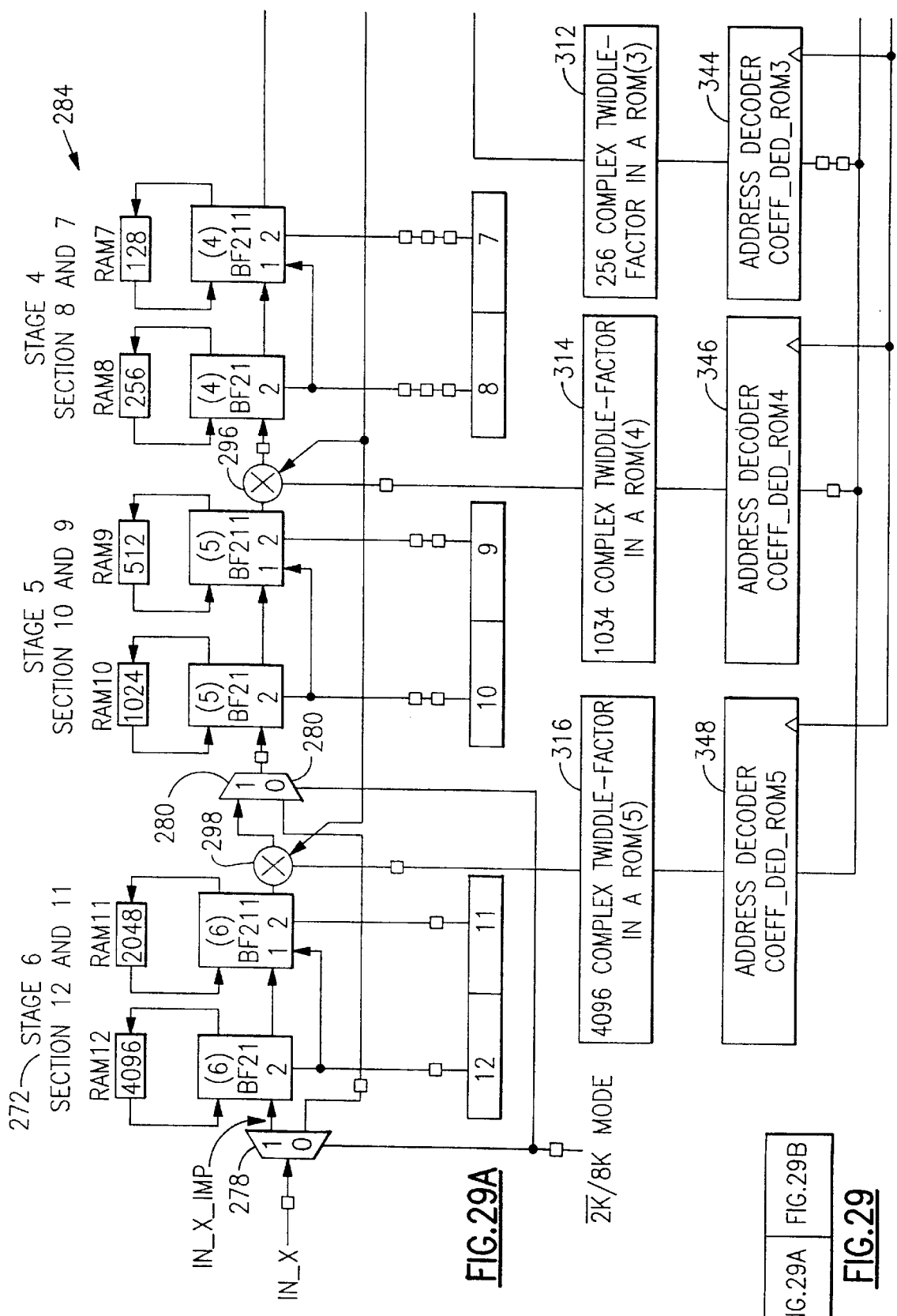
FIGS. 29 A–B is a schematic of a configurable 2K/8K radix $2^2+2$ single path, delay feedback pipelined FFT processor in accordance with the invention.
Figure 29B:
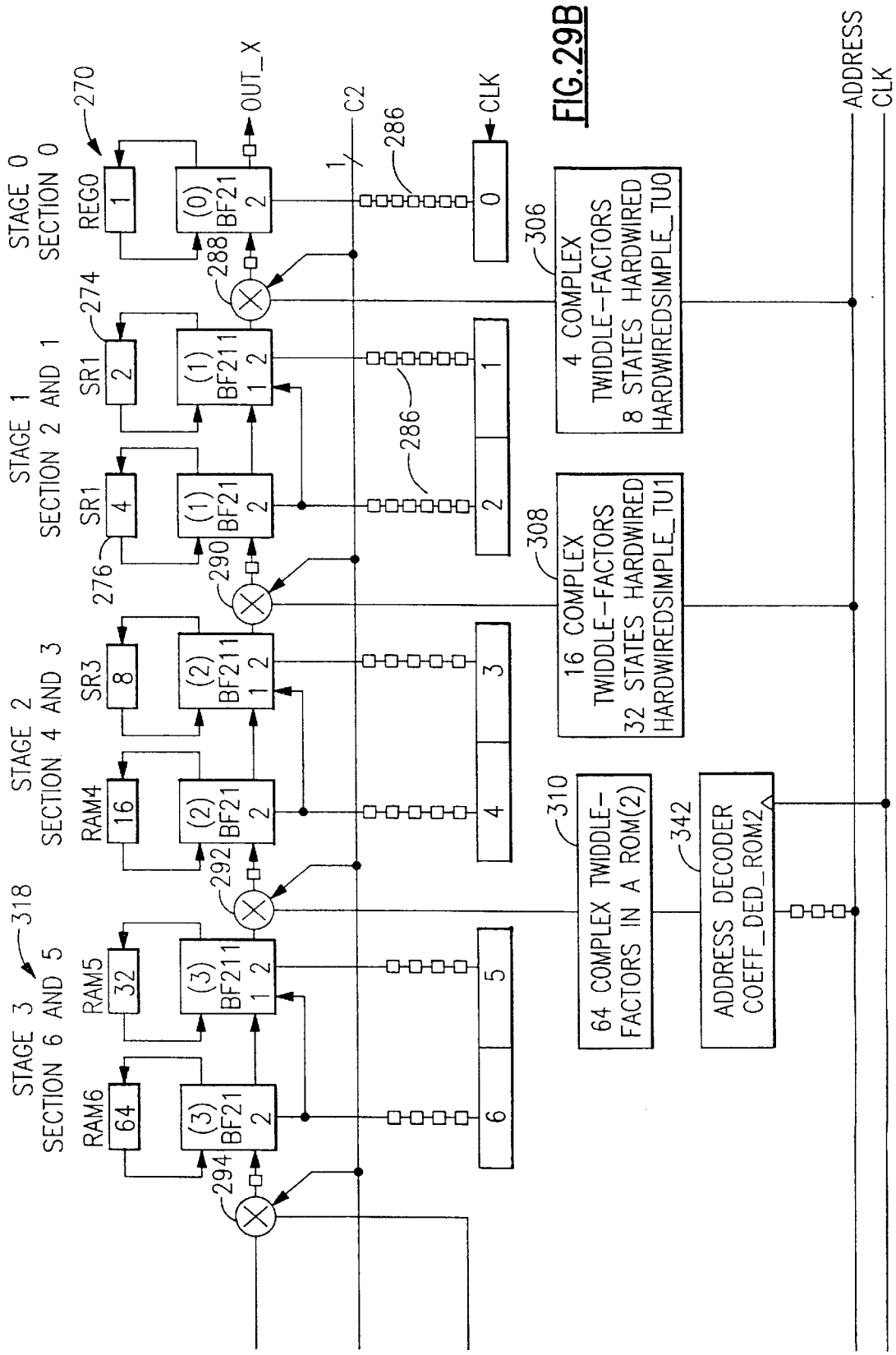

FIG. 29 illustrates the retimed architecture of a configurable 2K/8K radix $2^2$+2 single path, delay feedback pipelined FFT processor 284, in which like elements in FIG. 27 are given the same reference numerals. The stages have a plurality of pipeline registers 286 which are required for proper timing of the butterfly structures BF2I 260 and BF2II 262 in the various stages. As can be seen, the addition of each pipelined stage multiplies the range of the FFT by a factor of 4. There are 6 complex multipliers 288, 290, 292, 294, 296, 298 which operate in parallel. This processor computes one pair of I/Q data points every four fast clock cycles, which is equivalent to the sample rate clock. Using 0.35 µm technology the worst case throughput is 140 µs for the 2K mode of operation, and 550 µs for the 8K mode, exceeding the requirements of the ETS 300 744 telecommunications standard. Data enters the pipeline from the left side of FIG. 29, and emerges on the right. The intermediate storage requirements are 2K/8K for I data and 2K/8K for Q data, and is mode dependent. In practice the radix-4 stage is implemented as a cascade of two adapted radix-2 stages that exploit the radix-4 algorithms to reduce the number of required complex multipliers.

Figure 30:
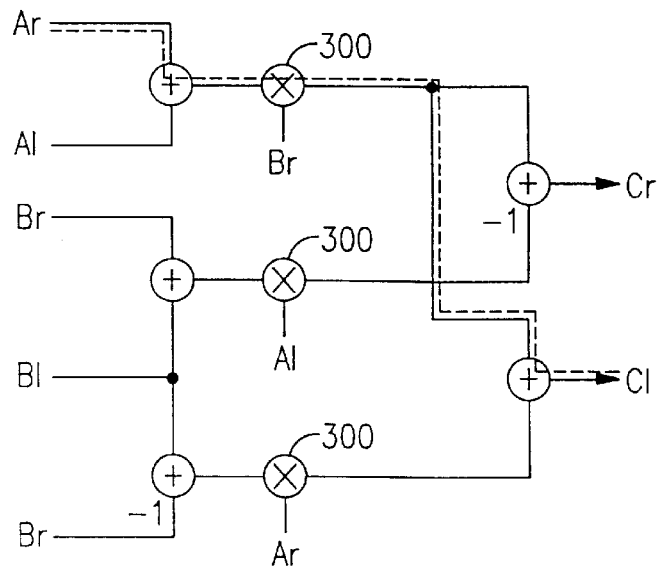
FIG. 30 is a detailed schematic of a complex multiplier used in the circuitry shown in FIG. 29.
Figure 31:
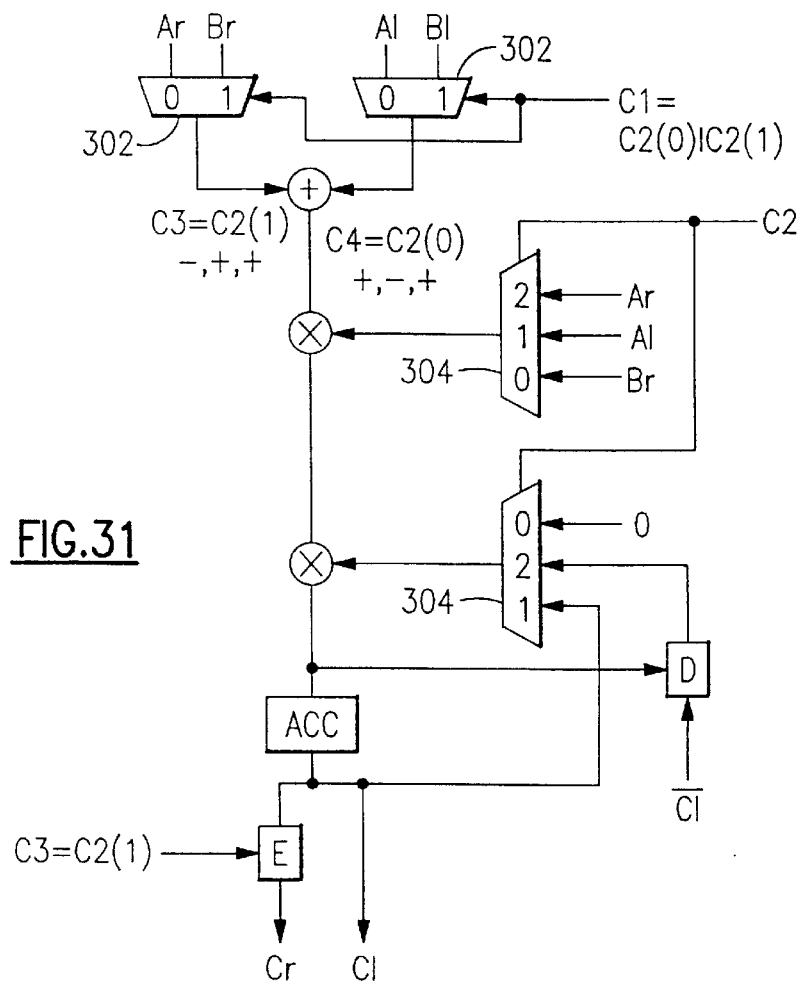
FIG. 31 is a detailed schematic of an alternate embodiment of a complex multipliers used in the circuitry shown in FIG. 29.

FIG. 30 is a schematic of one embodiment of the multipliers 288, 290, 292, 294, 296, 298 for performing the complex multiplication C=A×B, where A is data, and B is a coefficient. Because the FFT processor 284 has 6 complex multipliers, each requiring 3 hardware multipliers 300, a total of 18 hardware multipliers 300 would be required. It is preferable to use the embodiment of FIG. 31 in which some of the hardware multipliers 300 are replaced by multiplexers 302, 304.

Figure 32A:
FIGS. 32 A–B is another diagram illustrating the organization of the twiddle factors for each of the multipliers in the circuitry shown in FIG. 29.
Figure 32B:
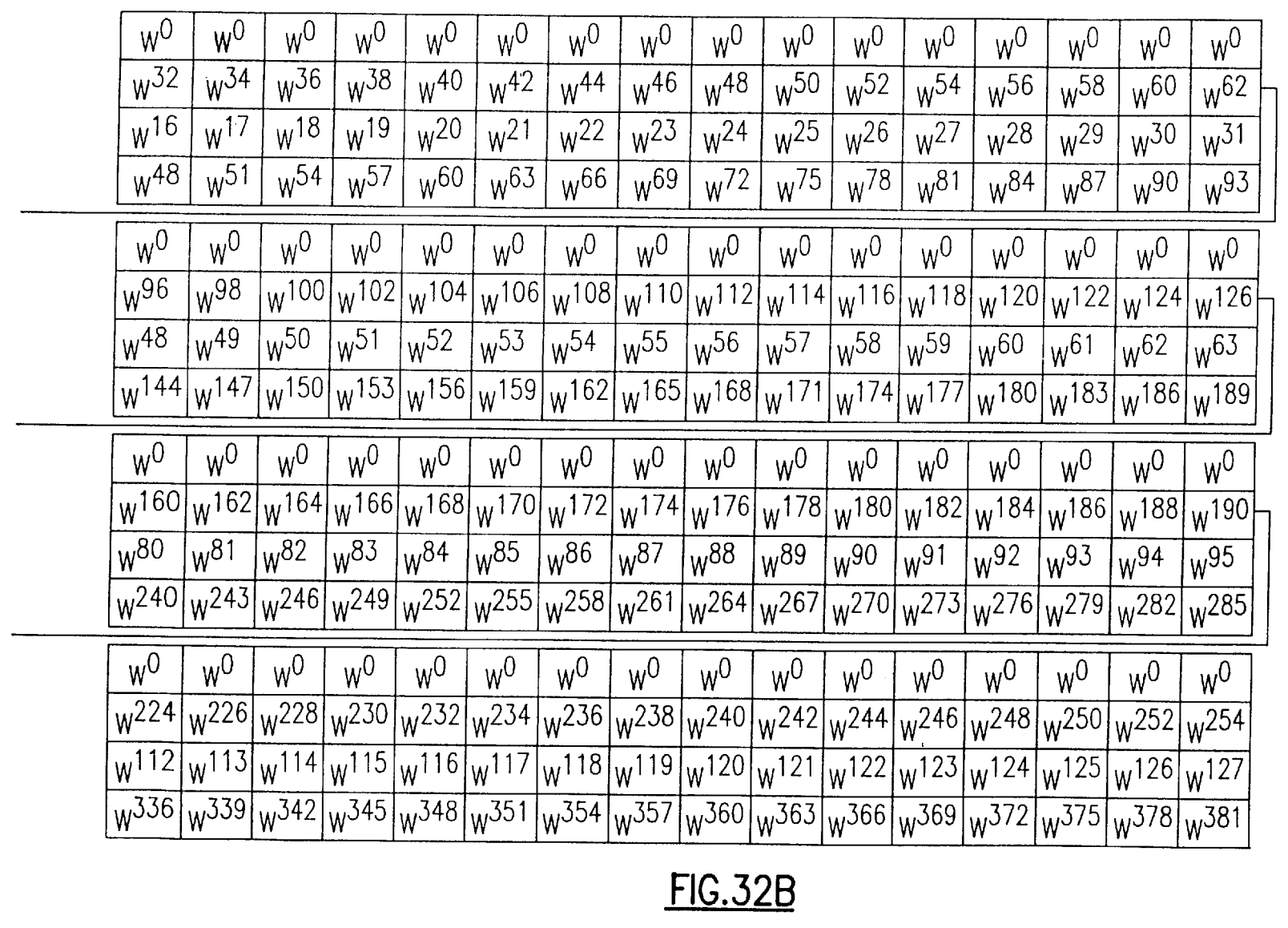

Turning again to FIG. 29 there are a plurality of RAMS 306, 308, 310, 312, 314, 316 which are preferably realized as ROMs and contain lookup tables containing complex coefficients comprising cosines for the multipliers 288, 290, 292, 294, 296, 298 respectively. It has been discovered that by addressing the RAMS 306, 308, 310, 312, 314, 316 according to a particular addressing scheme, the size of these RAMS can be markedly reduced. The tradeoff between the complexity of the addressing circuitry and the reduction in RAM size becomes favorable beginning at stage-3 318. Referring again to FIG. 28 there are two columns 320, 322. Column 320 holds values $W^2$–$W^{14}$, followed by $W^1$–$W^7$, and then $W^3$–$W^{21}$. These coefficients are stored in the RAM 308, required by the particular multiplier 290. Column 322 contains values $W^8$, $W^4$, $W^{12}$, which repeat 3 times. Note further that between the values $W^8$, $W^4$, and $W^4$, $W^{12}$ are connections 324, 326 to the preceding butterfly unit located in column 328. In practice the connections 324, 326 are implemented as multiplications by $W^0$. In moving from multiplier to multiplier toward the left in FIG. 29, the lookup table space is multiplied by a power of 4 at each stage. In FIG. 32 table 330, the lookup table for multiplier $M^3$ contains 512 entries. It can be deduced by extrapolation that multiplier $M^5$ must contain 8192 twiddle factors, and corresponds to the size of the FFT being performed by the FFT processor 284 (FIG. 29).

Figure 33A:
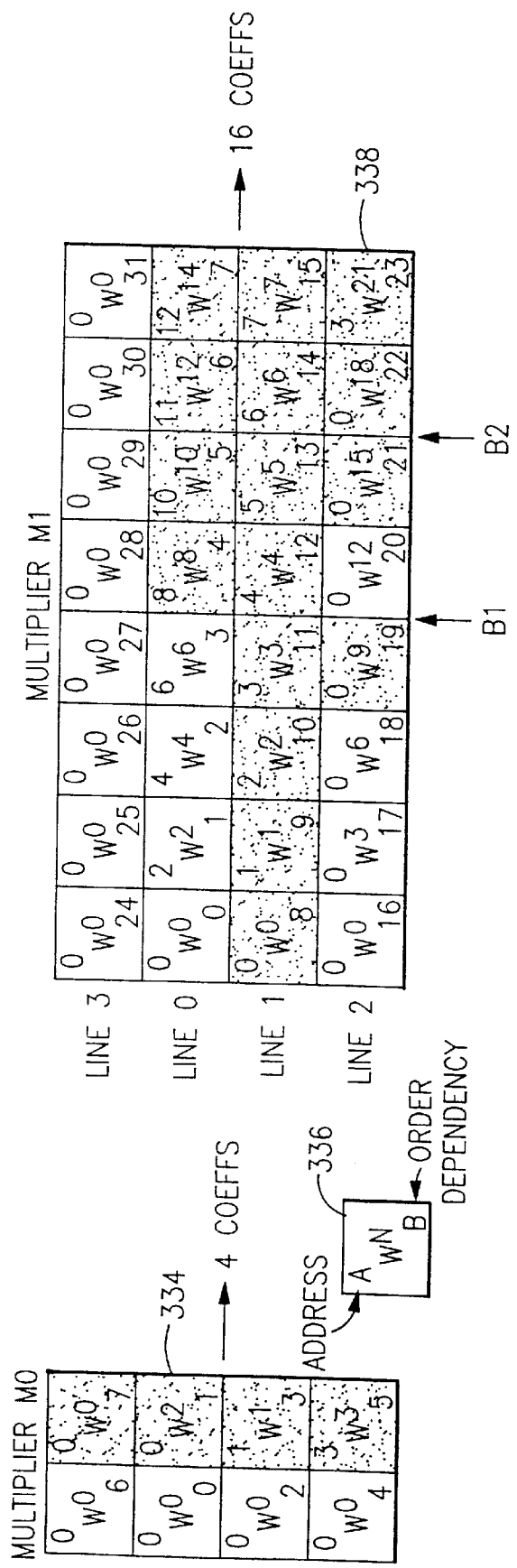
FIGS. 33 A–B illustrates the organization of the twiddle factors for each of the multipliers in the circuitry shown in FIG. 29.
Figure 33B:
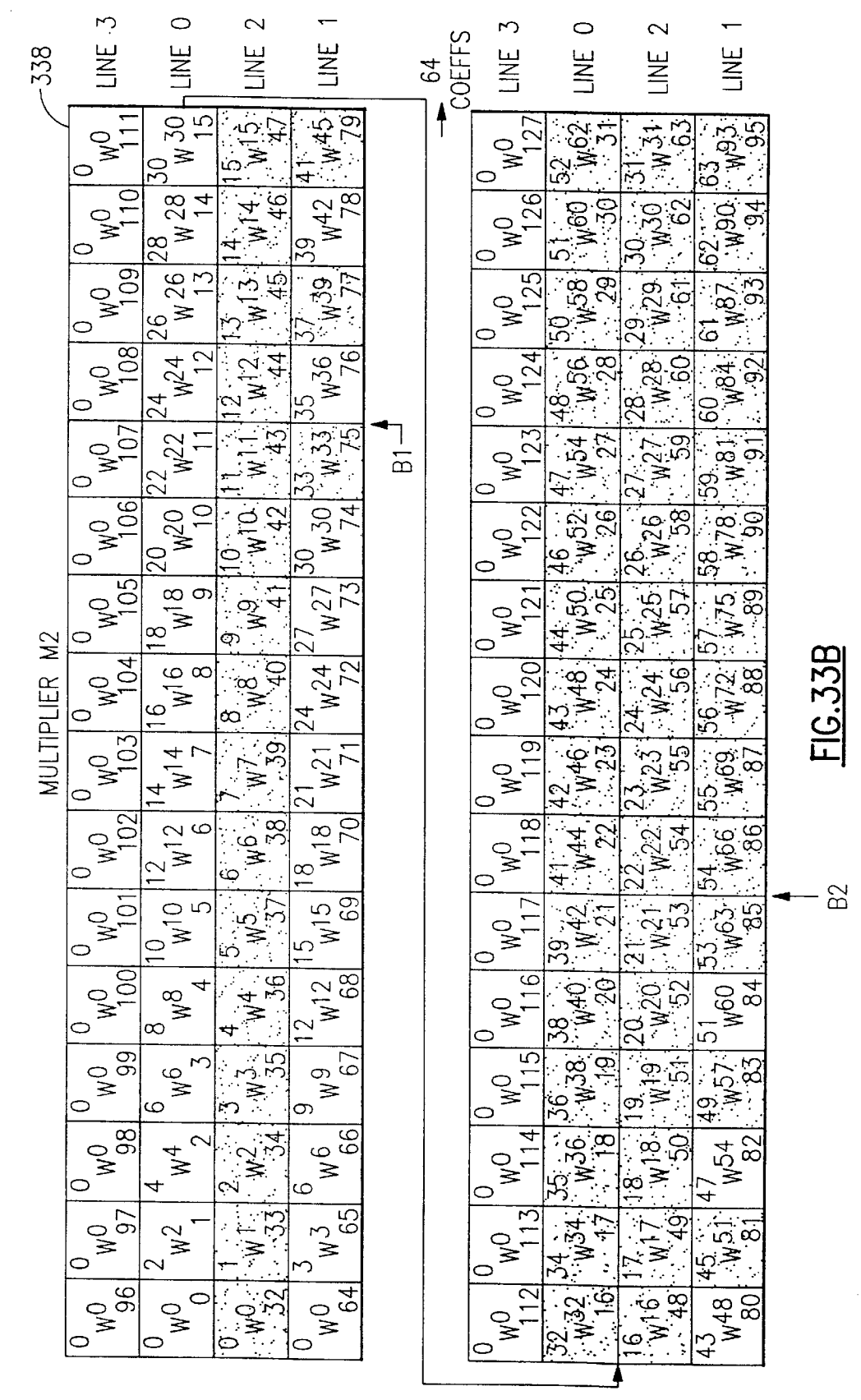

Before examining the look-up table space in more detail it is helpful to consider the plurality of horizontal lines 332. Moving downward from the top of FIG. 28, the line beginning at x(3) extends to $W^8$, which is the first twiddle factor required, and is at the third effective step in the flow diagram. FIGS. 33 and 32 show the organization of the twiddle factors for each of the multipliers, wherein the terminology $M_k$ represents the multiplier associated with the kth stage. Thus table 334 relates to multiplier $M_0$. The notation for the W values (twiddle factors) is shown in box 336. The subscript "B" at the bottom right represents a time stamp, that is an order dependency in which the twiddle factors are required by the pipeline. The superscript "A" represents the address of the twiddle factor in its lookup table. The superscript "N" is the index of the twiddle factor.

Thus in table 334 it may be seen that $W^0$ is required at time 0, $W^1$ at time 1, and $W^0$ is again required at time 2. Further inspection of the other tables in FIGS. 33, 32 reveals that half of the entries in each table are redundant. The storage requirement for the lookup tables can be decreased by 50% by eliminating redundant entries. This has been accomplished by organizing the W values in ascending order by index, so that the values can be stored in memory in ascending order. Thus in the case of table 338 the index values range from 0 to 21, with gaps at 11, 13, 16, 17, 19, and 20.

The procedure for organizing the lookup table and the addressing scheme for accessing the twiddle factors is explained with reference to table 338, but is applicable to the other tables in FIG. 33. (1) Each row is assigned a line number as illustrated. (2) Each twiddle factor is assigned an order dependency which is noted in the lower right of its respective cell in table 338. (3) It is assumed that table 338 in its reduced form will contain only unique twiddle factors in ascending order by index within the memory address space. Consequently each twiddle factor is assigned a memory address as shown in the upper left of its respective cell.

During address generation, for line 3 of table 338 the address is simply held at 0. For line 1 the address is incremented by 1 to the end of the line. However lines 0 and 2 contain non-trivial address sequences. For line 0, looking at table 340, which contains 64 values, it will be observed that the address sequence changes according to the intervals 2,2,2,2, and then later 1,1,2,1,1,2 . . . For line 2, the address first increments by 3, then by 2, and finally by 1. The locations at which the address increments change are referred to herein as the "break-points". These values of the break points range between 0, corresponding to the first point in line 2, to the last position in the line.

By inspection it can be seen that the occurrence of the first break point changes from table to table following the recurrence relationship $$B1_{M_N} = 4B1_{M_{N-1}} \quad (28)$$

with the initial condition $$B1_{M_0} = 1 \quad (29)$$

where $M_N$ is the multiplier of the Nth stage of the FFT processor 284.
Expanding the recurrence relationship gives:

$$B1_{M_N} = (((4B1_{M_0} - 1) \times 4 - 1) \times 4 - 1) \quad (30)$$

$$B1_{M_N} = 4^N B1_{M_0} - 4^{N-3} - 4^{N-2} \ldots - 4^0 \quad (31)$$

$$B1_{M_N} = 4^N B1_{M_N} - \sum_{n=0}^{N-1} 4^n \quad (32)$$

Similarly the second break point B2 for line 2 is determined from the recurrence relation $$B2_{M_N} = 4B2_{M_{N-1}} + 1 \quad (33)$$

with the initial condition $$B2_{M_0} = 1 \quad (34)$$

or $$B2_{M_N} = (((4B2_{M_0} + 1) \times 4 + 1) \times 4 + 1) \quad (35)$$

$$B2_{M_N} = \sum_{n=0}^{N} 4^n \quad (36)$$

Break point B3 for line 0 at which the sequence changes from increments of 2,2,2,2 to the pattern 1,1,2,1,1,2 . . . can be located by inspecting tables 338, 340, and 330. In table 338 the break point B3 occurs very late in the line, such that the second sequence only presents its first two elements. By examining the address locations in the larger noted tables, it can be deduced that the location of break point B3 is related to the number of entries in a particular table as $$B3 = \frac{K}{4} + 2 \quad (37)$$

where K is the number of table entries. In the tables in FIG. 29 K=8, 32, 128, 2048, 8192. Therefore, in terms of the N'th complex multiplier, break point B3 can be expressed as $$B3_{M_N} = 2 \times 4^N + 2 \quad (38)$$

where $N \geq 0$.

Address generators 342, 344, 346, 348 are operative for the lookup tables in RAMS 310, 312, 314, 316. Silicon area savings for the smaller tables 308, 306 are too small to make this scheme worthwhile.

Figure 34:
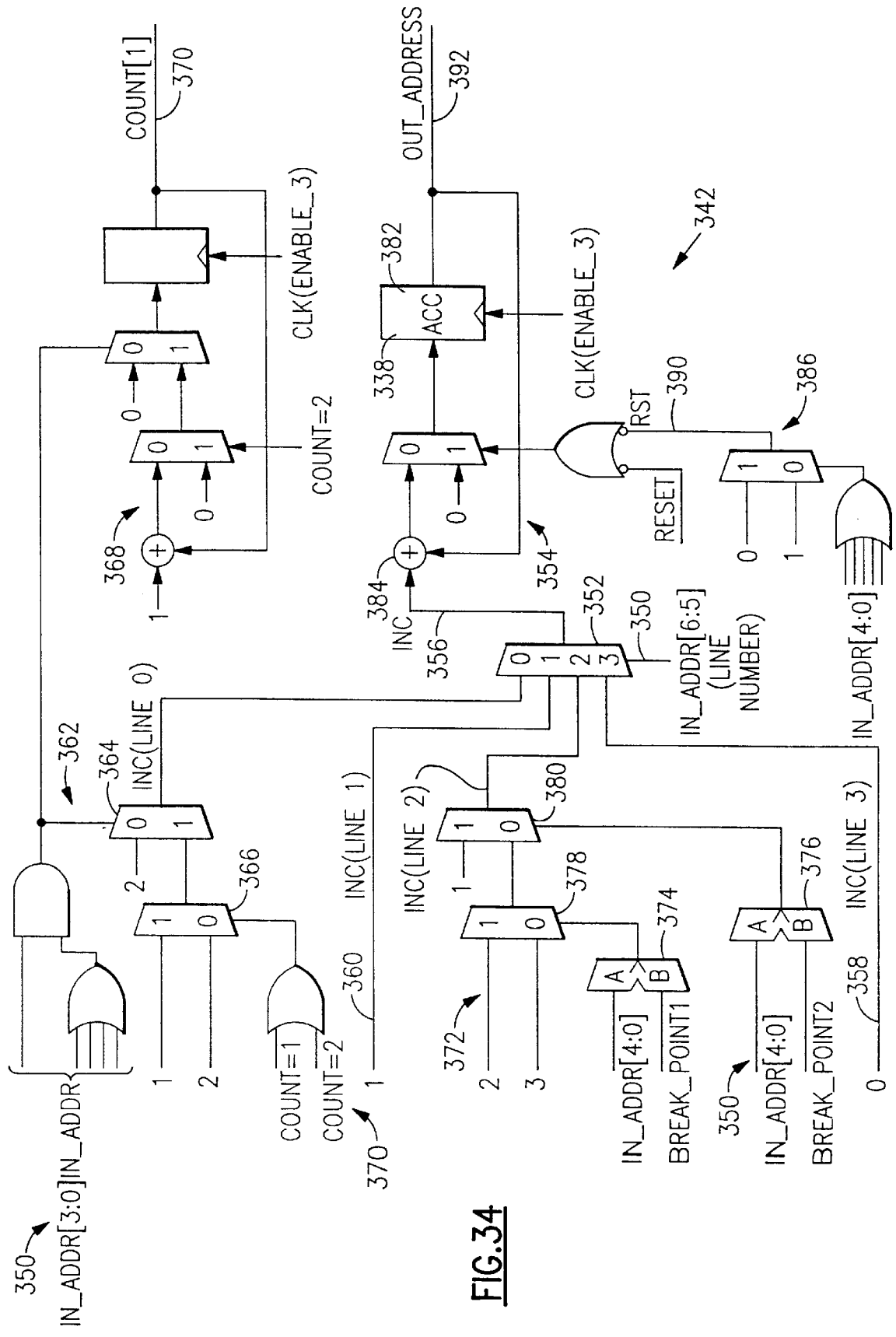
FIG. 34 is a schematic of address generator used in the circuitry shown in FIG. 29.

FIG. 34 schematically illustrates an address generator 342 for the above described address generation scheme, and is specific for the table 340 and multiplier $M_2$. 128 possible input states are accepted in lines in_Addr 350, and a multiplexer 352 selects the two most significant bits to decode 1 of 4 values. The output of the multiplexer 352 relates to the line number of the input state. Actually the output is the address increment applicable to the line number of the input state, and is used to control a counter 354 whose incremental address changes according to value on line 356. Thus, the increment for line 3 of table 340 is provided to the multiplexer 352 on line 358, and has a value of zero, as was explained above. Similarly the increment for line 1 of table 340 is provided to the multiplexer 352 on line 360, and has a value of 1.

The situations of line 0 and line 2 are more complicated. For line 0 the output of decoding logic 362 is provided by multiplexer 364, and has either an incremental value of 2, or the output of multiplexer366. The latter could be either 1 or 2, depending on the state of a two bit counter 368, which feeds back a value of 0 or 1 as signal count 370.

Decoding logic 372 decodes the states for line 2 of table 340. The relationship of the current input state to the two break points of line 2 are tested by comparators 374, 376. The break point is actually set one sample earlier than the comparator output to allow for retiming. The outputs of the comparators 374, 376 are selectors for the multiplexers 378, 380 respectively.

The current address, held in accumulator 382 is incremented by the output of the multiplexer 352 by the adder 384. A simple logic circuit 386 resets the outgoing address, which is contained in register ACC 388, by asserting the signal rst 390 upon completion of each line of table 340. This insures that at the start of the next line the address points to twiddle factor $W^0$. The new address is output on the 6 bit bus out_Address 392, which is one bit smaller than the input in_Addr 350.

Figure 35:
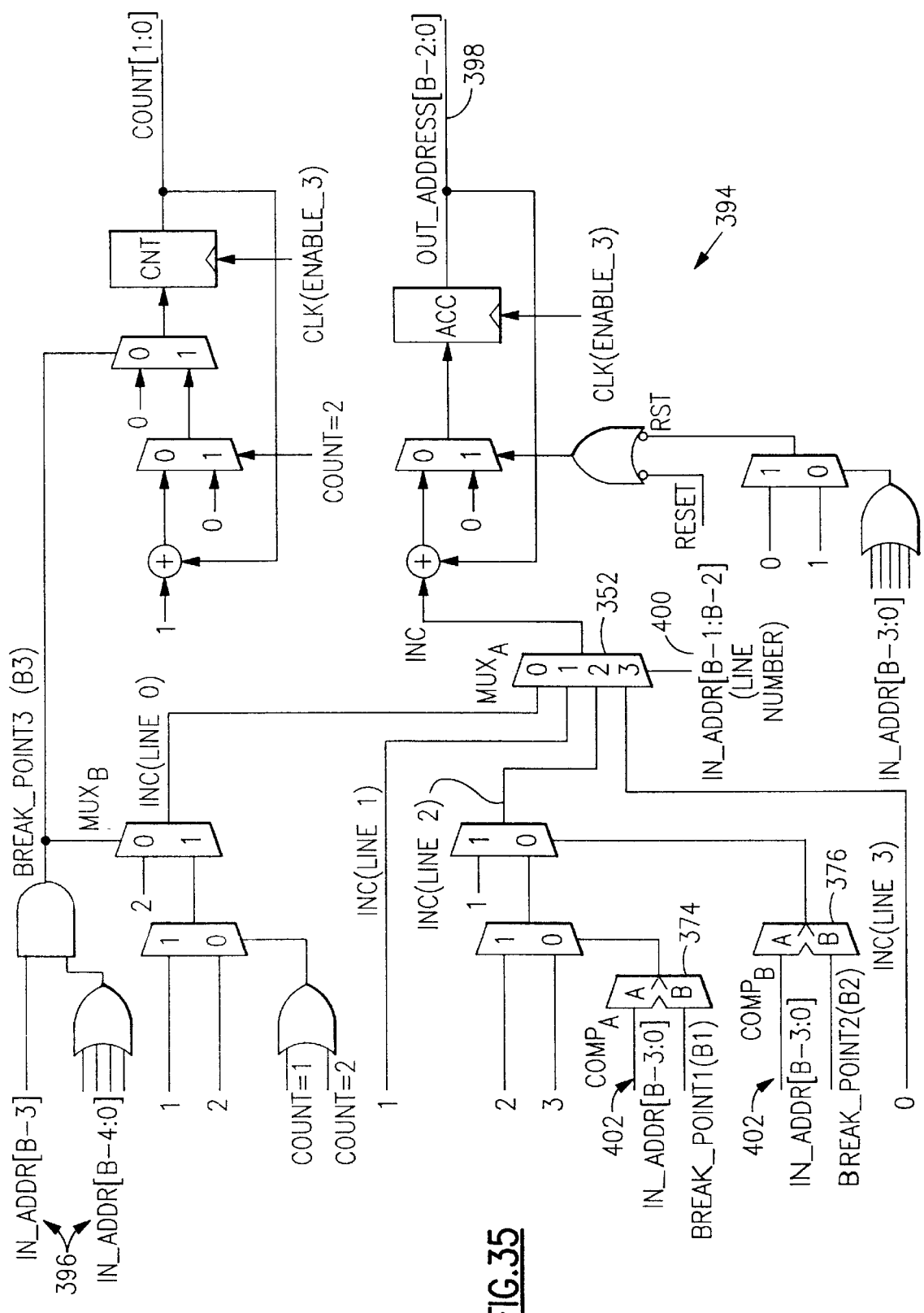
FIG. 35 is a schematic of a generalization of the address generator shown in FIG. 34.

FIG. 35 is a generalization of address generator 342 (FIG. 34), in which the incoming address has a path of B bits. Like elements in FIGS. 34 and 35 are given the same reference numerals. The structure of address generator 394 is similar to that of the address generator 342, except now the various lines of the input in_addr 396 and the output out_addr[B-2:0] 398 are denoted in terms of B. Thus the multiplexer 352 in FIG. 35 is selected by input in_addr [B-1:B-2] 400 . Similarly one of the inputs of comparator 374 and of comparator 376 is in_addr [B-3:0] 402. Out_addr[B-2:0] 398 forms the output. The advantage of this structure is a reduction in the size of the lookup table RAM of 50%.

The FFT calculation circuitry 168 (FIG. 14) is disclosed in Verilog code listings 1–17. The Verilog code for the address generator 394 is generic, enabling any power-of-four table to be implemented.

Channel Estimation and Correction

The function of the Channel estimation and correction circuitry shown in channel estimation and correction block 170 (FIG. 14) is to estimate the frequency response of the channel based on the received values of the continuous and scattered pilots specified in the ETS 300 744 telecommunications standard, and generate compensation coefficients which correct for the channel effects and thus reconstruct the transmitted spectrum. A more detailed block diagram of the channel estimation and correction block 170 is shown in FIG. 16.

In acquisition mode, the channel estimation and correction block 170 needs to locate the pilots before any channel estimation can take place. The circuitry performs a convolution across the 2048 carriers to locate the positions of the scattered pilots, which are always evenly spaced, 12 carriers apart. Having found the scattered pilots, the continual pilots can be located; once this is done the exact position of the 1705 active carriers within the 2048 outputs of the FFT calculation circuitry 168 (FIG. 14) is known. A timing generator 404 within the block can then be initialized, which then generates reference timing pulses to locate pilots for channel estimation calculation and for use in other functions of the demodulator as well.

Channel estimation is performed by using the evenly spaced scattered pilots, and then interpolating between them to generate the frequency response of the channel. The received carriers (pilots and data) are complex divided by the interpolated channel response to produced a corrected spectrum. A complete symbol is held in a buffer 406. This corrects for the bit-reversed order of the data received from the FFT calculation circuitry 168. It should be noted that raw, uncorrected data is required by the frequency and sampling rate error circuitry.

The task of synchronizing to the OFDM symbol in the frequency domain data received from the FFT calculation circuitry 168 (FIG. 14) begins with the localization of the scattered and continual pilots, which occurs in pilot locate block 408. Scattered pilots, which according to the ETS 300 744 telecommunications standard, occur every 12 data samples, offset by 3 samples with respect to the start of the frame in each succeeding frame. As the power of the pilot carriers is $4/3$ the maximum power of any data carrier, a succession of correlations are performed using sets of carriers spaced at intervals of 12. One of the 12 possible sets is correlates highly with the boosted pilot carrier power.

Figure 36:
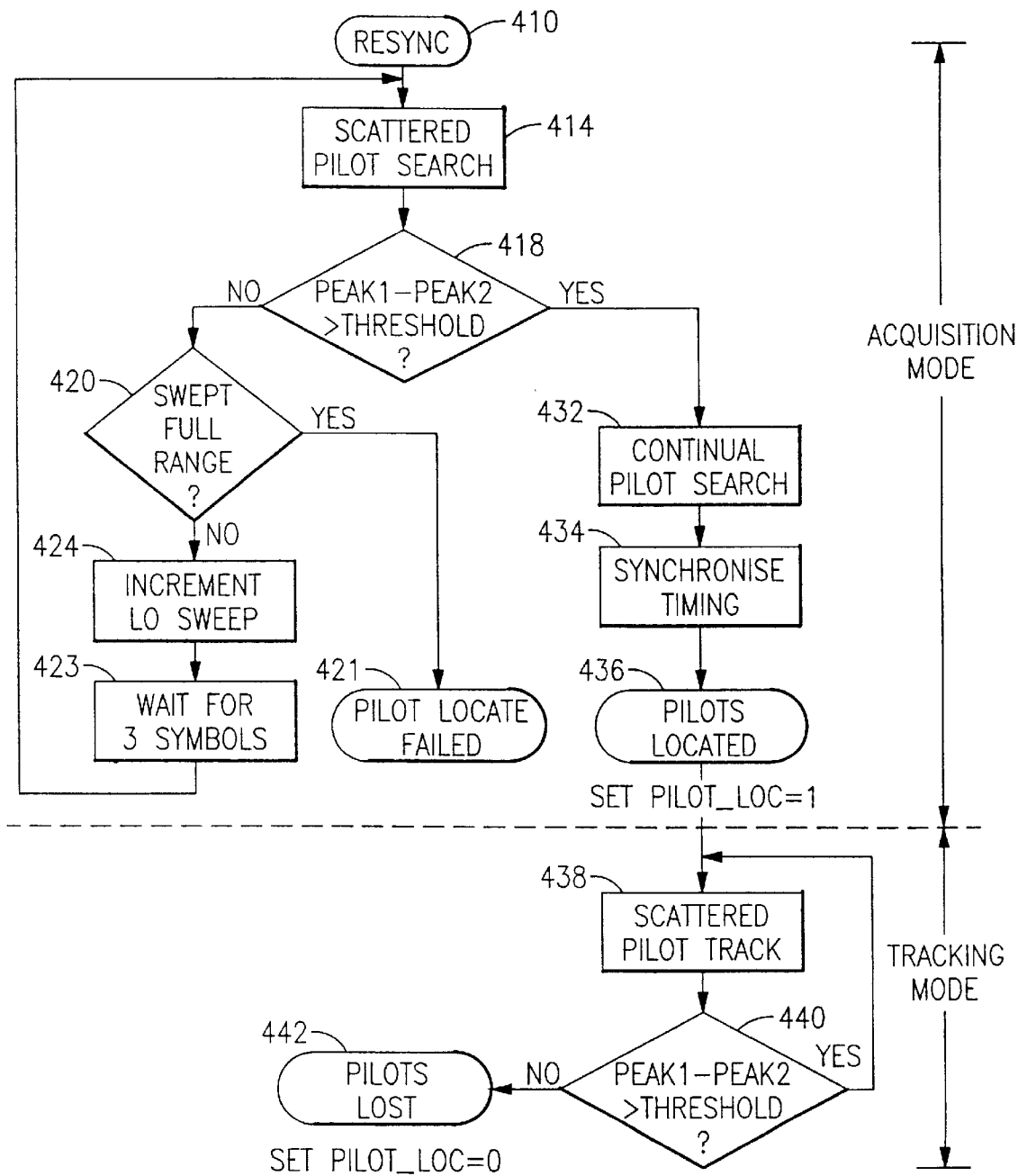
FIG. 36 is a flow chart illustrating the process of pilot location conducted by the channel estimation and correction circuitry shown in FIG. 16.

A first embodiment of the pilot search procedure is now disclosed with reference to FIGS. 36 and 16. It should be noted that the scattered pilot search procedure is done on the fly, and storage is only required in so far as is necessary to perform the subsequent step of continual pilot location discussed below. At step 410, after the assertion of the signal resync 204, generally occurring after a channel change or on power up, the signal pilot_lock412 is set low. Then, at step 414 the process awaits the first symbol pulse from the FFT calculation circuitry 168 (FIG. 14) on line 416 indicating the start of the first symbol. The first symbol is received and stored. In one embodiment of the pilot search procedure each point from 0 to 2047 is read in turn, accumulating each value ($|I|+|Q|$) in one of 12 accumulators (not shown). The accumulators are selected in turn in a cycle of 12, thus convolving possible scattered pilot positions. Two well known peak trackers indicate the accumulator with highest value (Peak1) and the accumulator having the second highest value (Peak2). The accumulator having the highest value corresponds to the scattered pilot orientation. The second highest value is tracked so that the difference between the highest peak and the second highest peak can be used as a "quality" measure. At decision step 418, if the two peaks are not far enough apart, a test for completion of a full range frequency sweep is made at decision step 420. If the test fails, failure of the scattered pilot search is reported at step 422. Otherwise, at step 424 the IQ Demodulator LO frequency is incremented by +⅛ carrier spacing by incrementing the magnitude of the control signal freq_sweep 426. Then the search for scattered pilots is repeated after delaying 3 symbols at step 428 to allow time for the effect of the change to propagate through the FFT calculation circuitry 168 and buffers. The peak difference threshold can be altered by the control microprocessor via the microprocessor interface 142 and block 430.

In a variation of the first embodiment there is only a single peak tracker which indicates the accumulator with highest value, which corresponds to the scattered pilot orientation. The true scattered pilot orientation thus found is one of 12 possible orientations.

If the test at decision step 418 is successful, the search for continual pilots is begun at step 432 by establishing an initial pilot offset from the 0 location in the RAM, storing the FFT data, according to the formula $$\text{pilot offset}=(\text{accumulator \# mod 3}) \quad (39)$$

Thus, if the scattered pilot peak is in accumulator 0, 3, 6 or 9 the pilot offset is 0. If the scattered pilot peak is in accumulator 1, 4, 7, or 10 then pilot offset is 1, etc. Then 45 carrier positions expected for continual pilots are read, adding the pilot offset value to the address, and accumulating ($|I|+|q|$) values. This procedure is repeated until first 115 continual pilot start positions have been searched. From the ETS 300 744 telecommunications standard the number of possible first carrier positions among the active carriers lying in a contiguous block between carrier 0 and carrier 2047 is easily calculated as $(2048-1705)/3 \approx 115$, as explained below. It is thus guaranteed that the active interval begins within the first (2048−1705) carrier positions. The carrier corresponding to the peak value stored is the first active carrier in the symbol.

Upon completion of the continual pilot search, at step 434 the timing generator 404 is reset to synchronize to the first active carrier and scattered pilot phase. The signal pilot_lock 412 is then set high at step 436, indicating that the pilots have been located successfully, then at step 436 the timing generator 404 is reset to synchronize to the first active carrier and scattered pilot phase.

In a tracking mode of operation, shown as step 438, the scattered pilot search is repeated periodically, and evaluated at decision step 440. This can be done at each symbol, or less frequently, depending upon propagation conditions. The predicted movement of the scattered pilot correlation peak is reflected by appropriate timing in the timing generator 404, and can be used as a test that timing has remained synchronized. Failure of the test at decision step 440 is reported at step 442, and the signal pilot_lock 412 is set low.

Figure 37:
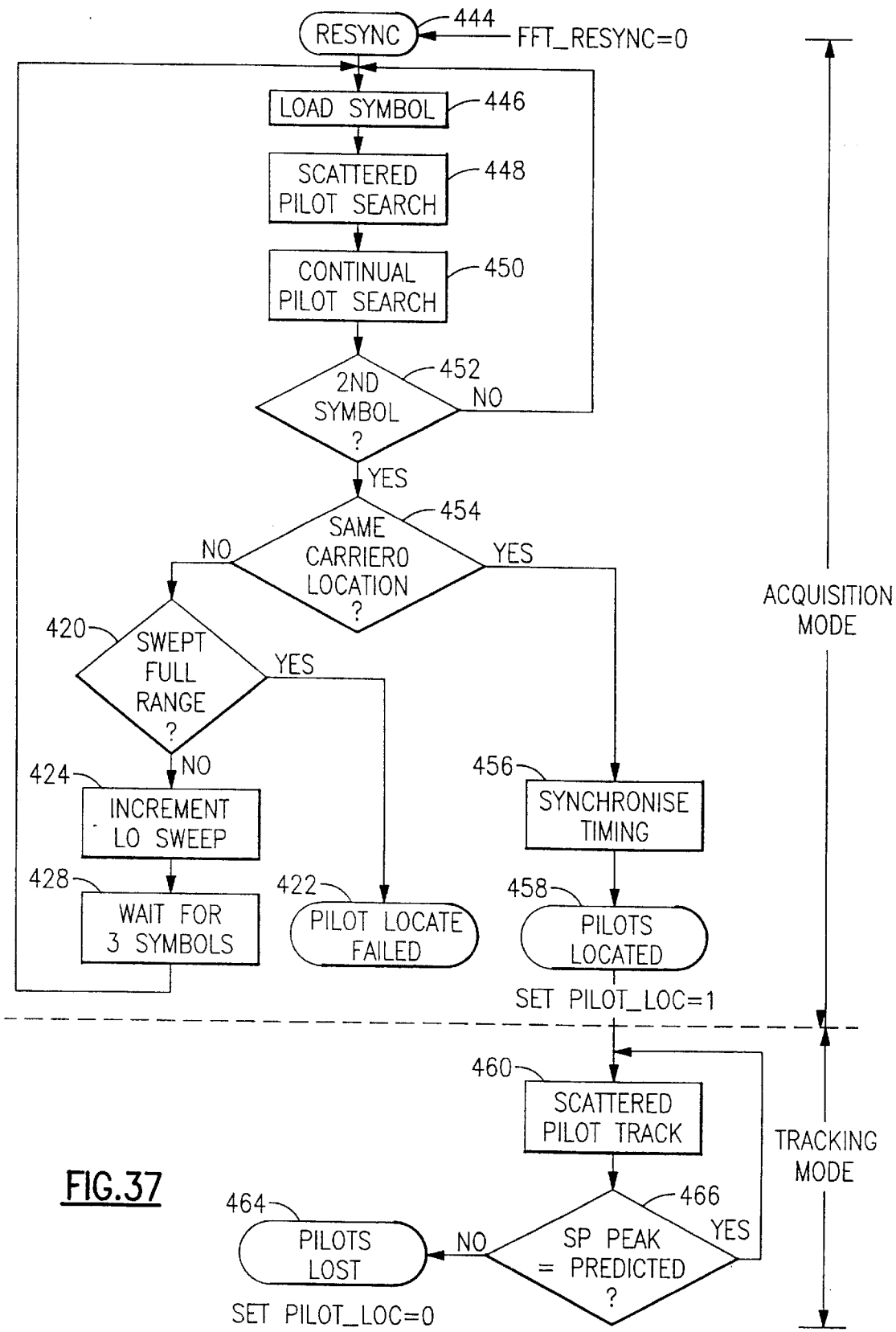
FIG. 37 is a flow chart of an embodiment of the pilot localization procedure according to the invention.

A second embodiment of the pilot search procedure is now disclosed with reference to FIGS. 16 and 37. At step 444 the assertion of the signal resync 204, generally occurring after a channel change or on power up, the signal pilot_lock 412 is set low. Then, at step 446 a symbol is accepted for evaluation. A search for scattered pilots, conducted according to any of the procedures explained above, is performed at step 448. Then a search for continual pilots is performed as described above at step 450. At decision step 452 it is determined whether two symbols have been processed. If the test fails, control returns to step 446 and another symbol is processed. If the test succeeds at step 454 another test is made for consistency in the positions of the scattered and continual pilots in the two symbols. If the test at step 454 fails, then the procedure beginning with decision step 420 is performed in the same manner as previously described with reference to FIG. 36. If the test at step 454 succeeds at step 456 the timing generator 404 is reset to synchronize to the first active carrier and scattered pilot phase. The signal pilot_lock 412 is then set high at step 458, indicating that the pilots have been located successfully.

In a tracking mode of operation, shown as step 460, the scattered pilot search is repeated periodically, and evaluated at decision step 462. This can be done at each cycle of operation, or less frequently, depending upon propagation conditions. The predicted movement of the scattered pilot correlation peak is reflected by appropriate timing in the timing generator 404, and can be used as a test that timing has remained synchronized. Failure of the test at decision step 462 is reported at step 464, and the signal pilot_lock 412 is set low.

It will be appreciated that after the scattered pilots have been located, the task of locating the continual pilots is simplified considerably. As the continual pilots are inserted at a known sequence of positions, the first of which is offset by a multiple of 3 positions with respect to start of the frame, as specified by the ETS 300 744 telecommunications standard. Two of three possible location sets in the data space can therefore be immediately excluded, and it is only necessary to search the third set. Accordingly the continual pilot search is repeated, each iteration beginning at a location 3 carriers higher. New accumulated values and the current start location are stored if they are larger than the previous accumulated value. This is repeated until all continual pilot start positions have been searched. The carrier corresponding to the largest peak value stored will be the first active carrier in the symbol. It is unnecessary to evaluate the "quality" of the continual pilot correlation peak. The scattered pilot search represents a correlation of 142 samples, and has higher noise immunity that of the search for 45 continual pilots. The continual pilot search is almost certain to be succeed if scattered pilot search completed successfully.

The above sequences locate scattered pilot positions within 114 symbol period, assuming accumulation at 40 MHz, and locate continual pilots in less than 1 symbol period (45×115 clock cycles assuming 40 MHz operation).

The I and Q data is provided to the pilot locate block 408 by the FFT calculation circuitry 168 (FIG. 14) in bit-reversed order on line 416. This complicates the problem of utilizing a minimum amount of RAM while computing the correlations during pilot localization. Incoming addresses are therefore bit reversed, and computed modulo 12 in order to determine which of 12 possible bins is to store the data. In order to avoid the square root function needed to approximate the carrier amplitude, the absolute values of the data are summed instead as a practical approximation. The scattered pilots are determined "on the fly". The continual pilots are located on frames which succeed the frames in which the scattered pilots were located.

The operation of the timing generator 404 is now disclosed in further detail. The addressing sequence for the RAM buffer 406 is synchronized by a symbol pulse from the FFT calculation circuitry 168 (FIG. 14). The FFT calculation process runs continuously once the first symbol from has been received following FFT Window acquisition. Addressing alternates between bit-reversed and linear addressing for successive symbols. The timing generator 404 also generates all read-write timing pulses.

Signals u_symbol 466 and c_symbol 468 are symbol timing pulses indicating the start of a new uncorrected symbol or corrected symbol. The signal u_symbol 466 is delayed by latency of the interpolating filter 470 and the complex multiplier 472, which are synchronized to RAM Address Sequence Timing.

For carrier timing the signals c_carrier0 474, pilot timing signals us_pilot(+) 476, uc_pilot(+) 478, c_tps_pilot(*) 480 and odd_symbol pulse 482 are referenced to a common start pulse sequence. A base timing counter (not shown) is synchronized by the pilot locate sync timing pulse 484, and is therefore offset from symbol timing. Pilot timing outputs are also synchronized to uncorrected symbol output from the buffer 406 or the corrected symbol output delayed by the interpolating filter 470 and the complex multiplier 472. On assertion of the signal resync 204 all timing output is set to inactive states until the first symbol is received. Let the transmitted pilot at carrier k be $P_k$ and the received pilot be $P'_k$.

$$P_k' = H_k \cdot w_k \cdot P_k \quad (40)$$

where $P_k$ is described below, and $$P'_k = I_k + jQ_k \quad (41)$$

where k indexes pilot carriers, $H_k$ is the channel response and $w_k$ is the reference sequence. We interpolate $H_k$ to generate compensation values for the received data carriers, $D'_k$:

$$D_k' = I_k + jQ_k \quad (42)$$

$$D_k = \frac{D'_k}{H_k} \quad (43)$$

where k indexes data carriers. Received pilots can be demodulated using a locally generated reference sequence and are then passed to the interpolating filter.

The interpolating filter 470, realized in this embodiment with 6 taps and 12 coefficients, is utilized to estimate the portion of the channel between the scattered pilots. As explained above pilots are transmitted at known power levels relative to the data carriers and are modulated by a known reference sequence according to the ETS 300 744 telecommunications standard. The transmitted pilot carrier amplitudes are ±⅔ of nominal data carrier power (+⅔ for reference bit of 1, −⅔ for the reference bit of 0; quadrature component=0 in both cases). Interpolation coefficients are selected from the 0–11 cyclic count in the timing generator 404 synchronized to data availability. Appropriate correction factors may be selected for data points to provide on-the-fly correction. The coefficients vary depending on scattered pilot phase. Since the positions of reference pilots vary, therefore coefficients to compensate a given data carrier also vary.

The input and output signals, and signals relating to the microprocessor interface 142 of the channel estimation and correction block 170 are described in tables 18, 19 and 20 respectively. The circuitry of the channel estimation and correction block 170 is disclosed in Verilog code listings 18 and 19.

TPS Sequence Extract

Figure 38:
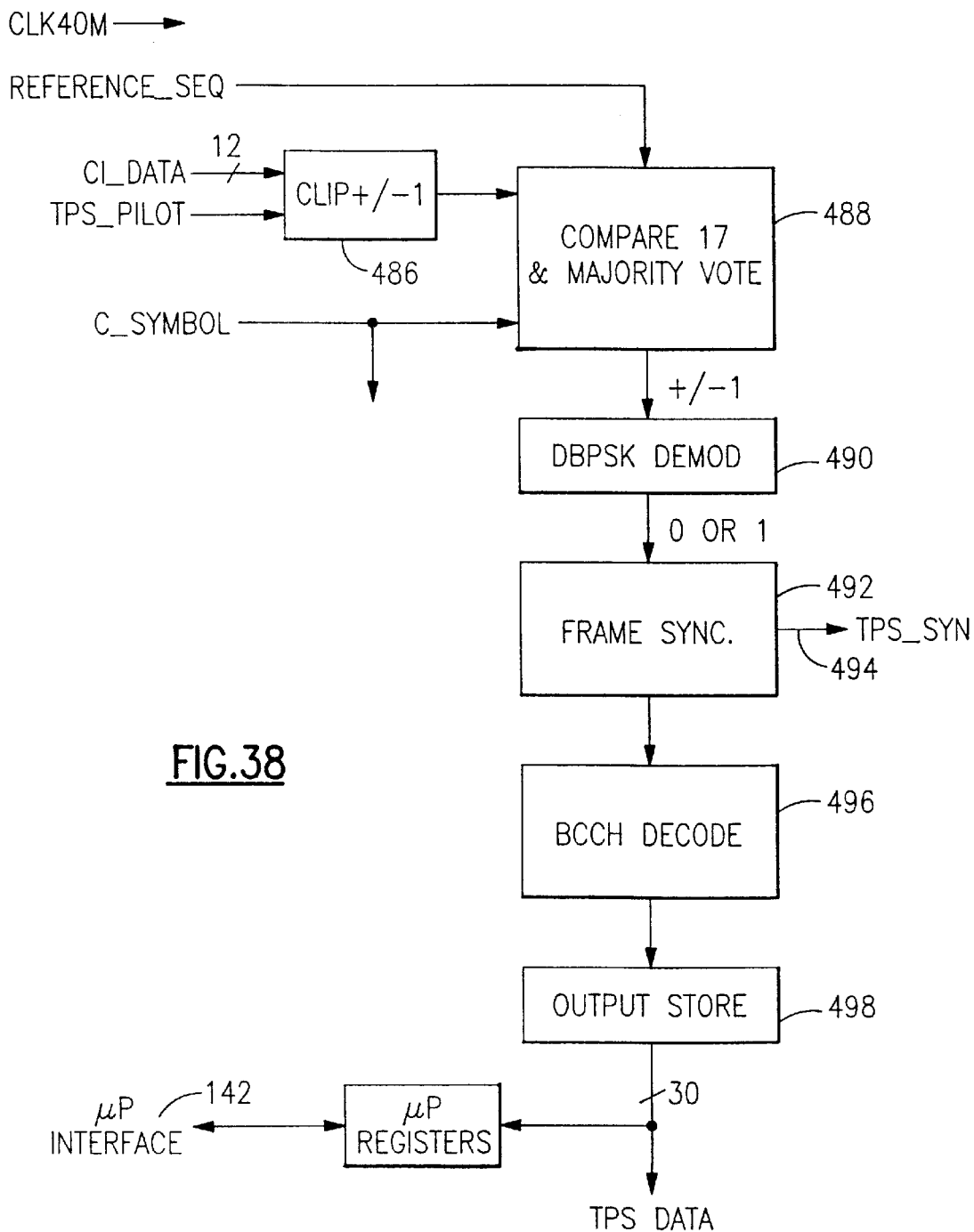
FIG. 38 is a more detailed block diagram of the tps sequence block of the circuitry shown in FIG. 14.

The tps sequence extract block 172 (FIG. 14), although set out as a separate block for clarity of presentation, is in actuality partially included in the channel estimation and correction block 170. It recovers the 68-bit TPS data carried in a 68-symbol OFDM frame, and is shown in further detail in FIG. 38. Each bit is repeated on 17 differential binary phase shift keyed ("DBPSK") modulated carriers, the tps pilots, within a COFDM symbol to provide a highly robust transport channel. The 68-bit tps sequence includes 14 parity bits generated by a BCH code, which is specified in the ETS 300 744 telecommunications standard. Of course appropriate modifications can be made by those skilled in the art for other standards having different BCH encoding, and for modes other than 2K mode.

A clipper 486 clips incoming corrected spectrum data to ±1. The sign bit can be optionally evaluated to obtain the clipped result. In comparison block 488 clipped received tps pilot symbols are compared against a reference sequence input. In the described embodiment a value of 0 in the reference sequence matches −1 in the pilot, and a value of 1 in the reference sequence matches +1 in the pilot. Majority vote comparisons are used to provide an overall +1 or −1 result. A result of +1 implies the same modulation as the reference sequence, and a result of −1 implies inverse modulation.

The DBPSK demodulator 490 converts the +/−1 sequence from the majority vote form to a binary form. The sequence converts to a value of 0 if the modulation in current and previous symbols was the same, and to 1 if modulation between successive symbols is inverted.

From an uninitialized condition a search for either of two sync words in 68-bit tps sequence (4×68-bit=1 superframe) is conducted in the frame synchronizer block 492. The synchronization words of a superframe are as follows:

| | |
|---|---|
| 0011010111101110 | sync word for frames 1 and 3 |
| 1100101000010001 | sync word for frames 2 and 4 |

Having acquired either sync word, a search for the other is conducted in the appropriate position in the next OFDM frame. On finding the second sync word synchronization is declared by raising the signal tps_sync 494. Data is then passed to the BCH decoder 496, which operates on 14 parity bits at the end of an OFDM frame against received data in the frame. Errors are corrected as necessary.

Decoded data is provided to output store block 498, which stores tps data that is found in a full OFDM frame. The output store block 498 is updated only at the end of an OFDM frame. Only 30 bits of interest are made available. Presently some of these bits are reserved for future use. The length indicator is not retained.

The BCH decoder 496 has been implemented in a manner that avoids the necessity of performing the Berlekamp Algorithm and Chien Search which are conventional in BCH decoding. The Galois Field Multiplier used in the BCH decoder 496 is an improvement of the Galois Field Multiplier which is disclosed in our copending U.S. Application Ser. No. 08/801,544.

The particular BCH code protecting the tps sequence is specified in the ETS 300 744 telecommunications standard as BCH (67,53,t=2), having a code generator polynomial $$h(x) = x^{14} + x^9 + x^8 + x^6 + x^5 + x^4 + x^2 + x + 1 \quad (44)$$

or equivalently $$h(x) = (x^7 + x^3 + 1)(x^7 + x^3 + x^2 + x + 1) \quad (45)$$

Figure 39:
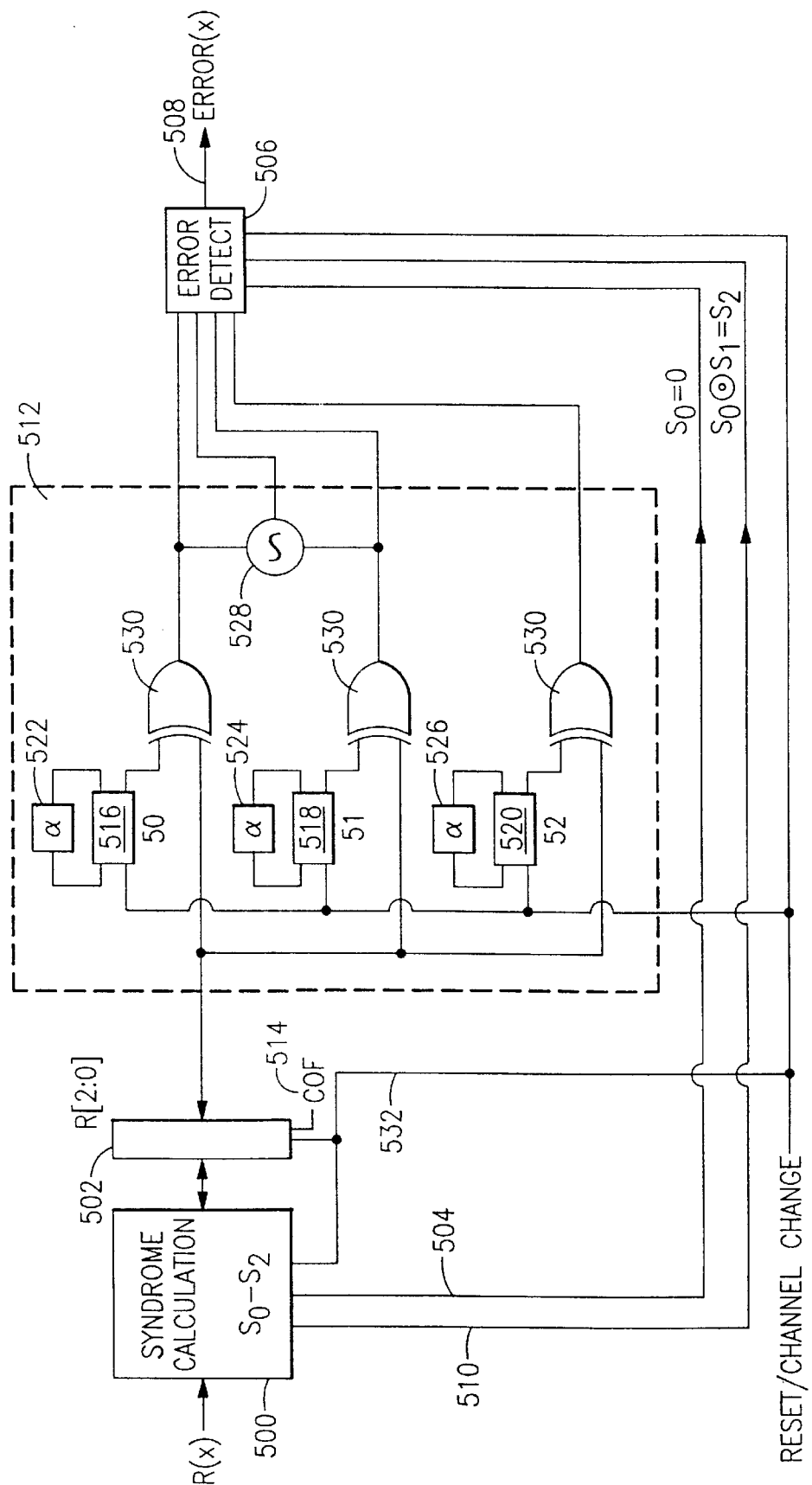
FIG. 39 is a schematic of a BCH decoder used in the tps processing circuitry shown in FIG. 38.

The left factor is used to generate the Galois Field which is needed for error detection. Referring to FIG. 39, this is calculated in syndrome calculation block 500 which can be implemented using a conventional feedback shift register to generate the a values. The first three syndromes are then computed by dividing the received signal R(x) by the values $\alpha^1$, $\alpha^2$, and $\alpha^3$, again using a conventional feedback shift register implementation, as is well known in the art of BCH decoding. It can be shown that the syndromes are $$S_0 = (\alpha^1)^{e_0} + (\alpha^1)^{e_1} \quad (46)$$

$$S_1 = (\alpha^2)^{e_0} + (\alpha^2)^{e_1} \quad (47)$$

$$S_2 = (\alpha^3)^{e_0} + (\alpha^3)^{e_1} \quad (48)$$

During the syndrome computation the syndromes are stored in storage registers R[2:0] 502.

In the event $S_0$ is 0, then it can be immediately concluded that there are no errors in the current tps sequence, and a signal is asserted on line 504 which is provided to error detect block 506, and the data of the received signal R(x) either output unchanged or toggled according to the output of the error detect block 506 on line 508. As explained below, if $$S_1 \odot S_0 = S_2 \quad (49)$$

then exactly one error is present, a condition which is communicated to the error detect block 506 on line 510. Otherwise it is assumed that two errors are present. More than two errors cannot be detected in the present implementation.

In order to solve the system of three non-linear equations shown above, data flow from the registers R[2:0] 502 into search block 512 is enabled by a signal EOF 514, indicating the end of a frame. Three feedback shift registers 516, 518, 520 having respective Galois Field multipliers 522, 524, 526 for $a\alpha^{-1} - \alpha^{-3}$ in the feedback loop are initialized to 50 H, 20 H, and 3 dH (wherein the notation "H" refers to hexadecimal numbers). The feedback shift registers 516, 518, 520 are clocked each time a new data bit is available. The syndromes and outputs of the feedback shift registers 516, 518, 520 are clocked into to a search module, which performs a search for the error positions using an iterative substitution search technique, which will now be described. The outputs of feedback shift registers 516, 518 are multiplied in a Galois Field Multiplier 528.

Considering the case of one error, $S_0$ is added, modulo 2, preferably using a network of XOR gates 530, to the output of the first feedback shift register 516 ($\alpha$-gen$_0$). If the relationship $$(S_0 + \alpha_{gen_0}) = 0 \quad (50)$$

holds, it is concluded that there is an error in the present data bit. The bit being currently output from the frame store is toggled. The search is halted, and the data is output from the frame store.

Considering the case of two errors, if the following relationship holds, there is an error in the current bit being output from the frame store:

$$(S_0 + \alpha_{gen_0}) \odot (S_1 + \alpha_{gen_1}) = (S_2 + \alpha_{gen_2}) \quad (51)$$

It is now necessary to store the three terms calculated in the immediately preceding equation into the registers R[2:0] 502 which previously stored the syndromes $S_0$–$S_2$. This is represented by line 532.

The process continues, now looking for the second error, and reusing the data in registers R[2:0] 502, which now contains the syndromes as adjusted by the previous iteration. The adjusted syndromes are denoted $S_0'$–$S_2'$.

$$S_0' = (S_0 + \alpha_{gen_0}), \text{etc.} \quad (52)$$

Figure 40:
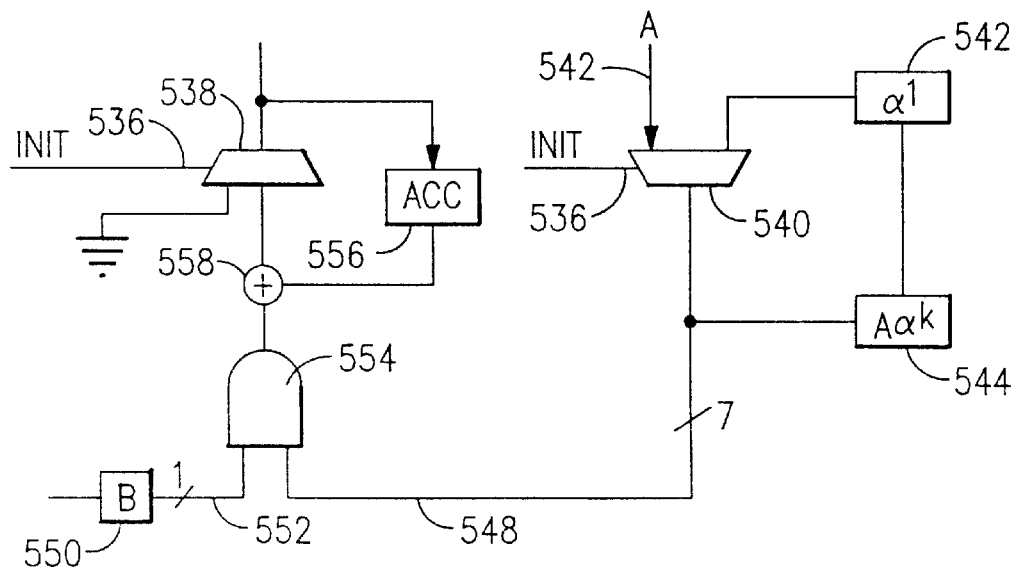
FIG. 40 is a more detailed schematic of a Galois field multiplier shown in FIG. 39.

Now, if $$(S_0' + \alpha_{gen_0}) = 0 \quad (53)$$

the second error has been found, and the bit being currently output from the frame store is toggled by XOR gate 534. If the search fails, more than two errors may be present and an error signal (not shown) is set.

the Galois Field Multiplier 528 is a clocked digital circuit and is disclosed with reference to FIG. 40. The tps data is received very slowly, relative to the other processes occurring in the multicarrier digital receiver 126. It is thus possible to execute the iterative substitution search slowly, and the Galois Field Multipliers are designed for minimum space utilization. They do not require alpha generators, but rely on small constant coefficient multipliers, with iterative feedback to produce the required alpha values. The arrangement takes advantage of the relationship in Galois Field arithmetic $$\alpha^n = \alpha^1 \cdot \alpha^{n-1} \tag{54}$$

After initialization by a signal init 536 which selects multiplexers 538, 540, the multiplicand A 542 is accumulated in register 544 and repeatedly multiplied by the value $\alpha^1$ in multiplier 546. The output on line 548 is repeatedly ANDed bitwise with the multiplicand B held in a shift register 550. The output of the shift register is provided on a one bit line 552 to the gate 554. The output of the gate 554 is accumulated in register 556 using the adder 558.

The input and output signals and signals relating to the microprocessor interface 142 of the tps sequence extract block 172 are described in tables 21, 22, and 23. Circuitry of the tps sequence extract block 172 and the BCH decoder 496 is disclosed in Verilog code listings 20 and 21.

Automatic Fine Frequency Control and Automatic Sampling Rate Control

A non ideal oscillator present in the transmission chain of an orthogonal frequency division multiplexed ("OFDM") signal affects all carriers in the OFDM symbols. The OFDM carriers adopt the same phase and frequency disturbances resulting from the noisy local oscillator. Variations in the frequency of the Local Oscillator lead to phase shifts, and consequent loss of orthogonality within the OFDM symbol. Therefore competent automatic frequency control is required in the receiver to track the frequency offsets relative to the transmitter in order to minimize these phase shifts and hence maintain orthogonality.

Figure 41:
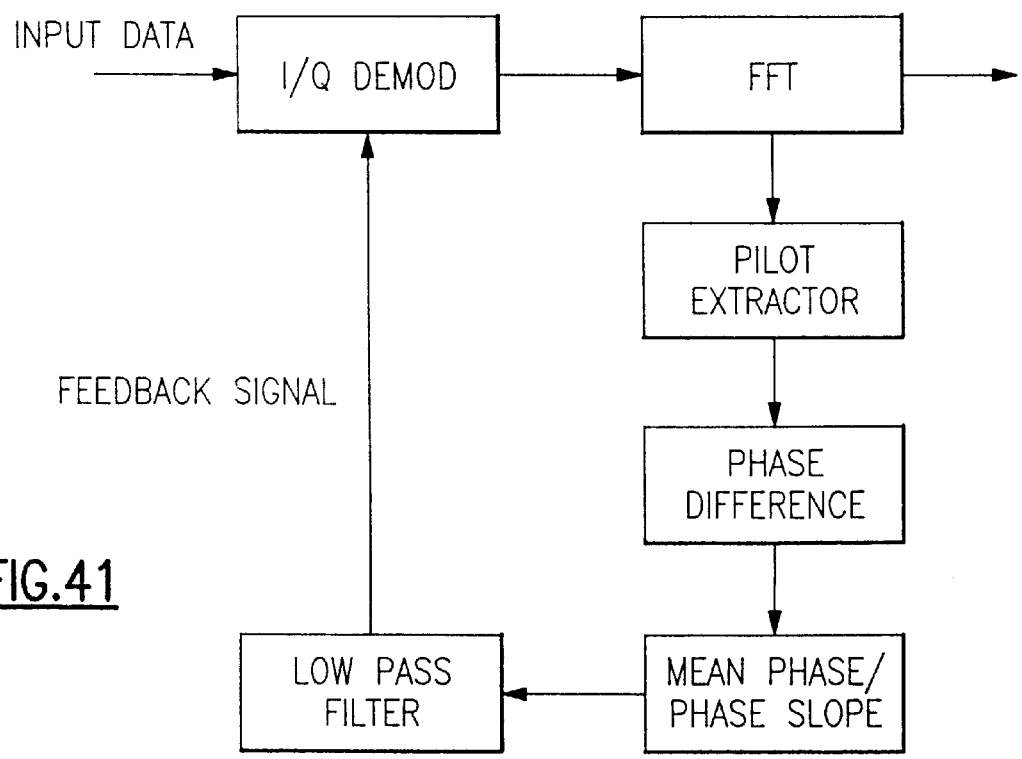
FIG. 41 is a block diagram generically illustrating the automatic sampling control and automatic frequency control loops of the digital receiver shown in FIG. 12.

All the carriers within an OFDM symbol are equally affected by the phase shifts. This is similar to the common phase error caused by phase noise. The common phase error present on all carriers is used to generate an Automatic Frequency Control ("AFC") signal, which is completely in the digital domain, since I/Q demodulation is performed in the digital domain. The approach taken is the calculation of the common phase error for every OFDM symbol. This is achieved by using the reference pilots. The change in the common phase error is measured over time to detect a frequency offset and is used to derive the AFC control signal. The generic approach for the AFC control loop and the automatic sampling rate control loop disclosed below is illustrated in FIG. 41.

Automatic sampling rate control is required when the receiver's master clock is not aligned with that of the transmitter. The misalignment causes two problems: (1) the demodulating carriers have incorrect spacing; and (2) the interval of the FFT calculation is also wrong.

The effect of this timing error is to introduce a phase slope onto the demodulated OFDM data. This phase slope is proportional to the timing error. The phase slope can be determined by calculating the phase difference between successive OFDM symbols, using reference pilots, and estimating the slope of these phase differences. A least squares approach is used for line fitting. The ASC signal is low-pass filtered and fed back to the sinc interpolator 158 (FIG. 13).

The mean phase difference between the reference pilots in subsequent OFDM symbols is used to calculate the frequency deviation. Assuming that the frequency deviations of the local oscillator are constant, then the phase rotates with $\alpha$, where $\alpha=2\pi f_d m T_t$ rads. Here $f_d$ is frequency deviation, m is the number of symbols between repetitions of identical pilot positions, and $T_t$ is the period comprising the sum of the active interval and the guard interval. The AFC signal is generated over time by low pass filtering $\alpha$. The value of the frequency deviation is then used to control the IQ demodulator 144 (FIG. 13).

The AFC and ASC control signals are effective only when a guard interval is passing indicated by the assertion of signal IQGI on line 154 (FIG. 13). This prevents a symbol from being processed under two different conditions.

Figure 42:
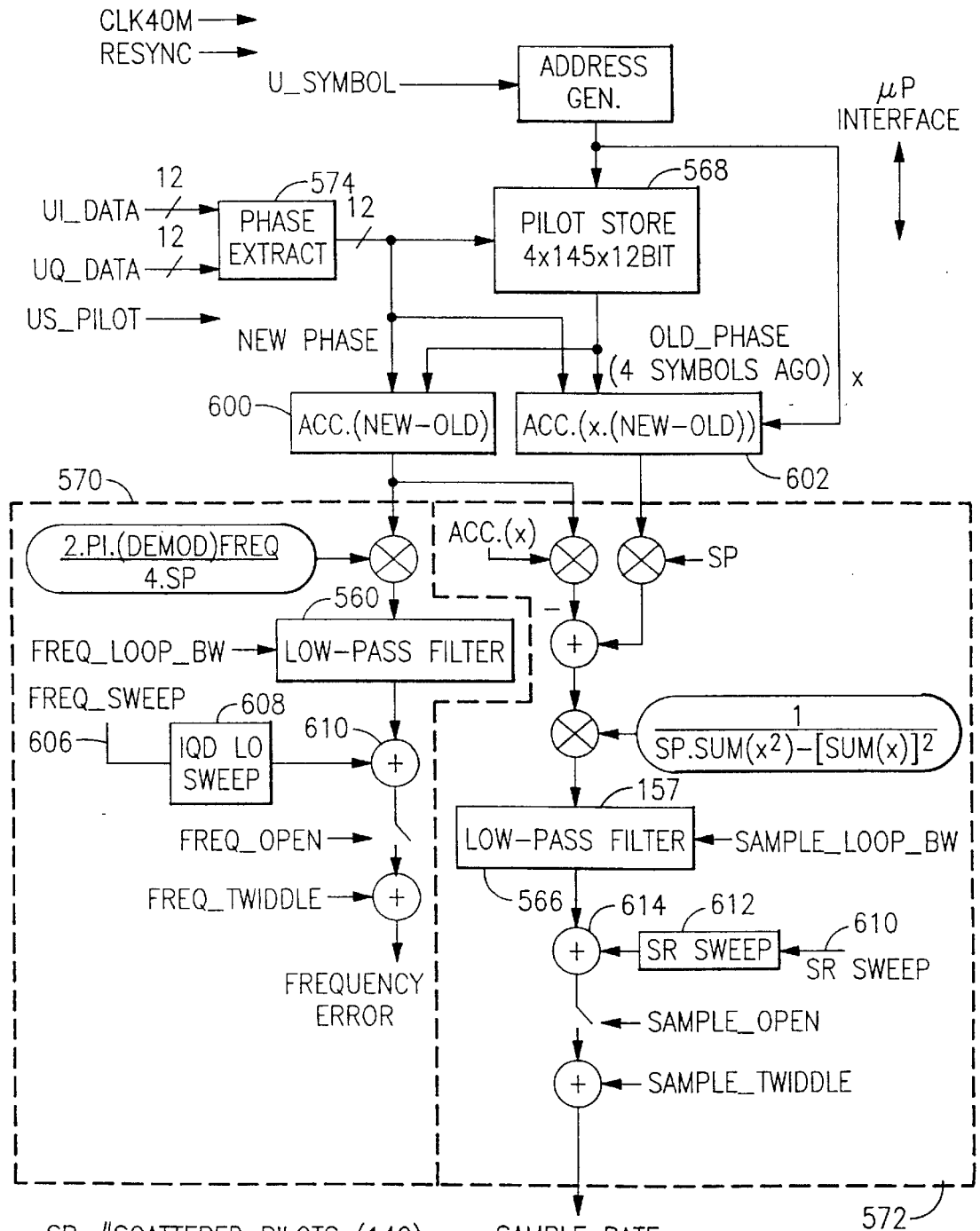
FIG. 42 is a more detailed block diagram of the automatic sampling control and automatic frequency control loops shown in FIG. 41.

The correction circuitry 174 (FIG. 14) is shown in greater detail in FIG. 42. Frequency error values output on line 560 are calculated by determining the average of the differences of phase values of corresponding pilots in a current symbol and the previous symbol. The resulting frequency error value is filtered in low pass filter 562 before being fed-back to the IQ demodulator 144 (FIG. 13). It is optional to also evaluate continual pilots in order to cope with larger frequency errors. Sampling rate error, output on line 564 is determined by looking at the phase difference between pilots in a symbol and the same pilots in a previous symbol. The differences vary across the symbol, giving a number of points through which a line can be fitted using the well known method of least squares regression. The slope of this line is indicative of the magnitude and direction of the sampling rate error. The sampling rate error derived in this way is filtered in low pass filter 566 before being fed back to the sinc interpolator 158 (FIG. 13).

A separate store 568 for the scattered pilots contained in 4 symbols is shared by the frequency error section 570 and the sampling rate error section 572. Direct comparison of scattered pilot symbols is thereby facilitated, since the scattered pilot phase repeats every four symbols. In an alternate embodiment where scattered pilots are used to provide control information, storage must be provided for four symbols. In the preferred embodiment, wherein control information is derived from continual pilots, storage for only one symbol is needed.

Recovery of the angle of rotation $\alpha$ from the I and Q data is accomplished in the phase extract block 574, where $$\alpha = \tan^{-1}(Q/I) \tag{55}$$

Figure 43:
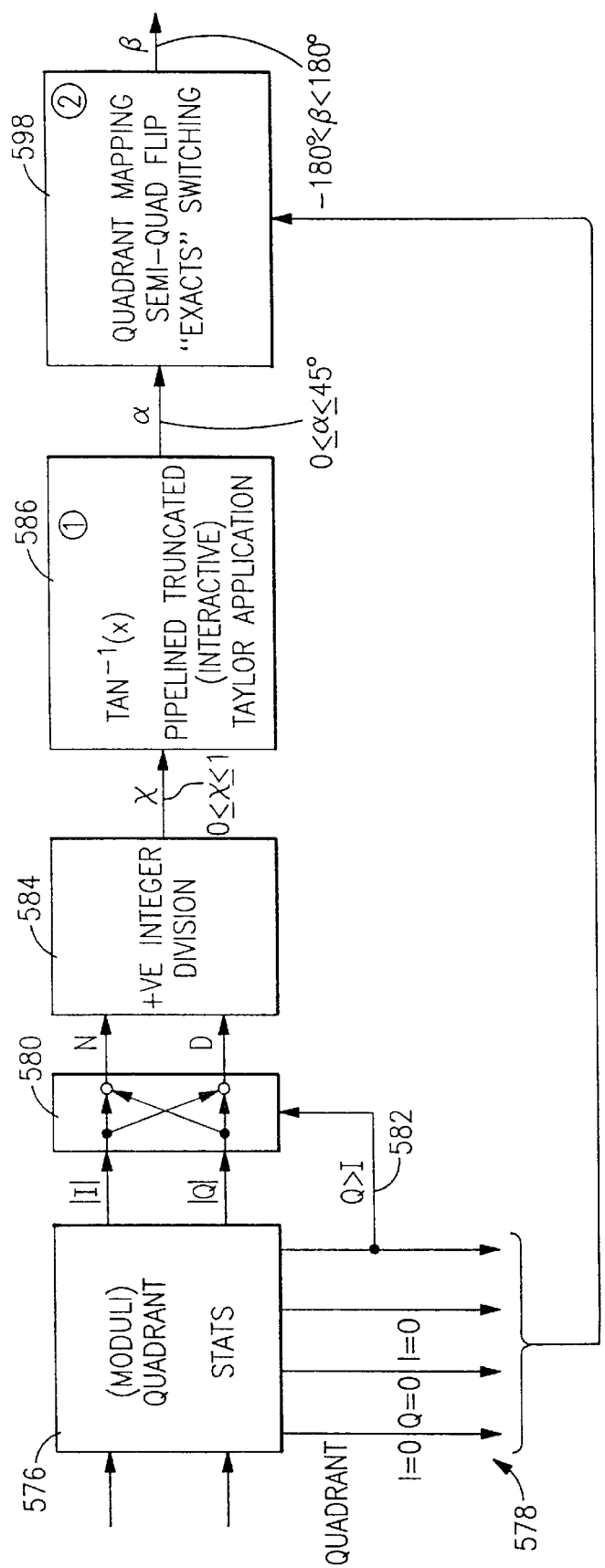
FIG. 43 is a more detailed block diagram of the phase extract block of the circuitry shown in FIG. 42.

In the presently preferred embodiment, the computations are done at a resolution of 14 bits. The phase extract block 574 is illustrated in greater detail in FIG. 43. The quadrant of $\alpha$ is first determined in block 576. The special cases where I or Q have a zero magnitude or I=Q is dealt with by the assertion of signals on lines 578. If the magnitude of Q exceeds that of I, quotient inversion is accomplished in block 580, utilizing a control signal 582. A positive integer division operation is performed in division block 584. Although this operation requires 11 clock cycles, there is more than enough time allocated for phase extraction to afford it. The calculation of the arctangent of the quotient is accomplished by a pipelined, truncated iterative calculation in block 586 of the Taylor Series $$\tan^{-1}(x) = x - \frac{x^3}{3} + \frac{x^5}{5} - \frac{x^7}{7} + \frac{x^9}{9} - \dots, |x| < 1 \tag{56}$$

Figure 44:
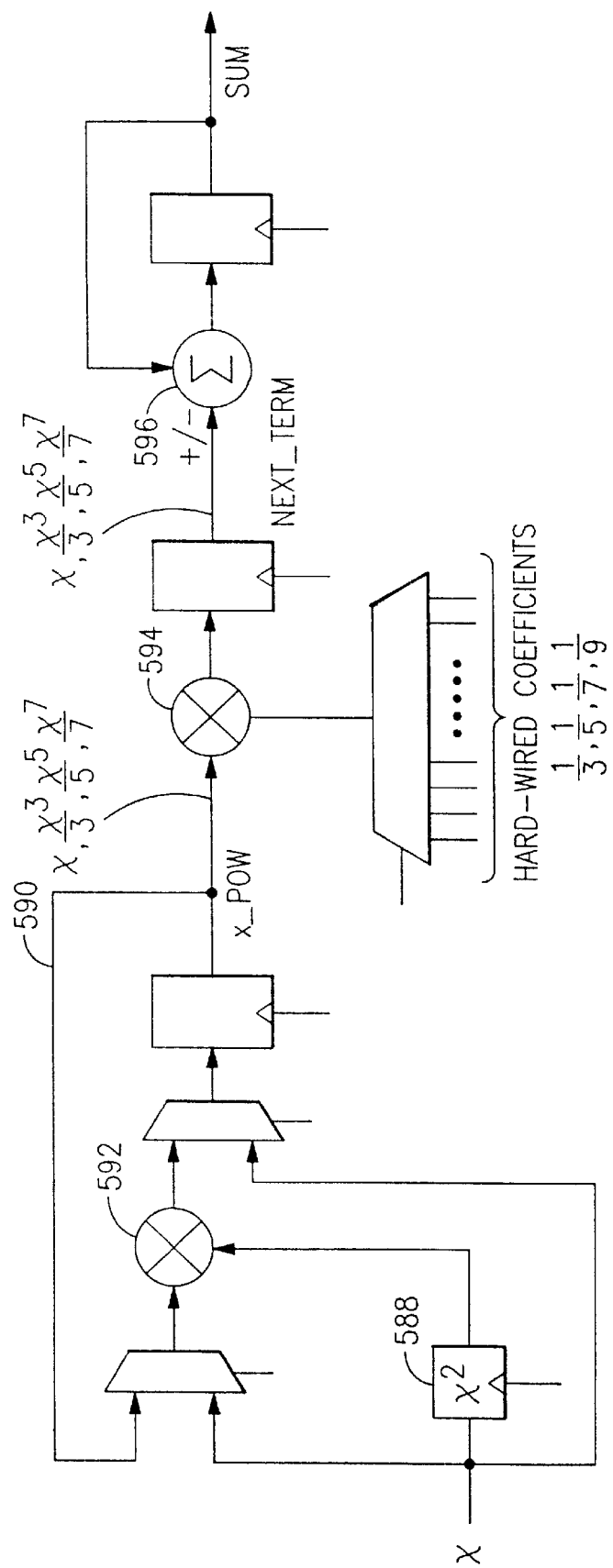
FIG. 44 is a schematic of the circuitry employed to calculate an arctangent in the block diagram shown in FIG. 43.

Block 586 is shown in greater detail in the schematic of FIG. 44. The value $x^2$ is calculated once in block 588 and stored for use in subsequent iterations. Powers of x are then iteratively computed using feedback line 590 and a multiplier 592. The divisions are calculated using a constant multiplier 594 in which the coefficients are hardwired. The sum is accumulated using adder/subtractor 596. The entire computation requires 47–48 clock cycles at 40 MHz.

Figure 45:
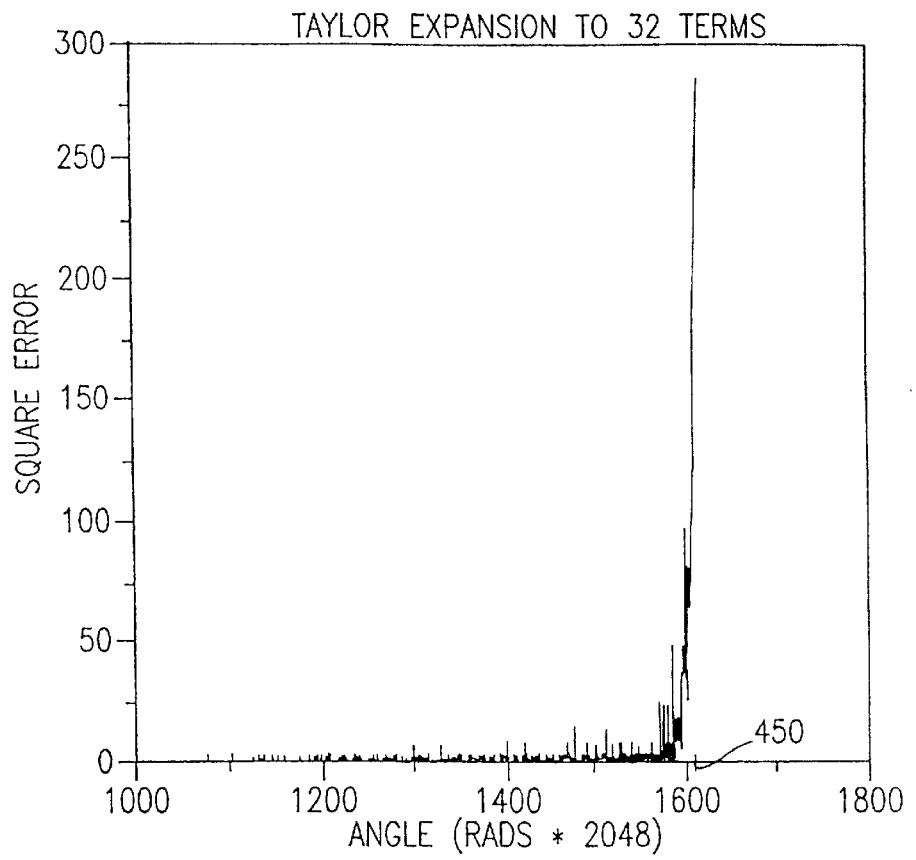
FIG. 45 is a plot of the square error at different values of a of the Taylor expansion to 32 terms.
Figure 46:
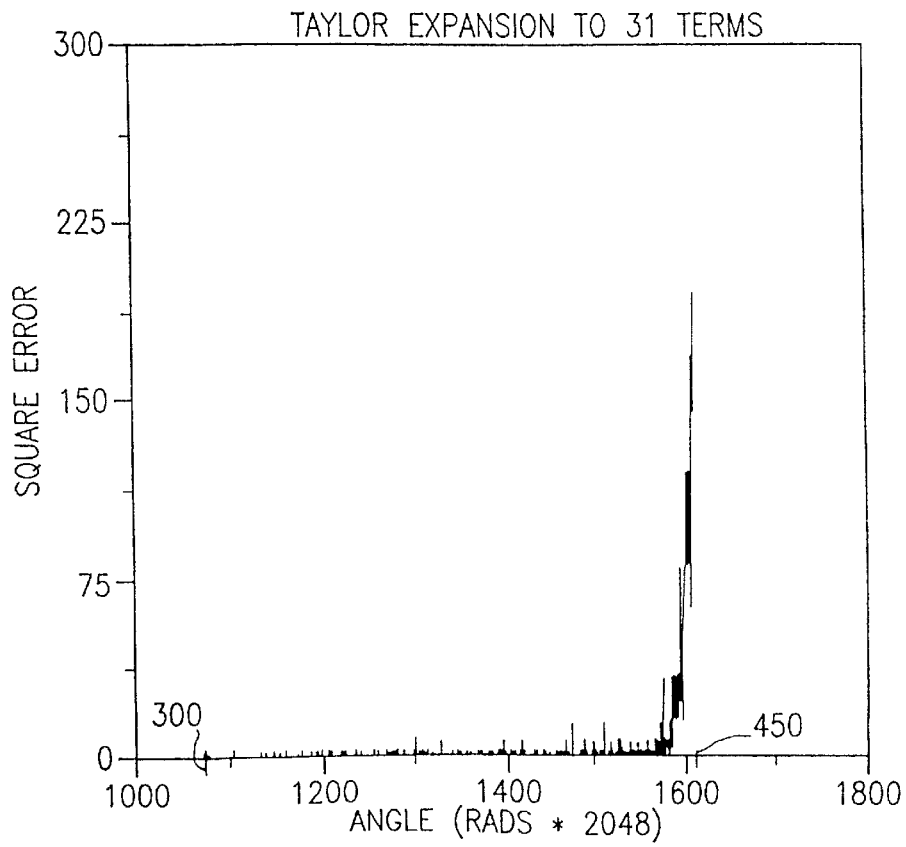
FIG. 46 is a plot of the square error at different values of a of the Taylor expansion to 31 terms.
Figure 47:
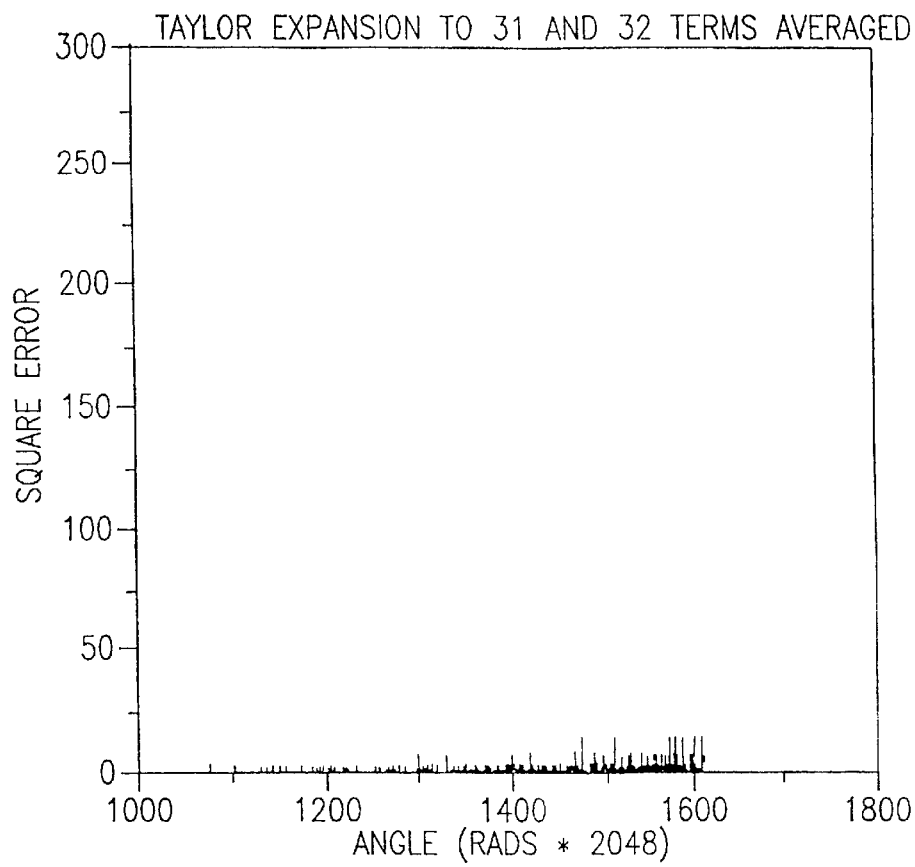
FIG. 47 is a plot of the square error at different values of a of the average of the Taylor expansion to 31 and 32 terms.

Turning again to FIG. 43, quadrant mapping, and the output of special cases is handled in block 598 under control of block 576. It may be noted that the square error of the result of the Taylor Expansion rises rapidly as a approaches 45 degrees, as shown in FIG. 45 and FIG. 46, which are plots of the square error at different values of a of the Taylor expansion to 32 and 31 terms respectively. The Taylor expansions to 31 and 32 terms are averaged, with the result that the square error drops dramatically, as shown in FIG. 47. A memory (not shown) for holding intermediate values for the averaging calculation is provided in block 598.

Constant Phase Error across all scattered Pilots is due to frequency offset at IQ Demodulator. Frequency Error can be defined as:

$$f_{err} = \frac{\alpha}{2\pi m T_t} \qquad (57)$$

where α, m and $T_t$ have the same meanings as given above. α is determined by taking the average of the difference of phase values of corresponding pilots between the current symbol and a symbol delayed for m symbol periods. In the above equation, m=1 in the case of continual pilots. This computation uses accumulation block 600 which accumulates the sum of the current symbol minus the symbol that preceded it by 4. Accumulation block 602 has an x multiplier, wherein x varies from 1 to a minimum of 142 (in 2K mode according to the ETS 300 744 telecommunications standard). The low pass filters 562, 566 can be implemented as moving average filters having 10–20 taps. The data available from the accumulation block 602 is the accumulated total of pilot phases each sampled m symbols apart. The frequency error can be calculated from $$f_{err} = \frac{Acc\{new - old\}}{(N)(2)\pi m T_t} \qquad (58)$$

Figure 48:
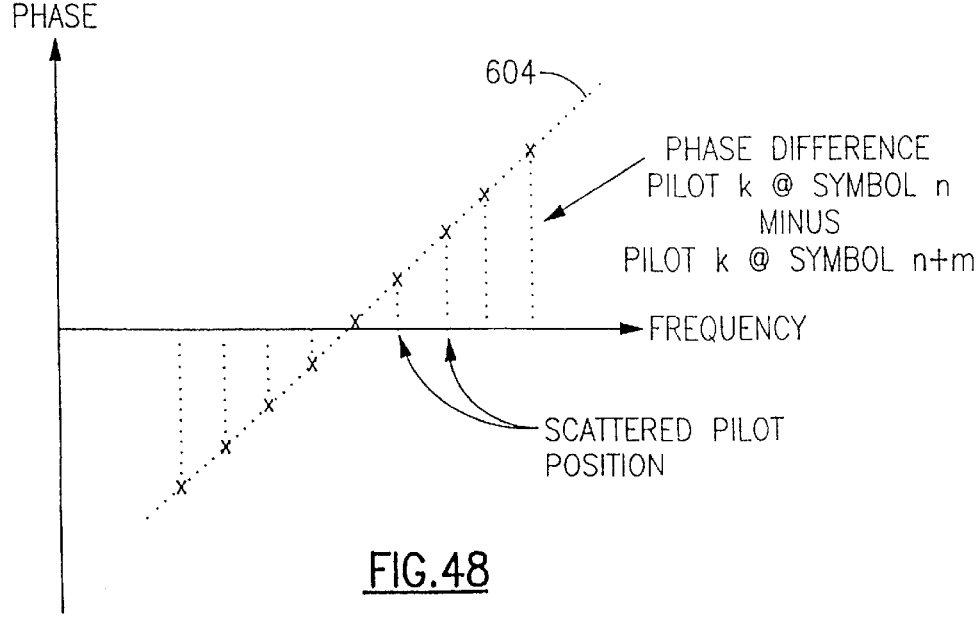
FIG. 48 is a plot of the phase differences of pilot carriers with a line of best fit shown.

N=142 in the case of scattered pilots, and 45 for continual pilots, assuming 2K mode of operation according to the ETS 300 744 telecommunications standard. The technique for determining sampling rate error is illustrated in FIG. 48, in which the phase differences of pilot carriers, computed from differences of every fourth symbol ($S_n$–$S_{n-4}$) are plotted against frequency of the carriers. The line of best fit 604 is indicated. A slope of 0 would indicate no sampling rate error.

Upon receipt of control signal 606 from the pilot locate block 408 (FIG. 14), a frequency sweep is initiated by block 608, which inserts an offset into the low-pass filtered frequency error output using adder 610. Similarly a frequency sweep is initiated by block 612, which inserts an offset into the low-pass filtered sampling rate error output using adder 614. The frequency sweeps are linear in increments of ⅛ of the carrier spacing steps, from 0–3.5 kHz corresponding to control signal values of 0x0–0x7.

Figure 49:
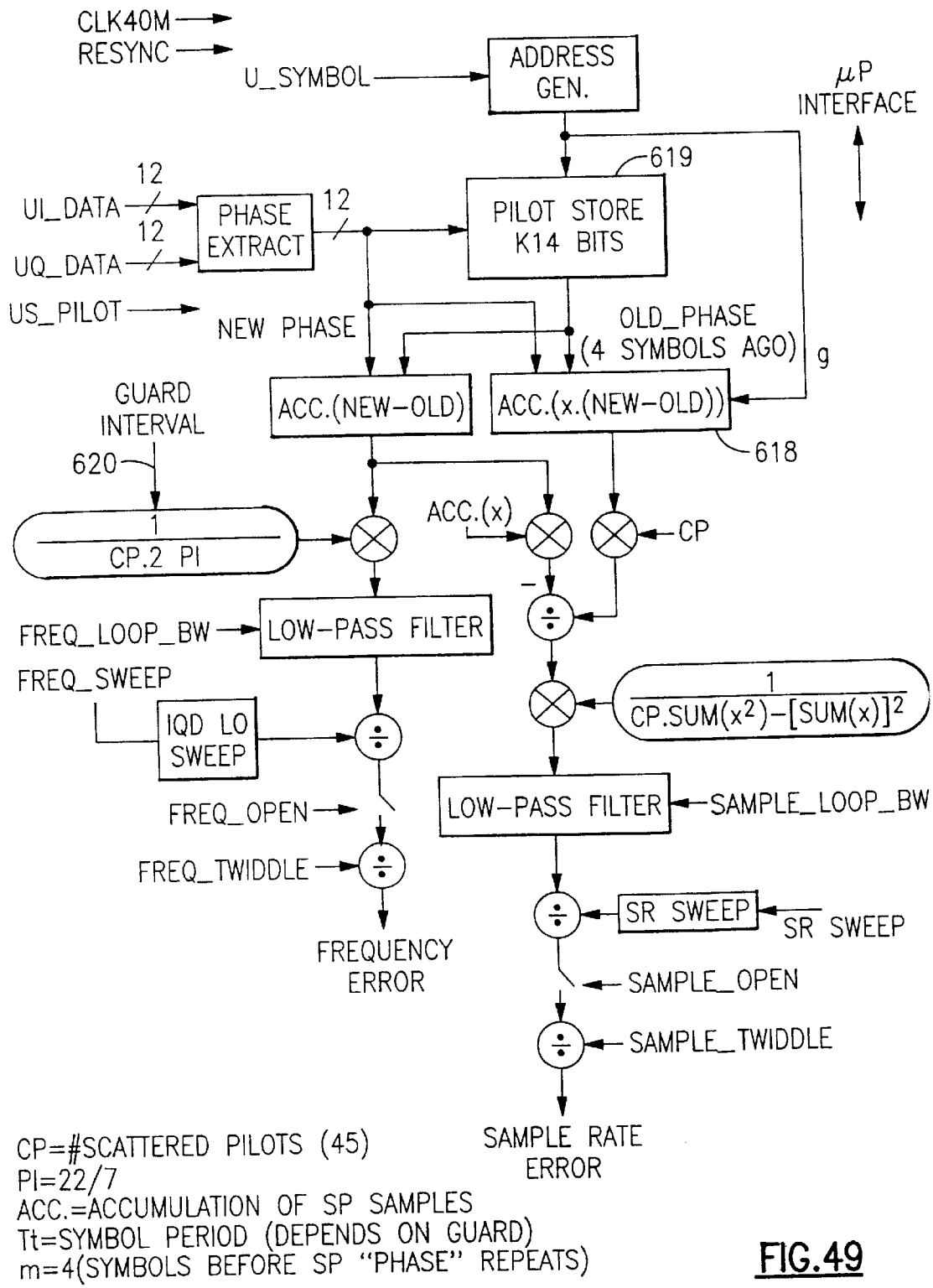
FIG. 49 is a more detailed block diagram an alternate embodiment of the automatic sampling control and automatic frequency control loops shown in FIG. 41.

A preferred embodiment of the correction circuitry 174 (FIG. 14) is shown in greater detail in FIG. 49. Continual pilots rather than scattered pilots are held in a memory store 616 at a resolution of 14 bits. The generation of the multiplier x for the computation in the accumulation block 618 is more complicated, since in accordance with the noted ETS 300 744 telecommunications standard, the continual pilots are not evenly spaced as are the scattered pilots. However, it is now only necessary to evaluate 45 continual pilots (in 2K mode according to the ETS 300 744 telecommunications standard). In this embodiment only the continual pilots of one symbol need be stored in the store 616. Inclusion of the guard interval size, is necessary to calculate the total duration of the symbol $T_t$, is received from the FFT window circuitry (block 166, FIG. 14) on line 620.

The input and output signals and signals relating to the microprocessor interface 142 of the circuitry illustrated in FIG. 42 are described in tables 24, 25, 26, and Table 27 respectively. The circuitry is further disclosed in Verilog code listings 24–35.

Demapper

Figure 50:
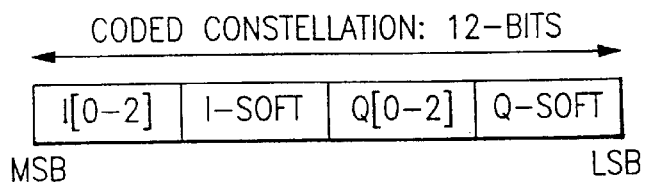
FIG. 50 illustrates a coded constellation format used in the demapping circuitry of FIG. 15.
Figure 51:
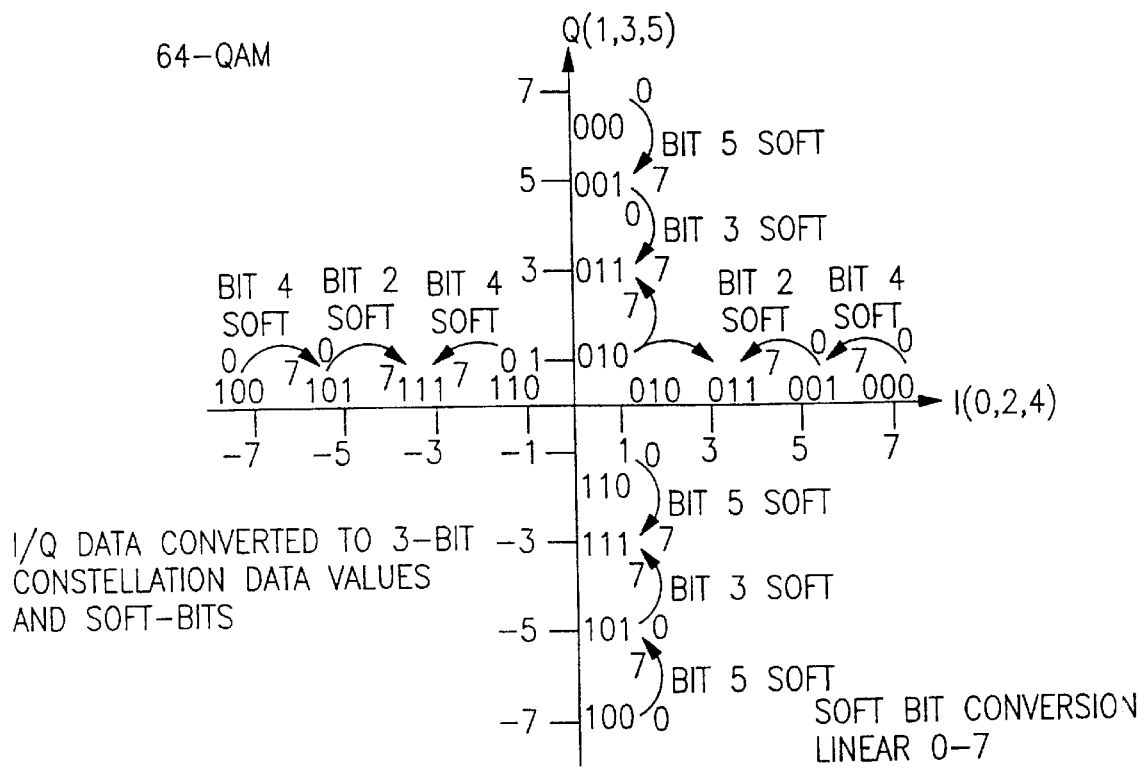
FIG. 51 illustrates the conversion of I,Q data to binary data value using the format shown in FIG. 50.

The demapping circuitry 176 (FIG. 15) is shown as a separate block for clarity, but in practice is integrated into the channel estimation and correction circuitry. It converts I and Q data, each at 12-bit resolution into a demapped 12-bit coded constellation format (3-bit I, I soft-bit, 3-bit Q, Q soft-bit). The coded constellation is illustrated in FIG. 50 and FIG. 51. For 64-QAM the 3 bits are used for the I and Q values, 2 bits for 16-QAM 2-bits and 1 bit for QPSK.

For example in FIG. 51 values of I=6.2, Q=−3.7 would be demapped to: I-data =001; I soft-bit=011; Q-data=101; Q soft-bit=101.

The input and output signals of the demapping circuitry 176 are described in tables 28 and 29 respectively.

Symbol Deinterleaver

Figure 52:
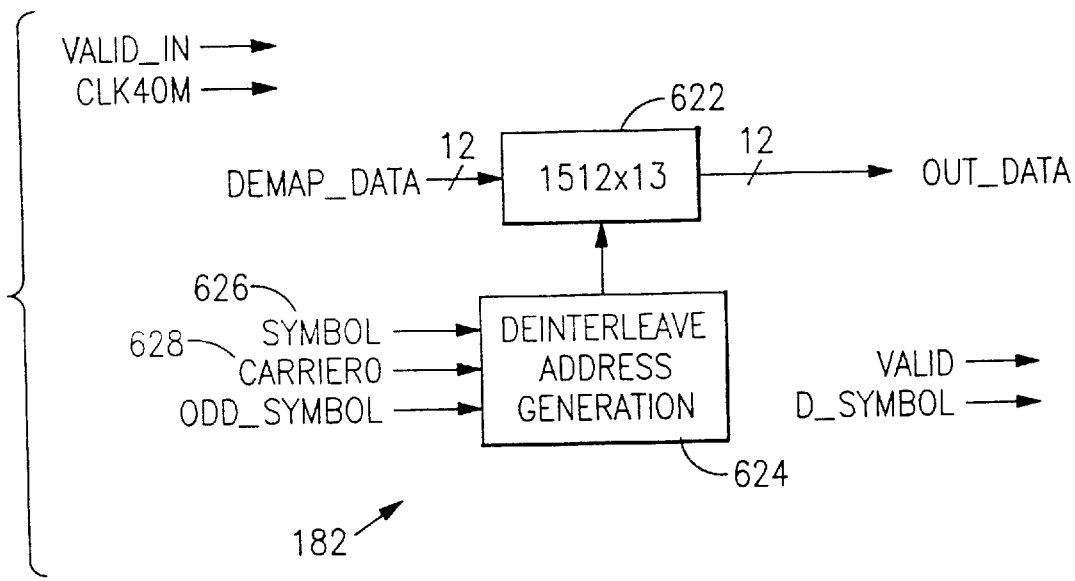
FIG. 52 is a more detailed block diagram of the symbol deinterleaving circuitry shown in FIG. 15.

The symbol deinterleaver 182 (FIG. 15) reverses the process of symbol interleaving of the transmitted signal. As shown in FIG. 52 the deinterleaver requires a 1512×13 memory store, indicated as block 622. The address generator 624 generates addresses to write in interleaved data and read out data in linear sequence. In practice the address generator 624 is realized as a read address generator and a separate write address generator. Reading and writing occur at different instantaneous rates in order to reduce the burstiness of the data flow. The address generator 624 is resynchronized for each new COFDM symbol by a symbol timing pulse 626. Carrier of index 0 is marked by carrier0 pulse 628. Addresses should be generated relative to the address in which this carrier is stored.

The input and output signals of the symbol deinterleaver 182 are described in tables 30 and 31 respectively. Circuitry of the symbol deinterleaver 182 is disclosed in Verilog code listing 22.

Bit Deinterleaver

Figure 53:
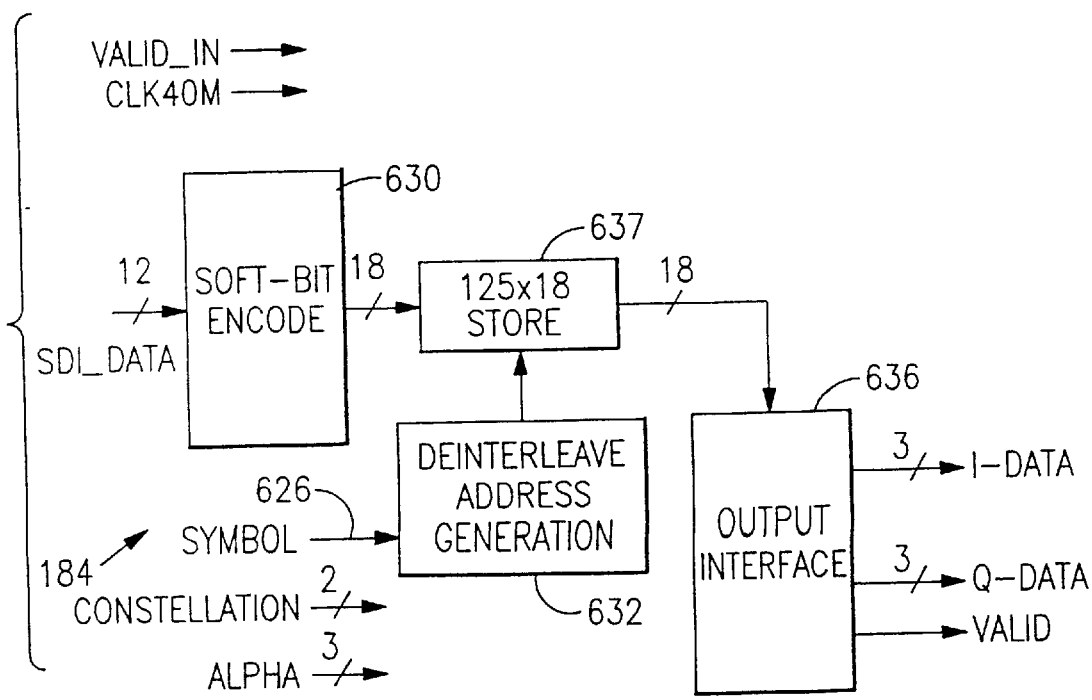
FIG. 53 is a more detailed block diagram of the bit deinterleaving circuitry shown in FIG. 15.
Figure 54:
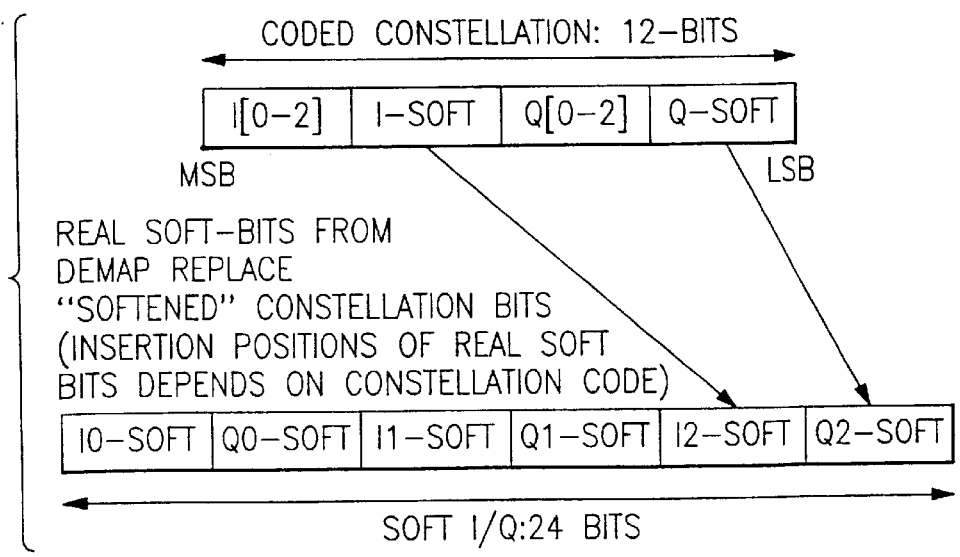
FIG. 54 illustrates the conversion from a coded constellation format to a 24 bit soft I/Q format by the bit deinterleaving circuitry shown in FIG. 53.

Referring to FIG. 54, the bit deinterleaver 184 (FIG. 15) reverses the process of bitwise interleaving of the transmitted signal, and is shown further detail in FIG. 53. In soft encoding circuitry 630 input data is reformatted from the coded constellation format to a 24 bit soft I/Q format. The soft encoding circuitry 630 is disclosed for clarity with the bit deinterleaver 184, but is realized as part of the symbol deinterleaver discussed above. The deinterleave address generator 632 generates addresses to read the 6 appropriate soft-bits from the 126×24 memory store 634, following the address algorithm in the ETS 300 744 telecommunications standard. The deinterleave address generator 632 is resynchronized for each new COFDM symbol by the symbol timing pulse 626.

The output interface 636 assembles I and Q output data streams from soft-bits read from the memory store 634. Three I soft bits and three Q soft bits are extracted from the memory store 634 at each deinterleave operation, and are parallel-serial converted to provide the input data stream to the Viterbi Decoder 186 (FIG. 15).

The input and output signals of the bit deinterleaver 184 are described in tables 32 and 33 respectively. Circuitry of the bit deinterleaver 184 is disclosed in Verilog code listing 23.

Host Microprocessor Interface

Figure 55:
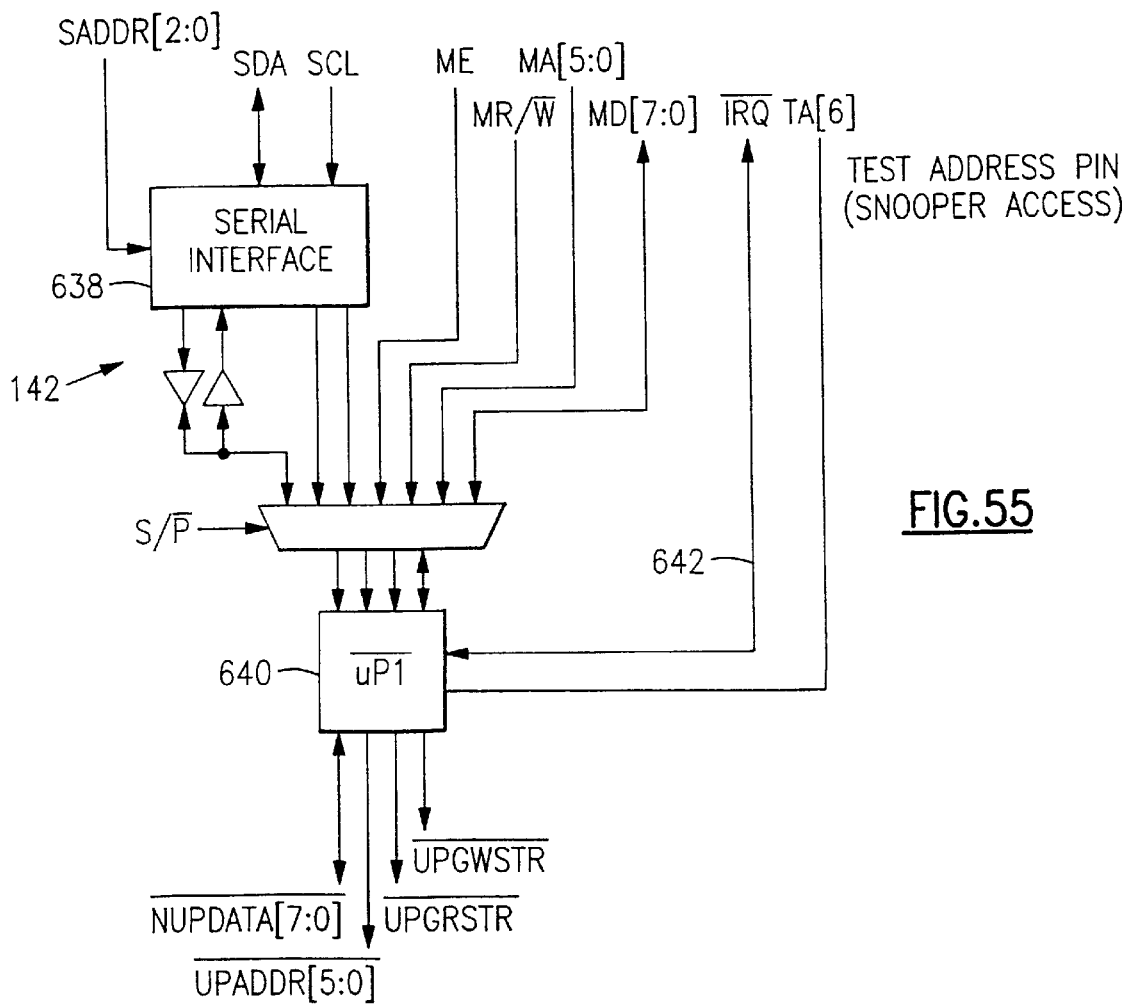
FIG. 55 is a more detailed block diagram of the microprocessor interface of the receiver shown in FIG. 12.

The function of the microprocessor interface 142 is to allow a host microprocessor to access control and status information within the multicarrier digital receiver 126 (FIG. 12). The microprocessor interface 142 is shown in greater detail in FIG. 55. A serial interface 638 and a parallel interface 640 are provided, the latter being primarily of value for testing and debugging. The serial interface 638 is of known type and is I2C compatible. The microprocessor interface 142 includes a maskable interrupt capability allowing the receiver to be configured to request processor intervention depending on internal conditions. It should be noted, that the multicarrier digital receiver 126 does not depend on intervention of the microprocessor interface 142 for any part of its normal operation.

The use of interrupts from the point of view of the host processor is now described. "Event" is the term used to describe an on-chip condition that a user might want to observe. An event could indicate an error condition or it could be informative to user software. There are two single bit registers (not shown) are associated with each interrupt or event. These are the condition event register and the condition mask register.

The condition event register is a one bit read/write register whose value is set to one by a condition occurring within the circuit. The register is set to one even if the condition only existed transiently. The condition event register is then guaranteed to remain set to one until the user's software resets it, or the entire chip is reset. The condition event register is cleared to zero by writing the value one. Writing zero to the condition event register leaves the register unaltered. The condition event register must be set to zero by user software before another occurrence of the condition can be observed.

The condition mask register is a one bit read/write register which enables the generation of an interrupt request if the corresponding condition event register is set. If the condition event is already set when 1 is written to the condition mask register an interrupt request will be generated immediately. The value 1 enables interrupts. The condition mask register clears to zero on chip reset. Unless stated otherwise a block will stop operation after generating an interrupt request and will restart soon after either the condition event register or the condition mask register are cleared.

Event bits and mask bits are always grouped into corresponding bit positions in consecutive bytes in the register map. This allows interrupt service software to use the value read from the mask registers as a mask for the value in the event registers to identify which event generated the interrupt. There is a single global event bit that summarizes the event activity on the chip. The chip event register presents the OR of all the on-chip events that have 1 in their respective mask bit. A value of 1 in the chip mask bit allows the chip to generate interrupts. A value of 0 in the chip mask bit prevents any on-chip events from generating interrupt requests. Writing 1 or 0 to the chip event register has no effect. The chip event register only clears when all the events enabled by a 1 in their respective mask bits have been cleared.

The IRQ signal 642 is asserted if both the chip event bit and the chip event mask are set. The IRQ signal 642 is an active low, "open collector" output which requires an off-chip pull-up resistor. When active the IRQ output is pulled down by an impedance of 100 Ω or less. A pull-up resistor of approx. 4 kΩ is suitable.

The input and output signals of the microprocessor interface 142 are described in tables 34 and 35 respectively.

System Controller

Figure 56:
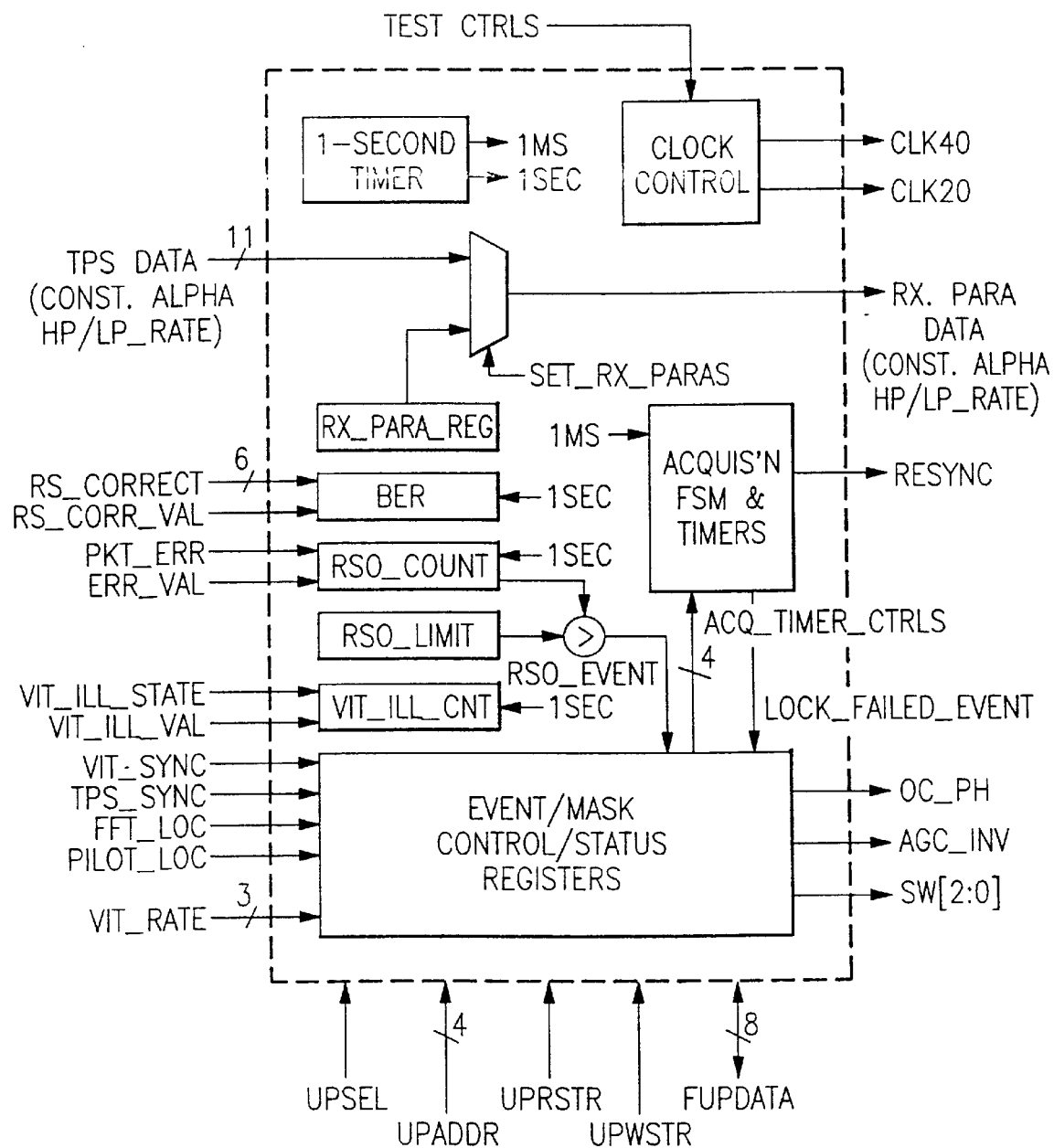
FIG. 56 is a more detailed block diagram of the system controller of the receiver shown in FIG. 12.

The system controller 198 (FIG. 15), which controls the operation of the multicarrier digital receiver 126 (FIG. 12), in particular channel acquisition and the handling of error conditions, is shown in further detail in FIG. 56.

Figure 57:
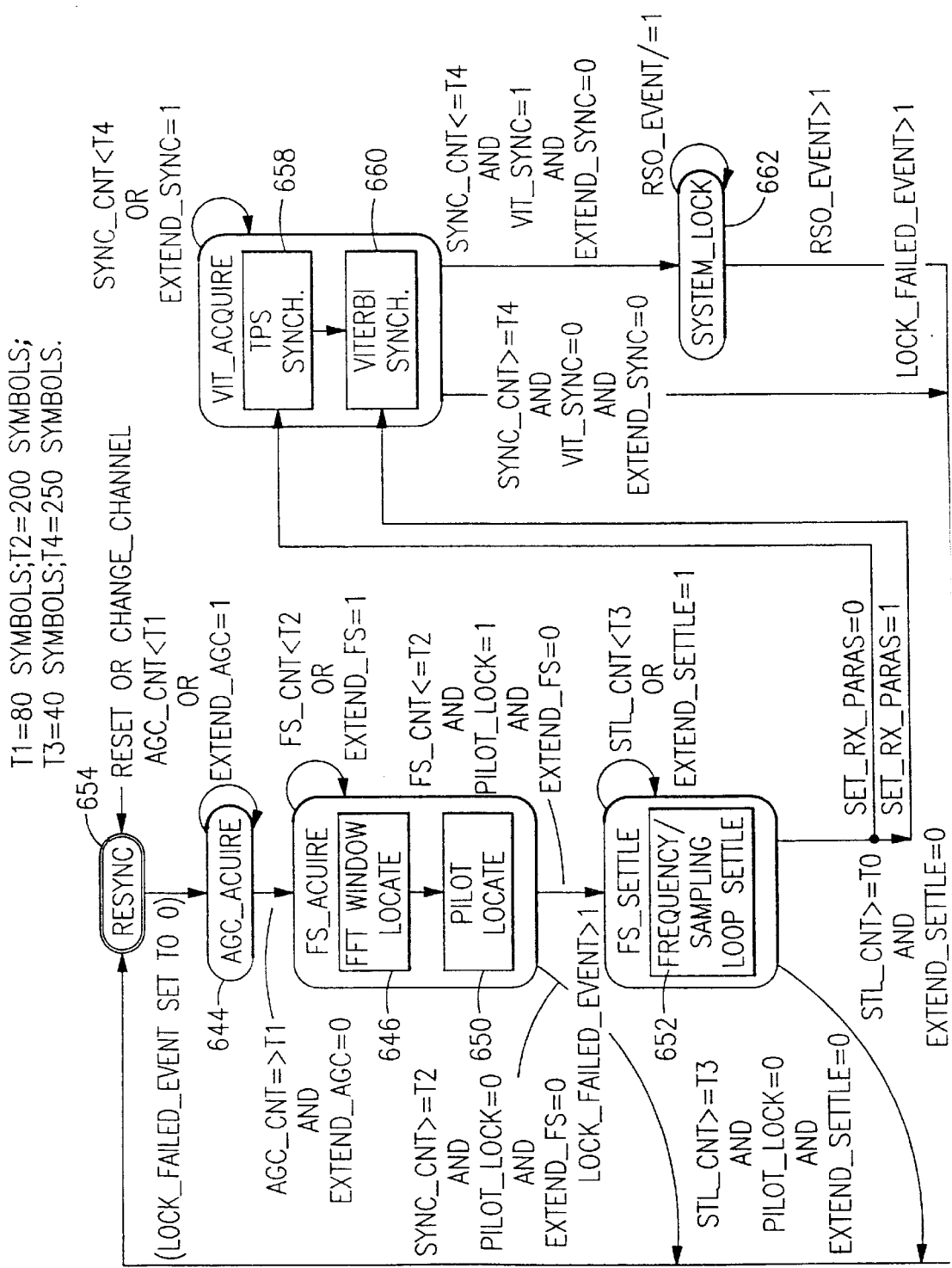
FIG. 57 is a state diagram relating to channel acquisition in the system controller of the receiver shown in FIG. 56.

Referring to the state diagram in FIG. 57, the channel acquisition sequence is driven by four timeouts.

(1) AGC acquisition timeout. 20 ms (80 symbols) are allowed for the AGC to bring up the signal level, shown in step 644. Then the FFT window is enabled to start acquisition search in block 646.

(2) Symbol acquisition timeout: 200 symbol periods, the maximum guard interval plus active symbol length, is allocated to acquire the FFT window in step 648. Another 35 symbol periods are allocated to pilot location in step 650. Approximately 50 ms are required to process 2K OFDM symbols. An option is provided to exit step 650 as soon as the pilots have been located to save acquisition time in non-extreme situations.

(3) Control Loop Settling timeout: A further 10 ms, representing approximately 40 symbols is allocated to allow the control loops to settle in step 652. An option is provided to exit step 652 and return to an initial step resync 654 if pilots have been lost if control loop settling timeout occurs.

(4) Viterbi synchronization timeout: In block 656 approximately 150 symbol periods are allocated for the worst case of tps synchronization, indicated by step 658 and approximately 100 symbol periods for the Viterbi Decoder 186 (FIG. 15) to synchronize to the transmitted puncture rate, shown as step 660. This is approximately 65 ms. In reasonable conditions it is unnecessary to wait this long. As soon as Viterbi synchronization is established, then transition to the system_lock state 662. It is possible to bypass the tps synchronization requirement by setting parameters (see table below) in the receiver parameters register and setting set_rx_parameters to 1.

If acquisition fails at any stage, the process automatically returns to step resync 654 for retry.

Having acquired lock, the system will remain in lock unless a Reed-Solomon overload event occurs, i.e. the number of Reed-Solomon packets with uncorrectable 15 errors exceeds a predetermined value (the rso_limit value) in any 1 second period. If any of the 4 synchronizing state machines in the acquisition sequence, FFT window (step 648), pilot locate (step 650), tps synchronization (step 658) and Viterbi synchronization (step 660), lose synchronization once channel acquisition has occurred, no action will be taken until an event, rso_event, occurs and the step resync 654 is triggered automatically.

In poor signal conditions acquisition may be difficult, particularly the Viterbi synchronization. Therefore a bit is optionally provided in the microprocessor interface 142 (FIG. 12), which when set extends the timeouts by a factor of 4.

The input and output signals, and the microprocessor interface registers of the system controller 198 are described in tables 36, 37, 38, and 39 respectively.

TABLE 4

Tables

| Pin Name | I/O | Description |
| --- | --- | --- |
| Tuner/ADC Interface | | |
| SCLK | O | Sample clock for ADC |
| IDATA[9:0] | I | Input ADC data bus (10-bit) |
| AGC | O | Automatic Gain Control to tuner (Sigma-Delta output) |
| XTC[2:0] | O | External Tuner Control Outputs |
| MPEG-2 Transport Interface | | |
| OUTDAT[7:0] | O | MPEG-2 Transport Stream Data bus |
| OUTCLK | O | MPEG Transport Stream Output Clock |
| SYNC | O | MPEG Transport Stream Sync pulse (1 per 188byte) |

TABLE 4-continued

Tables

| Pin Name | I/O | Description |
|---|---|---|
| VALID | O | MPEG Transport Stream Valid data flag |
| ERROR | O | MPEG Transport Stream Errored data flag |
| Serial Host Microprocessor Interface | | |
| SD | I/O | Serial Interface Data |
| SC | I | Serial Interface Clock |
| SDT | I/O | Serial Data Through |
| SCT | O | Serial Clock Through (40MHz clock out when DEBUG is high |
| SADDR[2:0] | I | Serial Address Inputs (Hardwired external value) used as TSEL pins when DEBUG is high |
| Parallel Host Microprocessor Interface | | |
| MA[5:0] | I | Microprocessor Address Bus |
| MD[7:0] | I/O | Microprocessor Data Bus 2-bit/DEBUG data @ 40MHz |
| MWE | I | Microprocessor Write Enable |
| MCE | I | Microprocessor Chip Enable |
| NOTIRQ | O | Interrupt Request |
| JTAG Test Access Port | | |
| TCK | I | JTAG Test Clock |
| TMS | I | JTAG Test Mode Select |
| TDI | I | JTAG Test Data In |
| TDO | O | JTAG Test Data Out |
| NTRST | I | JTAG TAP Controller Reset |

TABLE 4-continued

Tables

| Pin Name | I/O | Description |
|---|---|---|
| Miscellaneous Pins | | |
| NRESET | I | Asynchronous Reset |
| CLK40 | I | 40MHz Input Clock |
| TSTRI | I | Transport Stream Interface tristate control |
| TA (MA[6]) | I | Test Address Bit - Snooper access (Bit 7 of up address bus) |
| DEBUG | I | Test Pin |
| TSEL [2:0]/SADDR[2:0] | I | Internal Test Inputs (mux out internal data onto MD[7:0] 0 = normal upi, 1 = fft input data (24-bit), 2 = fft output data (24-bit), 3 = channel correction output data (24-bit), 4 = fec input data. (2 × 3-bit softbit) all data clocked out @ 40MHz, 24-bit data in 4 bytes. Clock brought out on SCT pin, for convenience. Symbol timing/other synch. signals indicated with market bits in data. |
| TLOOP | I | Test Input |

TABLE 5

| Address (Hex) | Bit No. | Dir/Reset | Register Name | Description |
|---|---|---|---|---|
| 0x00 | Event Reg. | | | |
| | 0 | R/W/0 | chip_event | OR of all events which are interrupt-enabled (unmasked) |
| | 1 | R/W/0 | lock_failed_event | Set to 1 if channel acquisition sequence fails |
| | 2 | R/W/0 | rs_overload_event | Set to 1 if Reed-Solomon Deocder exceeds set threshold within one 1 second period |
| 0x01 | Mask Reg. | | | |
| | 0 | R/W/0 | chip_mask | Set to 1 to enable IRQ output |
| | 1 | R/W/0 | lock_failed_mask | Set to 1 to enable interrupt on channel acquisition fail |
| | 2 | R/W/0 | rs_overload_mask | Set to 1 to enable interrupt on RS error threshold exceeded |
| 0x02 | Status Reg. | | | |
| | 0 | R/0 | system_locked | Set to 1 when system acquired channel successfully |
| | 1 | R/0 | viterbi_sync | Set to 1 when Viterbi is synchronized |
| | 2 | R/0 | tps_sync | Set to 1 when OFDM frame carrying TPS data has been synchronized to. |
| | 3 | R/0 | pilot_loc | Set to 1 when pilots in COFDM symbol have been located and synchronized to |

TABLE 5-continued

| Address (Hex) | Bit No. | Dir/Reset | Register Name | Description |
|---|---|---|---|---|
| | 4 | R/0 | fft_loc | Set to 1 when guard interval has been located and synchronized to. |
| | 7:5 | R/1 | viterbi_rate | Received Viterbi Code rate |
| 0x04– 0x05 | Control Reg: | | | |
| | 0 | R/W/0 | change_channel | When set to 1, holds device in "Reset" state. Clearing this bit initiates channel change. |
| | 1 | R/W/0 | agc_invert | Invert AGC Signa-Delta output. Default setting means low output associated with reduced AGC gain. |
| | 2 | R/W/0 | o_clk_phase | Set to 1 to invert phase of output clock. Default condition: output data changes on falling edge of output clock. |
| | 3 | R/W/0 | set_rx_parameters | Set to 1 to take Receiver Parameter Data from Receiver Parameter Register. Default condition: settings taken from TPS data (longer channel acquisition time) |
| | 4 | R/W/0 | extend_agc | Set to 1 to hold acquisition sequence in agc_acquire state |
| | 5 | R/W/0 | extend_fs | Set to 1 to hold acquisition sequence in fs_acquire state |
| | 6 | R/W/0 | extend_settle | Set to 1 to hold acquisition sequence in fs_settle state |
| | 7 | R/W/0 | extend_sync | When set to 1 to hold acquisition sequence in vit_sync state |
| | 10:8 | R/W/0 | xtc | External Tuner Control bits (external pins XTC[2:0]) |
| | 11 | R/W/0 | i2c_gate | 12C "Gate" signal; setting this to 1 enables the isolation buffer between the "processor side 12C" bus and the "Tuner side" 12C so the processor can access a Tuner through COFDM device. Setting to 0 closes the "gate" to prevent 12C bus noise affecting delicate RF. |
| | 12 | R/W/ (TSTRI) | ts_tri | Transport Stream Tristate control - set to 1 to tristate MPEG TS interface (e.g. to mux a QPSK device to same MPEG demux). Power-on state of TS output controlled by external pin TSTRI. |
| | 13 | R/W/0) | fast_ber | Set to 1 reduce BER counter, vit_ill_state counter and rso_counter, counter periods from 1 sec to 100ms. |
| | 15 | R/W/0 | soft_reset | Software Reset - set to 1 to reset all blocks except upi. Set to 0 to release. |
| 0x06– 0x07 | Receiver Parameter Register: | | | |
| | 15:14 | R/W/2 | upi_constellation | Constellation Pattern for Demapper and Bit Deinterleaver (reset condition = 64-QAM) |

TABLE 5-continued

| Address (Hex) | Bit No. | Dir/Reset | Register Name | Description |
|---|---|---|---|---|
| | 13:12 | R/W/0 | upi_guard | Guard Interval, 00 = 1/32, 01 = 1/16, 10 = 1/8, 11 = 1/4 |
| | 11:9 | R/W/0 | upi_alpha | Hierachical Tranmission Mode or "alpha value" (reset condition = non-hierarchical mode) |
| | 7:5 | R/W/0 | upi_hp_rate | Viterbi Code Rate for HP stream - in non-hierarchical mode this is taken as the Viterbi Code Rate (reset condition = 1/2 rate code) |
| | 4:2 | R/W/0 | upi_lp_rate | Viterbi Code Rate for LP stream (reset condition = 1/2 rate code) |
| | 1:0 | R/W/0 | upi_tx_mode | Tranmission mode (00 = 2K, 01 = 8K, others reserved) |
| 0x08 | 7:0 | R/W/0 | rso_limit | Errored packet per second limit (for rs_overload_event bit) |
| 0x09 | 7:0 | R/0 | rso_count | Count of Uncorrectable Transport Packets per second (saturates at 255). Write to register to latch a stable count value which can then be read back |
| 0x0a–0x0b | 15:0 | R/0 | ber | BER (before RS) deduced from RS corrections in 1 second period - max correctable bit erros ~1.35M/sec for 7/8, 64-QAM, 1/32 GI (equivalent to 43.e-3 BER assuming useful bitrate of 31.67 e6). Only top 16 bits of 21 bit counter are visible - resolution of ~1e-6 depending on code-rate, constellation GI length. Write to register to latch a stable count value which can then be read back. |
| 0x0c–0x0d | 15:0 | R/0 | agc_level | AGC "Control Voltage" (msb's) |
| 0x0e–0x0f | 11:0 | R/0 | freq_error | IQ Demodulator Frequency Error (from feedback loop) |
| 0x10–0x13 | TPS (Data including future use bits) | | | |
| | 1:0 | R/0 | tps_frame | Number of last received cmplete OFDM frame in superframe |
| | 3:2 | R/0 | tps_constellation | Constellation Pattern from TPS data |
| | 7:5 | R/0 | tps_alpha | Hierachical Transmission Information |
| | 10:8 | R/0 | tps_hp_rate | Viterbi Code Rate of High-Priority stream (In non-hierarchical mode this is the code rate of the entire stream) |
| | 13:11 | R/0 | tps_lp_rate | Viterbi Code Rate of Low-Priority stream |
| | 15:14 | R/0 | tps_guard_int | Guard Interval |
| | 17:16 | R/0 | tps_tx_mode | Transmission Mode |
| | 31:19 | R/0 | tps_future | Undefined bits allocated for future use |
| *** Debug Access *** | | | | |
| 0x20–0x231 | 15 | R/W/0 | agc_open | Set to 1 to break AGC control loop |
| | 11:0 | R/W/0 | agc_twiddle | AGC twiddle factor |
| 0x22–0x23 | | R/W/0 | agc_loop_bw | AGC Control loops parameters |
| 0x24– | 15 | R/W/0 | freq_open | Set to 1 to break freq con- |

TABLE 5-continued

| Address (Hex) | Bit No. | Dir/Reset | Register Name | Description |
|---|---|---|---|---|
| 0x25 | | | | trol loop |
| | 14 | R/W/0 | freq_nogi | Set to 1 to allow frequency update anytime, not just during Guard Interval |
| | 11:0 | R/W/0 | freq_twiddle | IQ Demod twiddle factor |
| 0x26–0x27 | | | freq_loop_bw | Frequency Control Loop parameters |
| 0x28–0x29 | 15 | R/W/0 | sample_open | Set to 1 to break sample control loop |
| | 14 | R/W/0 | sample_nogi | Set to 1 to allow sample update anytime, not just during Guard Interval |
| | 11:0 | R/W/0 | sample_twiddle | Sampling Rate Twiddle factor |
| 0x2a–0x2b | | R/W/0 | sample_loop_bw | Sampling Rate Control Loop parameters |
| 0x2c–0x2d | 11:0 | R/0 | sampling_rate_err | Sampling Rate Error (from feedback loop) |
| 0x30–0x31 | 15 | R/W/0 | lock_fft_window | Set to 1 to prevent fft_window moving in Tracking mode |
| | 14 | R/W/0 | inc_fft_window | Write 1 to move fft_window position one sample period later (one-shot operation) |
| | 13 | R/W/0 | dec_fft_window | Write 1 to more fft_window position one sample period earlier (one-shot operation) |
| | 12:0 | R/0 | fft_window | FFT Window position |
| | 7:0 | R/W/0 | fft_win_thresh | FFT Window Threshold |
| 0x34–0x35 | 15 | R/W/0 | set_carrier_0 | Set to 1 to use carrier_0 value as setting |
| | 11:0 | R/W/0 | carrier_0 | Carrier 0 position; readback value detectged by Pilot Locate algorithm or force a value by writing over it |
| 0x36 | 7:0 | R/W/ | csi_thresh | Channel State Information threshold - the fraction of mean level below which data carriers are marked by a bad_carrier flag. Nominally 0.2 (for 2/3 code rate). |
| 0x37 | | | | |
| 0x38–0x39 | 11:0 | R/0 | vit_ill_states | Viterbi Illegal State Rate (per second) Write to register to latch count which can then be read back |
| ***** SNOOPERS ***** (External test address bit TA[6] = 1) | | | | |
| 0x40–0x41 | 15:14 11:0 | R/WR/W | T,IQGIFreq_error[11:0] | IQ Demod Snooper (Note: bit 0 = lsb of highest addressed byte, 21) |
| 0x44–0x47 | 31:30 | R/W | T, Valid | Low-Pass Filter Snooper |
| | 27:16 | R/W | Q-data[11:0] | |
| | 11:0 | R/W | I-data[11:0] | |
| 0x48–0x4d | 47:46 | R/W | T,SincGI | Resampler Snooper |
| | 43:32 | R/W | Sample_err[11:0] | |
| | 31 | R/W | Valid | |
| | 27:16 | R/W | Q-data[11:0] | |
| | 11:0 | R/W | I-data[11:0] | |
| 0x50–0x53 | 31:29 | R/W | T, Valid,Resync | FFT Snooper |
| | 27:16 | R/W | Q-data[11:0] | |
| | 11:0 | R/W | I-data[11:0] | |
| 0x54–0x57 | 31:30 | R/W | T, Valid, | Channel Estimation & Correction Snooper |
| | 29:28 | R/W | Symbol,Resync | |
| | 27:16 | R/W | Q-data[11:0] | |
| | 11:0 | R/W | I-data[11:0] | |
| 0x58–0x5b | 31:30 | R/W | T, Resync | Frequency & Sampling Error Snooper |
| | 29:28 | R/W | u_symbol, uc_pilot | |
| | 27:16 | R/W | Q-data[11:0] | |
| | 11:0 | R/W | I-data[11:0] | |
| 0x5c–0x5f | 31:30 | R/W | T, Resync | TPS Sequence Extract Snoopers |
| | 29:28 | R/W | c_symbol, tps_pil. | |
| | 27:16 | R/W | Q-data[11:0] | |
| | 15 | R/W | reference_seq | |
| | 11:0 | R/W | I-data[11:0] | |
| 0x60– | 39 | R/W | T | Demap Snooper |

TABLE 5-continued

| Address (Hex) | Bit No. | Dir/Reset | Register Name | Description |
|---|---|---|---|---|
| 0x65 | 36:35 | R/W | constellation | |
| | 34:32 | R/W | alpha | |
| | 27:16 | R/W | Q-data[11:0] | |
| | 15:14 | R/W | Valid, c_symbol | |
| | 13 | R/W | c_carrier0 | |
| | 11:0 | R/W | I-data[11:0] | |
| 0x68– 0x6a | 23:22 | R/W | T, valid symbol, | Symbol Deinterleave Snooper |
| | 21:20 | R/W | carrier0 | |
| | 19 | R/W | odd_symbol | |
| | 11:0 | R/W | demap_data[11:0] | |
| 0x6c– 0x6e | 23:21 | R/W | T, valid, symbol | Bit Deinterleaver Snooper |
| | 20:19 | R/W | constellation | |
| | 18:16 | R/W | alpha | |
| | 11:0 | R/W | symdi_data[11:0] | |
| 0x70– 0x71 | 15:13 | R/W | T, valid, resync | Viterbi Snooper |
| | 6:4 | R/W | Q-data[2:0] | |
| | 2:0 | R/W | I-data[2:0] | |
| 0x72– 0x73 | 15:14 | R/W | T, valid, | Forney Deinterleaver Snooper |
| | 13:12 | R/W | resync, eop | |
| | 7:0 | R/W | vit_data[7:0] | |
| 0x74– 0x75 | 15:14 | R/W | T, valid, | Reed Solomon Snooper |
| | 13:12 | R/W | resync, eop | |
| | 7:0 | R/W | deint_data[7:0] | |
| 0x76– 0x77 | 15:14 | R/W | T, valid, | Output Interface Snooper |
| | 13:12 | R/W | resync, eop | |
| | 11:0 | R/W | error_val, error | |
| | 7:0 | R/W | deint_data[7:0] | |
| 0x78– 0x7b | 31 | R/W | T | System Controller Snooper |
| | 30:20 | R/W | tps_data[10:0] | |
| | 19:18 | R/W | pkt_err, err_val | |
| | 17 | R/W | vit_ill_state | |
| | 16 | R/W | vit_ill_val | |
| | 14 | R/W | rs_corr_val | |
| | 13:8 | R/W | rs_correct[5:0] | |
| | 6:5 | R/W | vit_sync, tps_sync | |
| | 4:3 | R/W | pilot_loc, fft_loc | |
| | 2:0 | R/W | vit_rate[2:0] | |

TABLE 6

| Signal | Description |
|---|---|
| clk | 40MHz main clock |
| clk20M | 20MHz sample clock (used as a "valid" signal to indicate when valid input samples are received) |
| data[9:0] | sampled data input from ADC |
| agc_resync | control input; held low on channel change - on transition to high AGC should reset itself and accumulate new control voltage for new channel. |
| updata[7:0] (bi-di) | Internal Microprocessor Data bus |
| upaddr[2:0] | Internal Microprocessor Address Bus (only 2-bits required) |
| upwstr | Internal uP write strobe |
| uprstr | Internal uP read strobe |
| upsel1 | Internal Address decode output (high = valid for 0x0c–0x0d) |
| upsel2 | Internal Address decode output (high = valid for 0x20–0x23) |
| te, tdin | Scan inputs |

TABLE 7

| Signal | Description |
|---|---|
| agc | Signal - Delta modulated output signal; when integrated by external RC it provides an analogue representation of the internal digital "control voltage" valueInterpolated output data |
| tdout | scan outputs |

TABLE 8

| Address (Hex) | Bit No. | Dir/Reset | Register Name | Description |
|---|---|---|---|---|
| 0x0c–0x0d | 15:0 | R/0 | agc_level | AGC "Control Voltage" (msb's) |
| 0x20–0x21 | 15 | R/W/0 | agc_open loop | Set to 1 to break AGC control loop |
| | 11:0 | R/W/0 | agc_twiddle | AGC twiddle factor |
| 0x22–0x23 | | R/W/0 | agc_loop_bw | AGC Control loops parameters |

TABLE 9

| Signal | Description |
|---|---|
| clk | 40MHz main clock |
| nrst | Active-low synchronous reset |
| clk20M | 20MHz sample clock (used as a "valid" signal to indicate when input data sample is valid) |
| sample[9:0] | input data sample from ADC. (AGC should ensure that this white-noise-like signal is scaled to full dynamic range) |
| freq_err[11:0] | Frequency Error input - 1Hz accurate tuning over +/−0.5 carrier spacing |
| IQGI | Valid pulse for enable frequency error signal. The effect of the frequency control loop is held off until a guard interval is passing through the IQ Demod block. (IQGI is generated by the FFT window and indicates when a guard interval is passing). |
| te, tdin | Scan test inputs |

TABLE 10

| Signal | Description |
| --- | --- |
| I-data[11:0] | I data-stream to be low-pass filtered (40MHZ timing) |
| Q-data[11:0] | Q data-stream to be low-pass filtered (40MHZ timing) |
| valid | Valid output data indicator; high if data is being output on this clock cycle (40MHZ timing) |
| tdout | Scan test output |

TABLE 11

| Signal | Description |
| --- | --- |
| clk | 40MHz clock (2x sample clock) |
| nrst | Active-low synchronous reset |
| valid_in | high-pulse indicating valid data from IQ-demodulator (40MHz timing) |
| i_data[11:0], q_data[11:0] | input data from IQ-demodulator (20Msps) |
| te, tdin | Scan test inputs |

TABLE 12

| Signal | Description |
| --- | --- |
| i_out[11:0], q_data[11:0] | Low-Pass filtered output data |
| valid | Output pulse indicating valid data output (decimated to 10Msps) |
| tdout | Scan test output |

TABLE 13

| Signal | Description |
| --- | --- |
| clk40M | 40MHz main clock (2x sample clock) |
| valid_in | input data valid signal; when valid is low, input data should be ignored |
| i_data[11:0], q_data[11:0] | input data from low-pass filter (decimated to 10Msps) |
| sr_err[11:0] | SamplingRate Error feedback fro Freq/Sampling Error block |
| SincGI | Valid pulse for Error signal; effect of Sampling Rate control loop is held off until guard interval is passing through Sinc Interpolator. FFT Window block generates this signal at appropriate time. |
| te, tdin | Scan test signals |

TABLE 14

| Signal | Description |
| --- | --- |
| i_out[11:0], q_out[11:0] | Interpolated output data |
| valid | Output pulse indicating valid data output) |
| tdout | Scan test output |

TABLE 15

| Signal | Description |
| --- | --- |
| clk40M | 40MHz clock (2x sample clock) |
| valid_in | input data valid signal; when valid is low, input data should be ignored |
| i_data[11:0] | input data from front-end (ignore quadrature data for this block) |
| resync | Control signal: forces Syn FSM back to acquisition mode when pulsed high |

TABLE 15-continued

| Signal | Description |
| --- | --- |
| guard[1:0] | Expected guard interval; programmed by Host uP to aid fft window acquistion. 00 = 1/32, 01 = 1/16, 10 = 1/8, 11 = 1/4 |
| lupdata[7:0] (bi-di) | Internal Microprocessor Data bus (bi-directional) |
| upaddr[0] | Internal uP address bus (only 1-bit required) |
| upwstr | Internal uP write strobe |
| uprstr | Internal uP read strobe |
| upsel | Address decode output to select FFT window block |

TABLE 16

| Signal | Description |
| --- | --- |
| FFT_Window | Timing output pulse; low for 2048 samples indicating the active interval |
| fft_lock | Output pulse indicating status of Sync FSM; 1 = Symbol acquired |
| rx_guard[1:0] | Received Guard Interval Size: 00 = 1/32, 01 = 1/16, 10 = 1/8, 11 = 1/4 |
| IQGI | Timing pulse indicating when the guard interval should arrive at the IQ demodulator (Frequency Error only corrected in the Guard Interval) |
| SincGI | Timing pulse indicating when the guard interval should arrive at the Sinc Interpolator (Sampling Error only corrected in the Guard Interval) |
| sr_sweep[3:0] | Sampling Rate sweep output; 4-Bit output used by Frequency and Sampling Error block to generate Sampling Rate "ping-pong" sweep during FFT window acquisition. |

TABLE 17

| Address (Hex) | Bit No. | Dir/Reset | Register Name | Description |
| --- | --- | --- | --- | --- |
| 0x30–0x32 | 15 | R/W/0 | lock_fft_window | Set to 1 to prevent fft_window moving in Tracking mode |
| | 14 | R/W/0 | inc_fft_window | Write 1 to move fft_window position one sample period later (one-shot operation) |
| | 13 | R/W/0 | dec_fft_window | Write 1 to move fft_window position one sample period earlier (one-shot operation) |
| | 12:0 7:0 | R/0 R/W/0 | fft_window | FFT Window position |

TABLE 18

| Signal | Description |
| --- | --- |
| clk40M | 40MHz clock (2x sample clock) |
| nrst | Synchronous reset (active low) |
| valid_in | input data valid signal; when valid is low, input data should be ignored |
| i_data[11:0], q_data[11:0] | input data from FFT |
| symbol | Symbol timing pulse from FFT; high for first valid data value of a new symbol |
| resync | Resynchronization input triggered on e.g. channel change. Pulsed high to indicate return to acquisition mode (wait for first symbol pulse after resync before beginning pilot search) |
| lupdata[7:0] (bi-di) | Internal Microprocessor Databus |
| upaddr[0] | Internal uP address bus (only 1-bit required) |
| upwstr | Internal uP write strobe |
| uprstr | Internal uP read strobe |

TABLE 18-continued

| Signal | Description |
| --- | --- |
| upsel | Internal address decode output; high for addresses 0x032–0x033 |

TABLE 19

| Signal | Description |
| --- | --- |
| ui_data[11:0], uq_data[11:0] | Uncorrected spectrum data, as read from RAM buffer (for Frequency/Sampling Error block) |
| u_symbol | Uncorrected symbol start; high for first carrier of the uncorrected symbol |
| us_pilot | high for any carrier which is a scattered pilot in the uncorrected symbol |
| ci_data[11:0], cq_data[11:0] | Corrected spectrum data; as output from the complex multiplier |
| valid | high for valid corrected symbol - data carriers only |
| bad_carrier | high if interpolated channel response for the carrier is below pre-set fraction of the mean of carriers of previous symbol - viterbi will discard the data carried by this carrier |
| c_symbol | high for the first carrier in the corrected symbol |
| c_carrier0 | high for the first active carrier in the corrected symbol (a continual pilot corresponding to a carrier index value of 0) |
| c_tps_pilot | high for any carrier in the corrected symbol which is a TPS pilot |
| pilot_lock | output high if pilots successfully located at the end of pilot acquisition phase. |
| odd_symbol | high for symbol period if symbol is odd number in frame (as determined from scattered pilot phase) |
| c_reference_seq | Reference sequence output to TPS Sequence block |
| freq_sweep[2:0] | Frequency Sweep control; incrementing 3-bit count which increments IQ Demodulator LO offset in Frequency and Sampling block. Sweeps 0–0.875 carrier spacing offset in 0.125 carrier spacing steps |

TABLE 20

| Address (Hex) | Bit No. | Dir/Reset | Register Name | Description |
| --- | --- | --- | --- | --- |
| 0x32–0x33 | 15 | R/W/0 | set_carrier_0 | Set to 1 to use carrier_0 value as setting |
|  | 11:0 | R/W/0 | carrier_0 | Carrier 0 position |
| 0x36 | 7:0 | R/W/ | csi_thresh | Channel State information threshold- the fraction of mean level below which data carriers are marked by a bad_carrier flag. Nominally 0.2 (for 2/3 code rate). A value of 0 would turn CSI off for comparison testing. |
| 0x37 | 7:0 |  |  |  |

TABLE 21

| Signal | Description |
| --- | --- |
| clk40M | 40MHz clock (2x sample clock) |
| ci_data[11:0] | corrected pilot data from Channel Estimation and Correction (only need 1 data because corrected pilots should only insignificant Im component; - only need sign bit) |
| tps_pilot | high for single cycle when data input is a tps_pilot - use like a valid signal. |
| reference_seq | Reference Sequence PRBS input from Channel Estimation & Correction - ignore for non-tps_pilot values |
| c_symbol | timing pulse high for 1 clock cycle for first carrier in new symbol (whether or not that carrier is active) |
| lupdata[7:0] (bi-di) | Internal Microprocessor Databus |
| upaddr[1:0] | Internal uP address bus (only 2-bits required) |
| upwstr | Internal uP write strobe |
| uprstr | Internal uP read strobe |
| upsel | Internal address decode output; high for addresses 0x10–0x13 |

TABLE 22

| Signal | Description |
| --- | --- |
| tps_data[29:0] | Output tps data (held static for 1 OFDM frame): tps_data[1:0] = frame number tps_data[3:2] = constellation tps_data[6:4] = hierarchy tps_data[9:7] = code rate, HP stream tps_data[12:10] = code rate, LP stream tps_data[14:13] = guard interval tps_data[16:15] = transmission mode tps_data[29:17] = future use bits Note that parameters are transmitted for the next frame; outputs should be double-buffered so parameters appear at block outputs in the correct frame (used by Demapper and Symbol/Bit deinterleave blocks to decode incoming data) |
| tps_sync | Status output from Frame Sync FSM - set to 1 when FSM is sync'd i.e when 2 valid sync words have been received in expected positions AND correct TPS data is available at the block outputs. |

TABLE 23

TPS Data (including future use bits)

| | | | | |
| --- | --- | --- | --- | --- |
| 0x10–0x13 | 1:0 | R/0 | tps_frame | Number of last received complete OFDM frame in superframe |
|  | 3:2 | R/0 | tps_constellation | Constellation Pattern from TPS data |
|  | 7:5 | R/0 | tps_alpha | Hierarchial Transmission Information |
|  | 10:8 | R/0 | tps_hp_rate | Viterbi Code Rate of High-Priority stream (In non-hierarchical mode this is the code rate of the entire stream) |
|  | 13:11 | R/0 | tps_lp_rate | Viterbi Code Rate of Low-Priority stream |
|  | 15:14 | R/0 | tpd_guard_int | Guard Interval |
|  | 17:16 | R/0 | tps_tx_mode | Transmission Mode |
|  | 31:19 | R/0 | tps_future | Undefined bits allocated for future use. |

TABLE 24

| Signal | Description |
| --- | --- |
| clk40M | 40MHz clock (2x sample clock) |
| nrst | Active low reset |
| us_pilot | input data valid signal; high when a scattered pilot is output from the Channel Estimation & Correction block |

TABLE 24-continued

| Signal | Description |
|---|---|
| guard[1:0] | Guard Interval from which symbol period Tt can be deduced: 00 = 1/32 (Tt = 231 us), 01 = 1/16 (238 us), 10 = 1/8 (252 us), 11 = 1/4 (280 us) |
| ui_data[11:0], uq_data[11:0] | input data from Channel Estimation & Correction (Uncorrected spectrum) |
| u_symbol | Symbol timing pulse from Channel Estimation & Correction; high for first valid data value of a new symbol (uncorrected spectrum) |
| resync | Resynchronization input triggered on e.g. channel change. Pulsed high to indicate return to acquisition mode (wait for first symbol pulse after resync before beginning Pilot search) |
| sr_sweep[3:0] | Sampling Rate Sweep control from FFT Window block; 0 = 0Hz offset, 1 = +500Hz, 2 = −500Hz, 3 = 1000Hz, 4 = −1000Hz, 5 = +1500Hz, 6 = −1500Hz, 7 = +2000Hz, 8 = −2000Hz |
| freq_sweep[3:0] | Frequency Sweep control from Channel Estimation & Correction block; represents number n range 0–7 frequency offset = nx500Hz |
| lupdata[7:0] (bi-di) | Internal Microprocessor Databus |
| upaddr[3:0] | Internal uP address bus (only 4-bit required) |
| upwstr | Internal uP write strobe |
| uprstr | Internal uP read strobe |
| upsel1 | Internal address decode output; high for addresses 0x0e–0x0f |
| upsel2 | Address decode for addresses in range 0x24–0x2d |

TABLE 25

| Signal | Description |
|---|---|
| frequency_error | Frequecy error output (to IQ Demod) |
| sampling_rate_error | Sampling Rate Error output (to Sinc Interpolator) |
| freq_lock | status output; high if frequency error low |
| sample_lock | status output; high if sampling rate error low |

TABLE 26

| Address (Hex) | Bit No. | Dir/Reset | Register Name | Description |
|---|---|---|---|---|
| 0x0e–0x0f | 11:0 | R/0 | freq_error | IQ Demodulator Frequency Error (from feedback loop) |

TABLE 27

| Address (Hex) | Bit No. | Dir/Reset | Register Name | Description |
|---|---|---|---|---|
| 0x24–0x25 | 15 | R/W/0 | freq_open | Set to 1 break freq control loop |
|  | 14 | R/W/0 | freq_nogi | Set to 1 to allow frequency update anytime, not just during Guard Interval |
| 0x26–0x27 | 11:0 | R/W/0 | freq_twiddle freq_loop_bw | ID Demod twiddle factor Frequency Control Loop parameters |
| 0x28–0x29 | 15 | R/W/0 | sample_open | Set to 1 to break sample control loop |
|  | 14 | R/W/0 | sample_nogi | Set to 1 to allow sample update anytime, not just just during Guard Interval |
|  | 11:0 | R/W/0 | sample_twiddle | Sampling Rate Twiddle factor |

TABLE 27-continued

| Address (Hex) | Bit No. | Dir/Reset | Register Name | Description |
|---|---|---|---|---|
| 0x2a–0x2b |  | R/W/0 | sample_loop_bw | Sampling Rate Control Loop parameters |
| 0x2c–0x2d | 11:0 | R/0 | sampling_rate_err | Sampling Rate Error (from feedback loop) |

TABLE 28

| Signal | Description |
|---|---|
| clk40M | 40MHz clock (2x sample clock) |
| valid_in | input data valid signal; when valid is low, input data should be ignored |
| i_data[11:0], q_data[11:0] | input data from Channel Estimation & Correction. |
| bad_carrier_in | Carrier Status falg - set if carrier falls below acceptable level; indicates to viterbi that data from this carrier should be discarded from error correction calculations. |
| c_symbol | Timing synchronization signal - high for the first data sample in the corrected COFDM symbol. |
| constellation[1:0] | control signal which defines constellation: 00 = QPSK, 01 = 16-QAM, 10 = 64-QAM |
| alpha[2:0] | control signal defining hierarchial transmission parameter, alpha: 000 = non-hierarchial transmission, 001 = alpha value of 1, 010 = alpha value of 2, 011 = alpha value of 4 (Note the first release of the chip will not support hierarchical transmission) |

TABLE 29

| Signal | Description |
|---|---|
| out_data[11:0] | deinterleaved output data 6 I, 6 Q format |
| bad—carrier | bad_carrier through demap process unchanged. |
| valid | Valid output data indicator; high if data is being output on this clock cycle. |
| d_symbol | Symbol timing pulse re-timed to synchronize with out_data |

TABLE 30

| Signal | Description |
|---|---|
| clk40M | 40MHz clock (2x sample clock) |
| valid_in | input data valid signal; when valid is low, input data should be ignored |
| demap_data[11:0] | input data from Demapper. Data is in 6-bit I, 6-bit Q format (for 64_QAM) |
| bad_carrier_in | Carrier status signal - set if carrier falls below limits; indicates to viterbi that data should be ignored. Carried with data as extra bit through deinterleaver store. |
| symbol | Timing synchronization signal - high for the first data sample in a COFDM symbol. Used to resynchronize address generation |
| carrier0 | Timing pulse - high for the first active carrier (corresponding to carrier index value of 0) in a symbol |
| odd_symbol | high if symbol is odd number in the frame (different interleaving pattern in odd and even symbols within 68-symbol frame) |

TABLE 31

| Signal | Description |
| --- | --- |
| out_data[11:0] | deinterleaved output data coded constellation format |
| bad_carrier | Bad carrier output having passed through deinterleave RAM. |
| valid | Valid output data indicator; high if data is being output on this clock cycle |
| d_symbol | Output timing synchronization signal - high for first data sample in de-interleaved COFDM symbol. |

TABLE 32

| Signal | Description |
| --- | --- |
| clk40M | 40MHz clock (2x sample clock) |
| valid_in | input data valid signal; when valid is low, input data should be ignored. Valid "spread out" to smooth out data rate over whole symbol - average of 1 data valid every six 40MHz cycles. Effective data rate at viterbi input dropped at 20MHz |
| sdi_data[11:0] | input data from Symbol Deinterleaver. Data is in 6-bit I, 6 bit Q format (for 64_QAM) |
| bad_carrier | Set to 1 if a carrier conveying the data fell below cceptable limits; indicates to Viterbi that this data should be ignored |
| symbol | Timing synchronization signal - high for the first data sample in a COFDM symbol. Used to resynchronize address generation |
| constellation[1:0] | Constellation Type indicator: 10 = 64-QAM 01 = 16-QAM 00 = QPSK |
| alpha[2:0] | Hierarchical transmission control: 000 = non-hierarchical, 001 = alpha value 1, 010 = alpha value 2, 011 = alpha value 4 (Note: in this first version of the device only non-hierarchical mode is supported) |

TABLE 33

| Signal | Description |
| --- | --- |
| I-data[2:0] | I soft-bit to Viterbi |
| discard-I | flag bit derived from bad_carrier signal; viterbi will ignore this soft-bit if set. (bad-carrier is repeated per soft-bit be-cause of interleaving) |
| Q-data[2:0] | Q soft-bit to Viterbi |
| discard-Q | flag-bit; Vlterbi will ignore this soft-bit if set |
| valid | Valid output data indicator; high if data is being output on this clock cycle |

TABLE 34

| Signal | Description |
| --- | --- |
| MD[7:0] (bi-di) | Microprocessor Data bus (bi-directional) |
| MA[5:0] | Microprocessor Address Bus |
| MR/W | Microprocessor Read/Write control |
| SCL | Serial Interface Clock |
| SDA(bi-di) | Serial Interface Data I/O (bi-directional - same pin as MD[0]) |
| SADDR[2:0] | Serial Interface Address |
| S/P | Serial/Parallel interface select |

TABLE 35

| Signal | Description |
| --- | --- |
| nupdata[7:0] (bi-di) | Internal processor data bus (inverted) (bi-directional) |
| upaddr[5:0] | Internal address bus (decoded to provide individual selects for various register banks within functional blocks) |

TABLE 35-continued

| Signal | Description |
| --- | --- |
| upgrstr | Internal read strobe |
| upgwstr | Internal write strobe |
| IRQ | Interrupt Request (Active low, open collector) |

TABLE 36

| Signal | Description |
| --- | --- |
| pad_clk40 | Uncontrolled 40MHz clock from input pad |
| lupdata[7:0] (bi-di) | Internal Microprocessor Data bus (bi-directional) |
| upaddr[3:0] | Internal Microprocessor Address Bus (only bits relevant to registers within System Control) |
| uprstr | Internal Microprocessor Read strobe |
| upwstr | Internal Microprocessor Write Strobe |
| upsel1 | block deselect decoded from microprocessor interface (1 = access to this block enabled) valid for addresses 0x00–0x0b |
| upsel2 | address decode for 0x38–0x39 range |
| tps_data[10:0] | TPS data received in OFDM frame (1:0 = tps_constellation; 4:2 = tps_alpha7:5 = tps_hp_rate10:8 = tps_lp_rate) (Don't bother with Guard Interval - these parameters only affect back end blocks) |
| rs_correct[5:0] | Count of bits corrected in each RS packet (accumulated over 1 second for BER value) |
| rs_corr_val | Valid pulse; high when rs_correct value is valid |
| pkt_err | Set to 1 to indicate RS packet is uncorrectable; has >64 bit errors or is corrupted in some other way. |
| err_val | Set to 1 to indicate when pkt_err signal is valid |
| vit_ill_state | Viterbi_illegal state pulse; (accumulate to give Viterbi illegal state count) |
| vit_ill_val | NOW NOT REQUIRED - Viterbi illegal state valid pulse |
| vit_sync | Status signal - 1 if Viterbi is synchronized |
| tps_sync | Status signal - 1 if TPS is synchronized |
| pilot_loc | Status signal - 1 if pilot location completed successfully (found_pilots)) |
| fft_loc | Status signal - 1 if FFT window has located correctly |
| vit_rate[2:0] | Received Viterbi puncture rate. |
| tck | JTAG test clock - used for control of clock in test mode |
| njreset | JTAG test reset - for clock control block |
| jshift | JTAG test register shift control - for clock control block |
| j_ctrl_in | JTAG test data input |

TABLE 37

| Signal | Description |
| --- | --- |
| clk40 | Test-controlled main clock |
| clk20 | Test-controlled sample clock (input to IQ Demod and AGC) |
| lupdata[7:0] (bi-di) | Internal processor data bus (bi-directional) |
| nirq | Active Low interrupt request bit (derived from chip_event) |
| constellation[1:0] | Internal address bus (decoded to provide individual selects for various register banks within functional blocks) |
| alpha[2:0] | Hierarchical mode information |
| hp_rate[2:0] | Viterbi code rate for High Priority channel (in non-hierarchical mode this is the code rate for the complete channel) |
| lp_rate[2:0] | Viterbi code rate for Low Priority channel. |
| upi_tx_mode[1:0] | Transmission mode (2K or 8K) |
| upi_guard[1:0] | Guard Interval |
| rxp_valid | Set to 1 if Host Interface has set rx_para data - used as a "valid" signal for rx_para data (in case of TPS data use tps_sync) |
| o_clk_phase | Control line; set to 1 to invert output clock phase |
| xtc[2:0] | External Tuner Control bits |

TABLE 37-continued

| Signal | Description |
| --- | --- |
| i2c_gate | I2C "Gate" control |
| ts_tri | Transport Stream Interface tristate control |
| soft_reset | Software Reset (set to 1 to reset everything except upi) |
| agc_invert | Control line: set to 1 to invert sense of AGC sigma-delta output (default: low output equates to low AGC gain) |
| agc_resync | Control line: When set low AGC held in initial condition. Resync transitioning high commences the AGC acquisition sequence |
| fft_resync | Control line: hold low to re-initialise FFT, Channel Estimation & Correction, Frequency/Sampling Error and TPS blocks. Transition high commences FFT window locate, Pilot locate and TPS synchronisation. |
| viterbi_resync | Control line; hold low to re-initiliase FEC backend. Transition high commences Viterbi synchronisation. |
| j_ctrl_out | JTAG test data output - from clock control block. |

TABLE 38

| Address (Hex) | Bit No. | Dir/ Reset | Register Name | Description |
| --- | --- | --- | --- | --- |
| 0x00 | | | Event Reg. | |
| | 0 | R/W/0 | chip_event | OR of all events which are interrupt-enabled (unmasked) |
| | 1 | R/W/0 | lock_failed_event | Set to 1 if channel acquisition sequence fails |
| | 2 | R/W/0 | rs_overload_event | Set to 1 if Reed-Solomon Decoder exceeds set threshold within one 1 second period |
| 0x01 | | | Mask Reg. | |
| | 0 | R/W/0 | chip_mask | Set to 1 to enable IRQ output |
| | 1 | R/W/0 | lock_failed_mask | Set to 1 to enable interrupt on channel acquisition fail |
| | 2 | R/W/0 | rs_overload_mask | Set to 1 to enable interrupt on RS error threshold exceeded |
| 0x02 | | | Status Reg. | |
| | 0 | R/0 | system_locked | Set to 1 when system acquired channel successfully |
| | 1 | R/0 | viterbi_sync | Set to 1 when Viterbi is synchronized |
| | 2 | R/0 | tps_sync | Set to 1 when OFDM frame carrying TPS data has been synchronized to. |
| | 3 | R/0 | pilot_loc | Set to 1 when pilots in COFDM symbol have been located and synchronized to |
| | 4 | R/0 | fft_loc | Set to 1 when guard interval has been located and synchronized to. |
| | 7:5 | R/1 | viterbi_rate | Received Viterbi Code rate |
| 0x04– 0x05 | | | Control Reg: | |
| | 0 | R/W/0 | change_channel | When set to 1, holds device in "Reset" state. Clearing this bit initiates channel change. |
| | 1 | R/W/0 | agc_invert | Invert AGC Signa-Delta output. Default setting means low output associated with reduced AGC gain. |
| | 2 | R/W/0 | o_clk_phase | Set to 1 to invert phase of output clock. Default condition: output data changes on falling edge of output clock. |
| | 3 | R/W/0 | set_rx_parameters | Set to 1 to take Reciver Parameter Data from Receiver Parameter Register. Default condition: settings taken from TPS data (longer channel acquisition time) |
| | 4 | R/W/0 | extend_agc | Set to 1 to hold acquisition sequence in agc_acquire state |
| | 5 | R/W/0 | extend_fs | Set to 1 to hold acquisition sequence in fs_acquire state |
| | 6 | R/W/0 | extend_settle | Set to 1 to hold acquisition sequence in fs_settle state |
| | 7 | R/W/0 | extend_syn | When set to 1 to hold acquisition sequence in vit_sync state |
| | 10:8 | R/W/0 | xtc | External Tuner Control bits (external pins XTC[2:0]) |
| | 11 | R/W/0 | i2c_gate | I2C "Gate" signal; setting this to 1 enables the isolation buffer between the "processor side" I2C bus and the "Tuner side" I2C so the processor can acces a Tuner through COFDM device. Setting to 0 closes the "gate" to prevent I2C bus noise affecting delicate RF. |
| | 12 | R/W/0 | ts_tri | Transport Stream Tristate control - set to 1 to tristate MPEG TS interface (eg. to mux a QPSK devce to same MPEG demux). Power-on state of TS output controlled by external pin - somehow!!! |
| | 13 | R/W/0 | fast_ber | Set to 1 to reduce BER counter, vit_ill_state counter and rso_counter, counter periods from 1 sec to 100 ms |
| | 15 | R/W/0 | soft_reset | Software Reset - set to 1 to reset all blocks except upi. Set to 0 to release. |
| 0x06– 0x07 | | | Receiver Parameter Register: | |
| | 15:14 | R/W/2 | upi_constellation | Constellation Pattern for Demapper and Bit Deinterleaver (reset condition = 64-QAM) |
| | 13:12 | R/W/0 | upi_guard | Guard Interval: 00 = 1/32, 01 = 1/16, 10 = 1/8, 11 = 1/4 |
| | 11:9 | R/W/0 | upi_alpha | Hierarchical Tranmission Mode or "alpha value" (reset condition = |

TABLE 38-continued

| Address (Hex) | Bit No. | Dir/ Reset | Register Name | Description |
|---|---|---|---|---|
| | 7:5 | R/W/0 | upi_hp_rate | non-hierarchical mode) Viterbi Code Rate for HP stream - in non-hierarchical mode this is taken as the Viterbi Code Rate (reset condition = 1/2 rate code) |
| | 4:2 | R/W/0 | upi_lp_rate | Viterbi Code Rate for LP stream (reset condition = rate code) |
| | 1:0 | R/W/0 | upi_tx_mode | Trnnsmission mode (00 = 2K, 01 = 8K, others reserved) |
| 0x08 | 7:0 | R/W/0 | rso_limit | Errored packet per second limit (for rs_overload_event bit) |
| 0x09 | 7:0 | R/0 | rso_count | Count of Uncorrectable Transport Packets per second (saturates at 255). Write to register to latch a stable count value which can then be read back. |
| 0x0a–0x0b | 15:0 | R/0 | ber | BER (before RS) deduced from RS corrections in 1 second period - max correctable bit errors ~1.35M/sec for 7/8, 64-QAM, 1/32 GI (equivalent to 43.e-3 BER assuming useful bitrate of 31.67 e6). Only top 16 bits of 21 bit counter are visible - resolution of ~1e-6 depending on code-rate, constellation GI length. Write to register to latch a stable count value which can then be read back. |

TABLE 39

| | | | | |
|---|---|---|---|---|
| 0x38–0x39 | 11:0 | R/0 | vit_ill_states | Viterbi Illegal State Rate (per second) Write to register to latch count which can then be read back |

What is claimed is:

1. A digital receiver for multicarrier signals, said receiver comprising:

an amplifier accepting an analog multicarrier signal, said multicarrier signal including a stream of data symbols having a symbol period $T_S$, the symbols having an active interval, a guard interval, and a boundary therebetween, said guard interval being a replication of a portion of said active interval;

an analog to digital converter coupled to said amplifier;

an I/Q demodulator for recovering in phase and quadrature components from data sampled by said analog to digital converter;

an automatic gain control circuit coupled to said analog to digital converter for providing a gain control signal for said amplifier;

a low pass filter circuit accepting I and Q data from said I/Q demodulator, said I and Q data being decimated therein;

a resampling circuit receiving said decimated I and Q data at a first rate and outputting resampled I and Q data at a second rate;

an FFT window synchronization circuit coupled to said resampling circuit for locating a boundary of said guard interval;

a real-time pipelined FFT processor operationally associated with said FFT window synchronization circuit, said FFT processor including at least one stage; and a monitor circuit responsive to said FFT window synchronization circuit for detecting a predetermined event, said event thereby indicating that a boundary between an active symbol and a guard interval has been located.

2. The receiver according to claim 1 wherein said FFT window synchronization circuit comprises:

a first delay element accepting currently arriving resampled I and Q data, and outputting delayed resampled I and Q data;

a subtracter for producing a difference signal representative of a difference between said currently arriving resampled I and Q data and said delayed resampled I and Q data;

a first circuit for producing an output signal having a unipolar magnitude that is representative of said difference signal of said subtracter;

a second delay element for storing said output signal of said first circuit;

a third delay element receiving delayed output of said second delay element; and a second circuit for calculating a statistical relationship between data stored in said second delay element and data stored in said third delay element and having an output representative of said statistical relationship.

3. The receiver according to claim 2 wherein said statistical relationship includes an F ratio.

4. The receiver according to claim 1 wherein said FFT processor operates in an 8K mode.

5. The receiver according to claim 1 wherein said FFT processor includes an address generator for said memory, said address generator accepting a signal representing an order dependency of a currently required multiplicand, and outputting an address of said memory so that said currently required multiplicand is stored.

6. The receiver according to claim 5 wherein each of said multiplicands is stored in said lookup table based on its respective order dependency for multiplication by said complex coefficient multiplier, said order dependencies of said multiplicands defining an incrementation sequence, and said address generator comprises:

an accumulator for storing a previous address that was generated by said address generator;

a circuit for calculating an incrementation value of said currently required multiplicand; and an adder for adding said incrementation value to said previous address.

7. The receiver according to claim 6 wherein said lookup table includes a plurality of rows, said incrementation sequence includes a plurality of incrementation sequences, and said multiplicands are stored in row order in accord with the following:

in a first row a first incrementation sequence is 0;

in a second row a second incrementation sequence is 1;

in a third row first and second break points B1 and B2 of a third incrementation sequence are respectively determined by the relationships, $$B_{1_{M_N}} = 4^N B1_{M_N} - \sum_{n=0}^{N-1} 4^n \quad B_{2_{M_N}} = \sum_{n=0}^{N} 4^n; \text{ and}$$

in a fourth row a third break point B3 of a third incrementation sequence is II determined by the relationship, $$B3_{M_N} = 2 \times 4^N + 2$$

where $M_N$ represents the memory of an Nth stage of said FFT processor.

8. The receiver according to claim 1 further comprising channel estimation and correction circuitry including pilot location circuitry receiving a transformed digital signal representing a frame from said FFT processor for locating pilot carriers therein, said pilot carriers being spaced apart in a carrier spectrum of said transformed digital signal at intervals K and having predetermined magnitudes.

9. The receiver according to claim 8 wherein said pilot location circuitry further includes a bit reversal circuit for reversing bit order of said transformed digital signal.

10. The receiver according to claim 8 wherein at least one of said predetermined magnitudes of said carriers defines an amplitude.

11. The receiver according to claim 8 wherein said magnitudes of said carriers and said predetermined magnitudes are absolute values.

12. The receiver according to claim 8 wherein said channel estimation and correction circuitry includes:
   an interpolating filter for estimating a channel response between said pilot carriers; and
   a multiplication circuit for multiplying data carriers output by said FFT processor with a correction coefficient produced by said interpolating filter.

13. The receiver according to claim 8 wherein said channel estimation and correction circuitry includes a phase extraction circuit accepting a data stream of phase-uncorrected I and Q data from said FFT processor to thereby produce a signal representative of a phase angle of said uncorrected data, said phase extraction circuit including an accumulator for accumulating the phase angles of succeeding phase-uncorrected I and Q data.

14. The receiver according to claim 13 wherein said channel estimation and correction circuitry includes an automatic frequency control circuit coupled to said phase extraction circuit and said accumulator.

15. The receiver according to claim 13 wherein said channel estimation and correction circuitry further includes an automatic sampling rate control circuit coupled to said phase extraction circuit.

16. The receiver according to claim 15 wherein said sampling rate control circuit stores a plurality of accumulated intersymbol carrier phase error differentials and computes a line of best fit therebetween.

17. The receiver according to claim 15 wherein a common memory for storing output of said phase extraction circuit is coupled to said automatic sampling rate control circuit.

18. The receiver according to claim 13 wherein said phase extraction circuit includes a pipelined circuit for iteratively computing the arctangent of an angle of rotation according to the series $$\tan^{-1}(x) = x - \frac{x^3}{3} + \frac{x^5}{5} - \frac{x^7}{7} + \frac{x^9}{9} - \ldots, |x| < 1$$

where x is a ratio of said phase-uncorrected I and Q data.

19. The receiver according to claim 18 wherein said pipelined circuit includes:
   a constant coefficient multiplier;
   and a multiplexer for selecting one of a plurality of constant coefficients of said series, an output of said multiplexer being connected to an input of said constant coefficient multiplier.

20. The receiver according to claim 18 wherein said pipelined circuit includes: a multiplier;
   a first memory for storing the quantity $x^2$, said first memory being coupled to a first input of said multiplier;
   a second memory for holding an output of said multiplier; and
   a feedback connection between said second memory and a second input of said multiplier.

21. The receiver according to claim 18 wherein said pipelined circuit further includes:
   a third memory for storing a value of said series;
   a control circuit coupled to said third memory, said pipeline circuit computing N terms of said series, and N+1 terms of said series, where N is an integer;
   an averaging circuit coupled to said third memory for computing an average of said N terms and said N+1 terms of said series.

22. The receiver according to claim 1 wherein data transmitted in a pilot carrier of said multicarrier signal is BCH encoded according to a code generator polynomial h(x).

23. The receiver according to claim 1 wherein said at least one stage of said FFT processor includes a complex coefficient multiplier, and a memory having a lookup table defined therein for multiplicands being multiplied in said complex coefficient multiplier, a value of each said multiplicand being unique in said lookup table.

24. The receiver according to claim 15 wherein said automatic frequency control circuit includes a memory for storing an accumulated common phase error of a first symbol carried in said phase-uncorrected I and Q data.

25. The receiver according to claim 24 wherein said accumulator is coupled to said memory and accumulates a difference between a common phase error of a plurality of pilot carriers in a second symbol and a common phase error of corresponding pilot carriers in said first symbol.

26. The receiver according to claim 25 wherein an output of said accumulator is coupled to said I/Q demodulator.

27. The receiver according to claim 26 wherein said coupled output of said accumulator is enabled in said I/Q demodulator only during reception of a guard interval therein.

28. The receiver according to claim 15 wherein said automatic sampling rate control circuit includes a memory for storing accumulated phase errors of pilot carriers in a first symbol carried in said phase-uncorrected I and Q data.

29. The receiver according to claim 28 wherein a coupled output signal of said accumulator is enabled in said resampling circuit only during reception of a guard interval therein.

30. The receiver according to claim 28 wherein said accumulator is coupled to said memory and accumulates differences between phase errors of pilot carriers in a second symbol and phase errors of corresponding pilot carriers in said first symbol to define a plurality of accumulated intersymbol carrier phase error differentials.

31. The receiver according to claim 30 wherein a phase slope is defined by a difference between a first accumulated intersymbol carrier phase differential and a second accumulated intersymbol carrier phase differential.

32. The receiver according to claim 6 wherein an output of said accumulator is coupled to said I/Q demodulator.

33. The receiver according to claim 17 further including an automatic frequency control circuit coupled to said phase extraction circuit and said automatic sampling rate control circuit.

34. The receiver according to claim 22 further including a demodulator operative on said BCH encoded data.

35. The receiver according to either claim 22 or 34 further including an iterative pipelined BCH decoding circuit.

36. The receiver according to claim 35 wherein said iterative pipelined BCH decoding circuit includes a circuit coupled to said demodulator for forming a Galois Field of said polynomial, and calculating a plurality of syndromes therewith.

37. The receiver according to claim 36 wherein said iterative pipelined BCH decoding circuit further includes a plurality of storage registers, each said storage register storing a respective one of said syndromes.

38. The receiver according to claim 37 wherein said iterative pipelined BCH decoding circuit further includes a plurality of feedback shift registers, each said feedback shift register accepting data from a respective one of said storage registers and having an output.

39. The receiver according to claim 38 wherein said iterative pipelined BCH decoding circuit further includes a plurality of Galois field multipliers, each of said multipliers being connected in a feedback loop across a respective one of said feedback shift registers and multiplying the output of its associated feedback shift register by an alpha value of said Galois Field.

40. The receiver according to claim 39 wherein said iterative pipelined BCH decoding circuit further includes an output Galois field multiplier for multiplying said outputs of two of said feedback shift registers.

41. The receiver according to claim 40 wherein said iterative pipelined BCH decoding circuit further includes an error detection circuit connected to said feedback shift registers and said output Galois field multiplier, an output signal of said error detection circuit enabled to indicate an error in a current bit of data.

42. The receiver according to claim 37 wherein said iterative pipelined BCH decoding circuit further includes a feedback line enabled by said error detection circuit and connected to said storage registers, outputs of said feedback shift registers thereby being written into said storage registers.

43. The receiver according to claim 40 wherein said output Galois field multiplier includes a first register initially storing a first multiplicand A.

44. The receiver according to claim 43 wherein said output Galois field multiplier further includes a constant coefficient multiplier connected to said register for multiplication by a value α, an output of said constant coefficient multiplier being connected to said first register to define a first feedback loop so that in a kth cycle of clocked operation, said first register contains a Galois field product $A\alpha^k$.

45. The receiver according to claim 44 wherein said output Galois field multiplier further includes a second register for storing a second multiplicand B.

46. The receiver according to claim 45 wherein said output Galois field multiplier further includes an AND gate connected to said second register and to said output of said constant coefficient multiplier.

47. The receiver according to claim 46 wherein said output Galois field multiplier further includes an adder having a first input connected to an output of said AND gate.

48. The receiver according to claim 47 wherein said output Galois field multiplier further includes an accumulator connected to a second input of said adder, an output of said adder being connected to said accumulator to define a second feedback loop so that a Galois field product AB is output by said adder.

49. The receiver according to claim 8 wherein said pilot location circuitry includes a first circuit for computing an order of carriers in said transformed digital signal modulo K.

50. The receiver according to claim 49 wherein said pilot location circuitry further includes K accumulators coupled to said first circuit for accumulating magnitudes of said carriers in said transformed digital signal, said accumulated magnitudes defining a set.

51. The receiver according to claim 50 wherein said pilot location circuitry further includes a correlation circuit for correlating K sets of accumulated magnitude values with said predetermined magnitudes, a first member having a position calculated modulo K in each of said K sets, thereby being uniquely offset from a start position of said frame.

52. The receiver according to claim 51 wherein said correlation circuit includes a peak tracking circuit for determining a spacing between a first peak and a second peak of said K sets of accumulated magnitudes.

* * * * *